(12) United States Patent
Kubota et al.

(10) Patent No.: US 10,971,755 B2
(45) Date of Patent: Apr. 6, 2021

(54) SECONDARY BATTERY-USE ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Tadahiko Kubota, Kanagawa (JP); Toru Odani, Kanagawa (JP); Hiroki Mita, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 351 days.

(21) Appl. No.: 15/303,339

(22) PCT Filed: Apr. 7, 2015

(86) PCT No.: PCT/JP2015/060834
§ 371 (c)(1),
(2) Date: Oct. 11, 2016

(87) PCT Pub. No.: WO2015/163139
PCT Pub. Date: Oct. 29, 2015

(65) Prior Publication Data
US 2017/0033402 A1    Feb. 2, 2017

(30) Foreign Application Priority Data
Apr. 23, 2014 (JP) .............................. JP2014-089182

(51) Int. Cl.
*H01M 10/0565* (2010.01)
*H01M 10/0568* (2010.01)
(Continued)

(52) U.S. Cl.
CPC ..... *H01M 10/0565* (2013.01); *H01M 2/1646* (2013.01); *H01M 2/1653* (2013.01);
(Continued)

(58) Field of Classification Search
CPC .................................................. H01M 10/056
See application file for complete search history.

(56) References Cited

U.S. PATENT DOCUMENTS

2001/0004504 A1   6/2001  Nakamizo et al.
2002/0028379 A1   3/2002  Okada et al.
(Continued)

FOREIGN PATENT DOCUMENTS

CN    101882696    11/2010
CN    102820483    12/2012
(Continued)

OTHER PUBLICATIONS

Li et al. CN 101882696. Nov. 10, 2010. English translation. (Year: 2019).*

(Continued)

*Primary Examiner* — James Lee
(74) *Attorney, Agent, or Firm* — Sheridan Ross P.C.

(57) ABSTRACT

A secondary battery includes a cathode, an anode, and a nonaqueous electrolytic solution. The nonaqueous electrolytic solution includes a compound represented by $M^+[(Z1Y1)(Z2Y2)N]^-$ (where M is a metal element, each of Z1 and Z2 is one of groups such as as a fluorine group, and each of Y1 and Y2 is one of groups such as a sulfonyl group), a compound such as a compound represented by R1-CN (where R1 is a monovalent hydrocarbon group), and a compound such as a compound represented by $R22\text{-}(CN)_n$ (where R22 is an n-valent hydrocarbon group, and n is an integer of 2 or more). A content of the compound represented by $[(Z1Y1)(Z2Y2)N]^-$ in the nonaqueous electrolytic (Continued)

solution is within a range of 2.5 mol/dm$^3$ to 6 mol/dm$^3$ both inclusive.

20 Claims, 7 Drawing Sheets

(51) Int. Cl.
*H01M 2/16* (2006.01)
*H01M 10/42* (2006.01)
*H01M 10/056* (2010.01)
*H01M 10/0567* (2010.01)
*H01M 10/0569* (2010.01)
*H01M 4/04* (2006.01)
*H01M 4/525* (2010.01)
*H01M 4/587* (2010.01)
*H01M 4/62* (2006.01)
*H01M 10/0525* (2010.01)
*H01M 10/0587* (2010.01)

(52) U.S. Cl.
CPC ....... *H01M 2/1686* (2013.01); *H01M 4/0435* (2013.01); *H01M 4/525* (2013.01); *H01M 4/587* (2013.01); *H01M 4/623* (2013.01); *H01M 4/625* (2013.01); *H01M 4/628* (2013.01); *H01M 10/056* (2013.01); *H01M 10/0525* (2013.01); *H01M 10/0567* (2013.01); *H01M 10/0568* (2013.01); *H01M 10/0569* (2013.01); *H01M 10/0587* (2013.01); *H01M 10/425* (2013.01); *Y02E 60/10* (2013.01); *Y02T 10/70* (2013.01)

(56) References Cited

U.S. PATENT DOCUMENTS

| | | |
|---|---|---|
| 2011/0014518 A1 | 1/2011 | Nakai et al. |
| 2011/0300444 A1 | 12/2011 | Nakamura |
| 2012/0316716 A1* | 12/2012 | Odani ............... H01M 10/0567 701/22 |

FOREIGN PATENT DOCUMENTS

| | | |
|---|---|---|
| EP | 2950370 | 12/2015 |
| JP | HEI 08-511274 | 11/1996 |
| JP | 2001-519589 | 10/2001 |
| JP | 2004-165151 | 6/2004 |
| JP | 2009-070636 | 4/2009 |
| JP | 2009-259472 A | 11/2009 |
| JP | 2010-97934 A | 4/2010 |
| JP | 2010-129449 | 6/2010 |
| JP | 2010-165653 A | 7/2010 |
| JP | 2011-150958 A | 8/2011 |
| JP | 2013-16456 A | 1/2013 |
| JP | 2013-134859 A | 7/2013 |
| WO | WO 2014/065067 A1 | 5/2014 |

OTHER PUBLICATIONS

International Search Report prepared by the Japan Patent Office dated May 26, 2015, for International Application No. PCT/JP2015/060924.
Unusual Stability of Acetonitrile-Based Su perconcentrated Electrolytes for Fast-Charging Lithium-Ion Batteries; Journal of the American Chemical Society 2014, 136, 5039-5046.
Official Action (no translation available) for Chinese Patent Application No. 201580020024,6, dated Aug. 15, 2018, 9 pages.
Extended European Search Report fo European Patent Application No. 15821711.7, dated Nov. 30, 2017, 9 pages.
Official Action (no translation available) for Japanese Patent Application No. 2016-514849, dated Dec. 4, 2018, 3 pages.
Official Action (no translation available) for Chinese Patent application No. 201580020024.6, dated Apr. 3, 2019, 11 pages.
Official Action (no translation available) for Chinese Patent application No. 201580020024.6, dated Oct. 9, 2019, 7 pages.

* cited by examiner

[ FIG. 1 ]
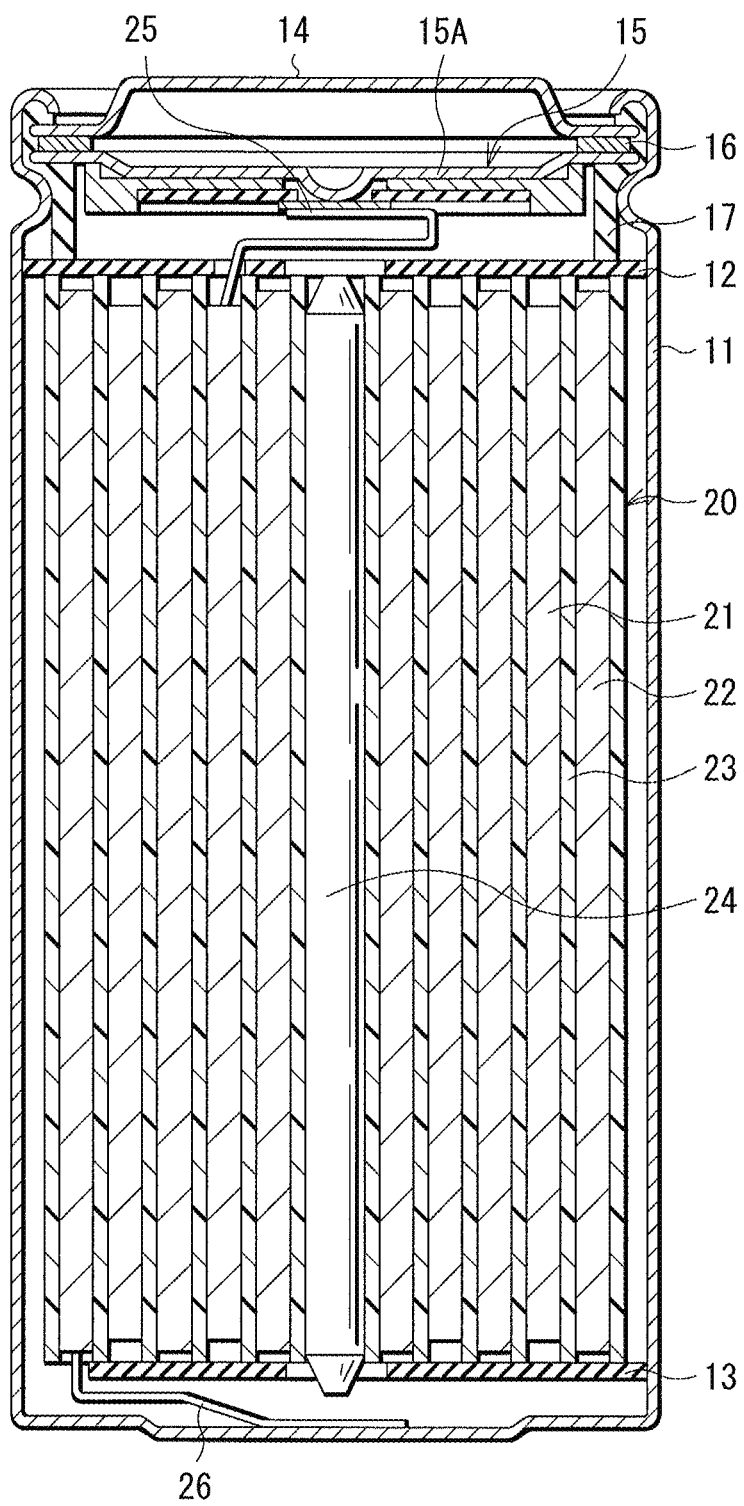

[ FIG. 2 ]
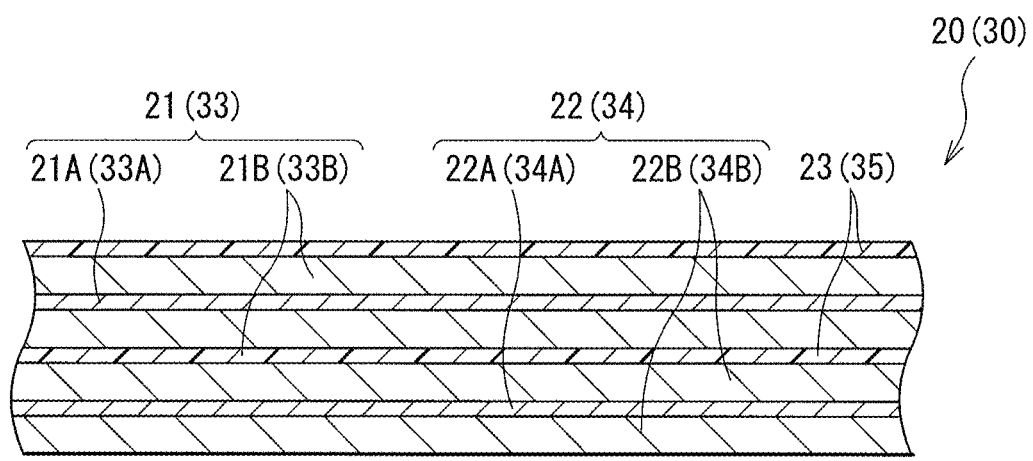
[ FIG. 3 ]
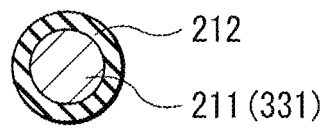
[ FIG. 4 ]
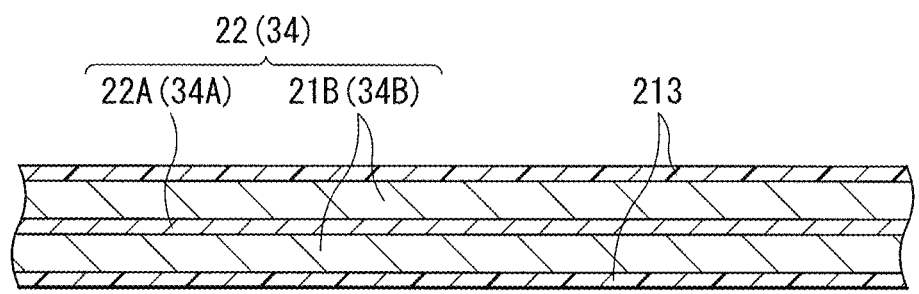
[ FIG. 5 ]
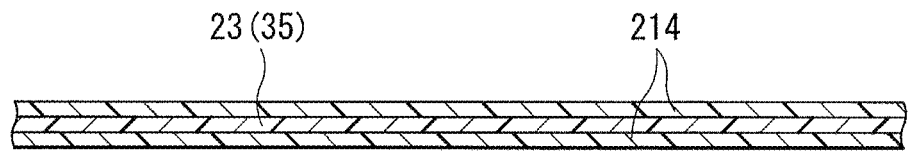

[ FIG. 6 ]
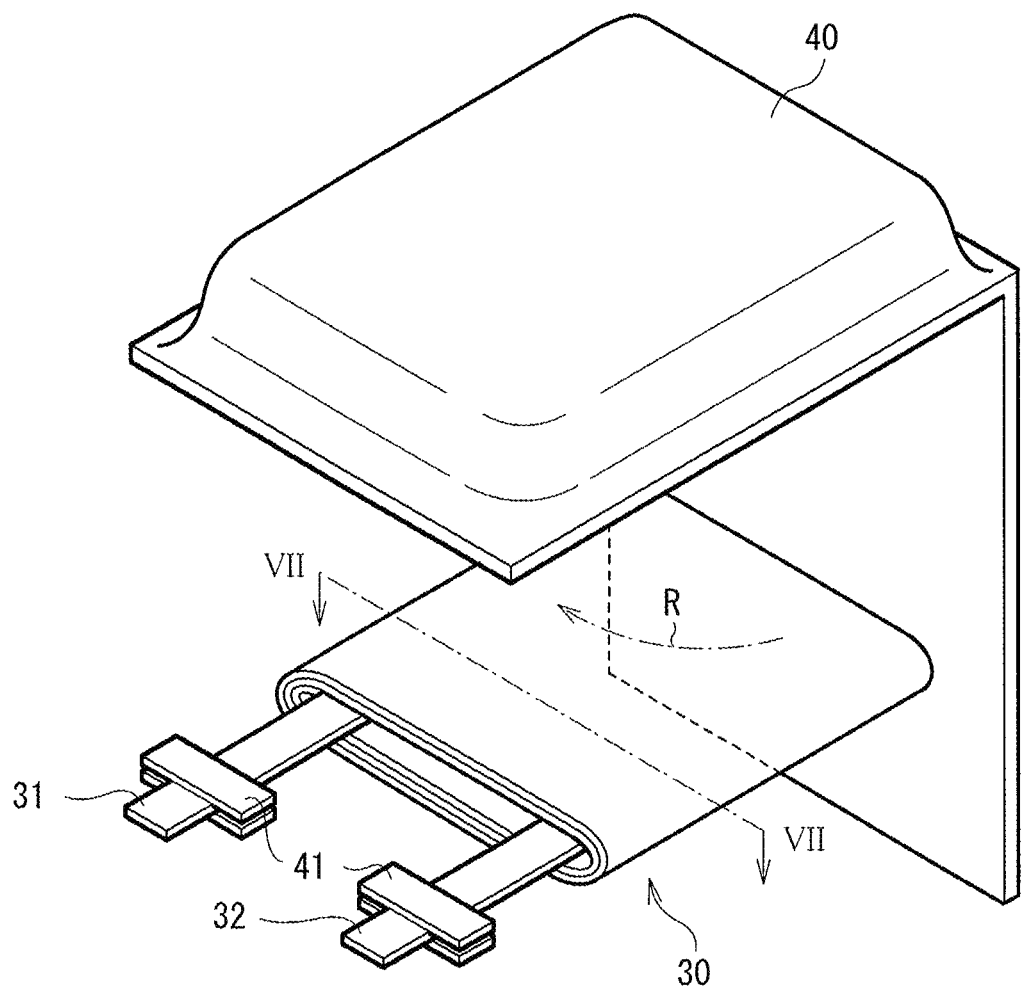

[FIG. 7]
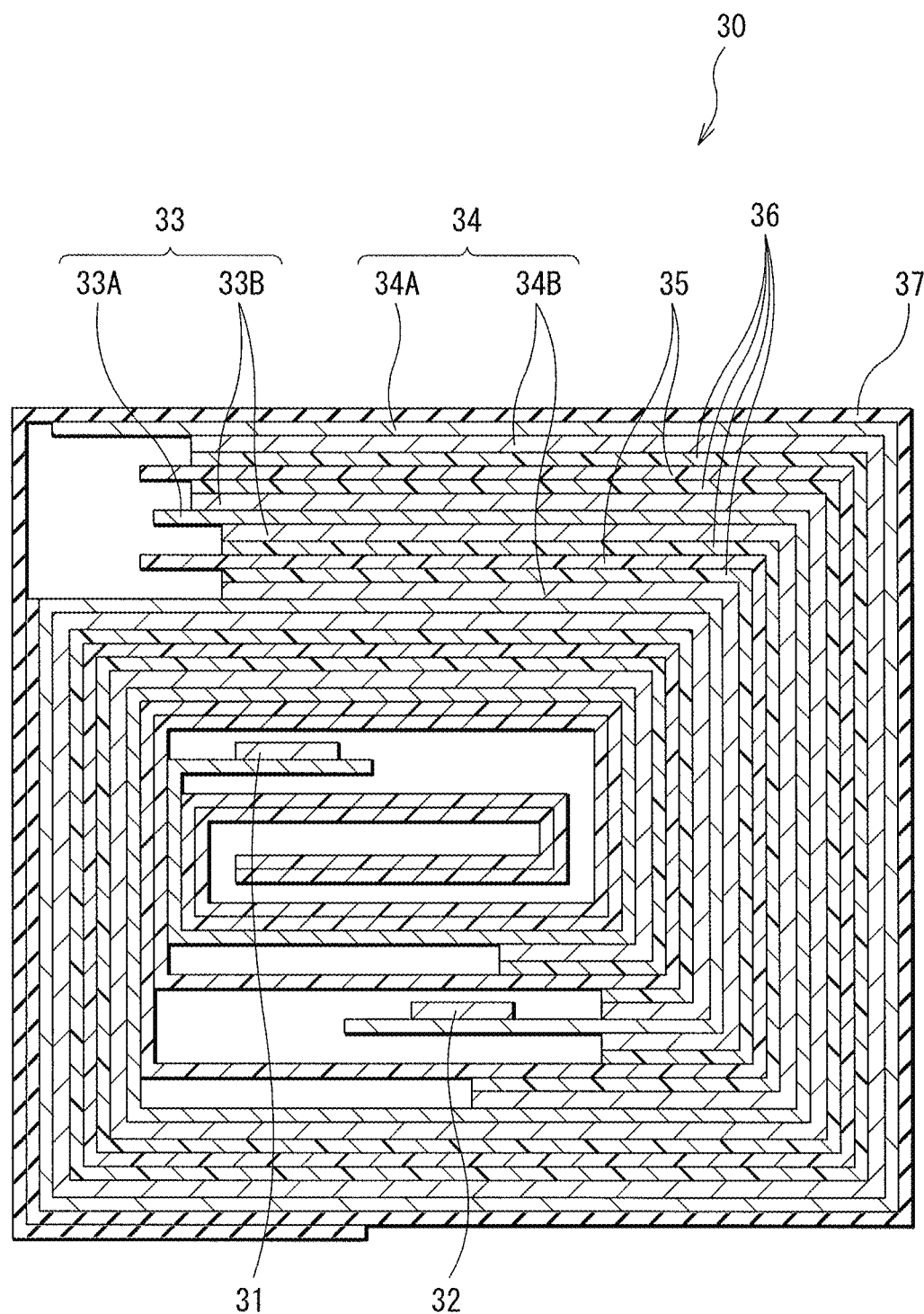

[ FIG. 8 ]
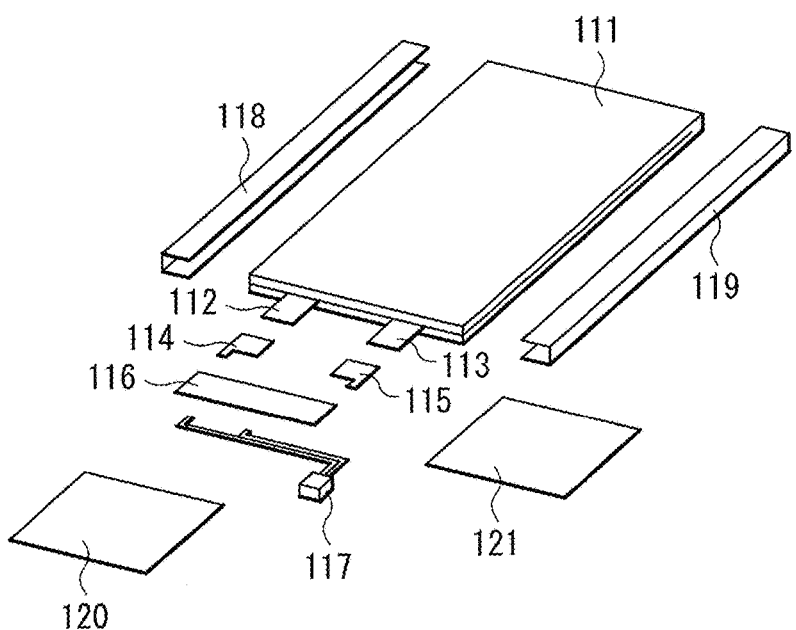
[ FIG. 9 ]
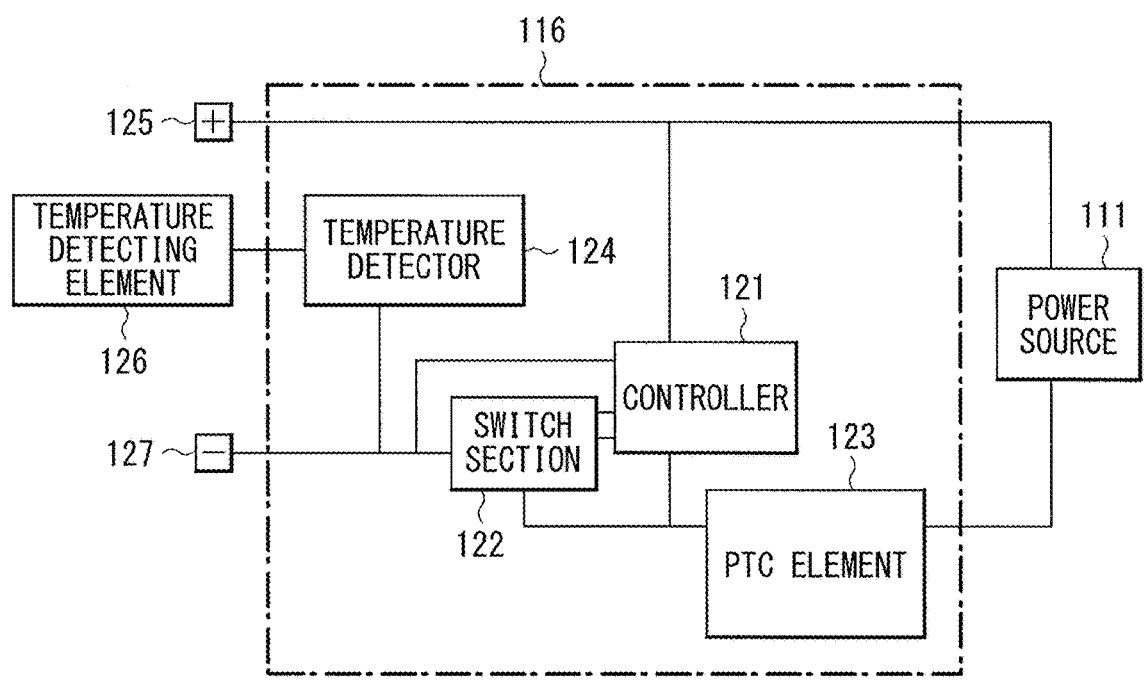

[ FIG. 10 ]
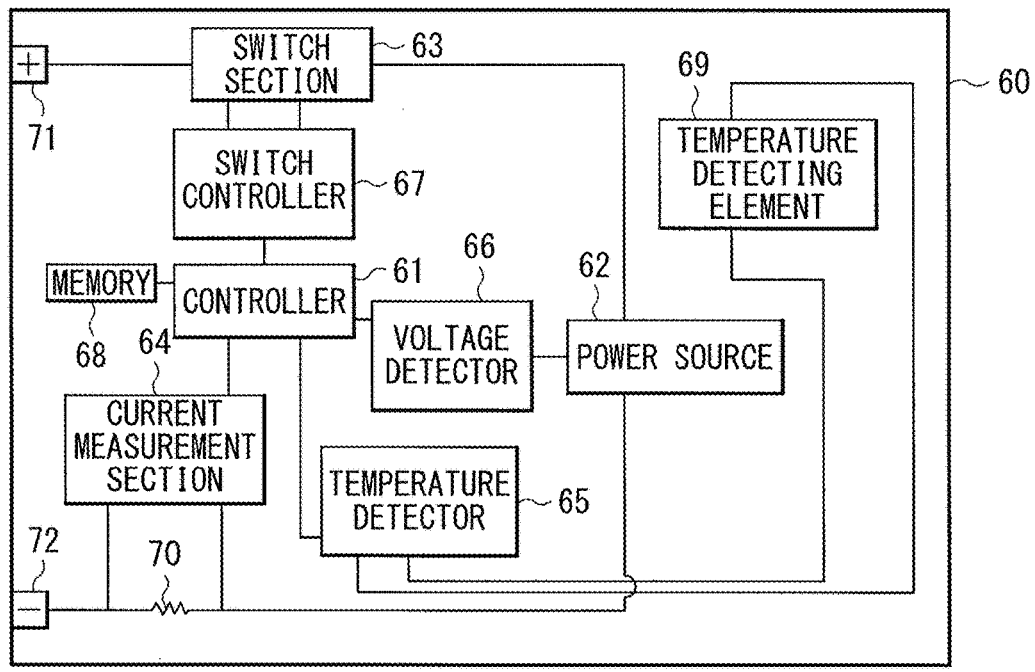
[ FIG. 11 ]
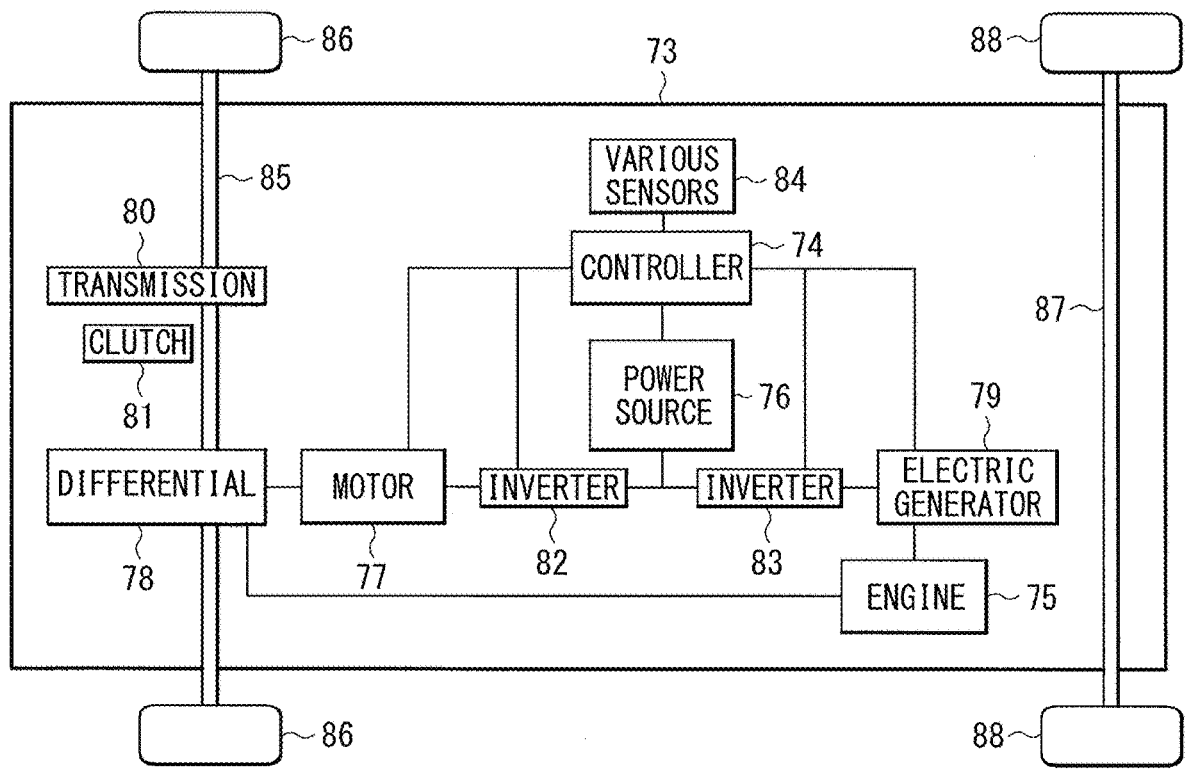

[ FIG. 12 ]
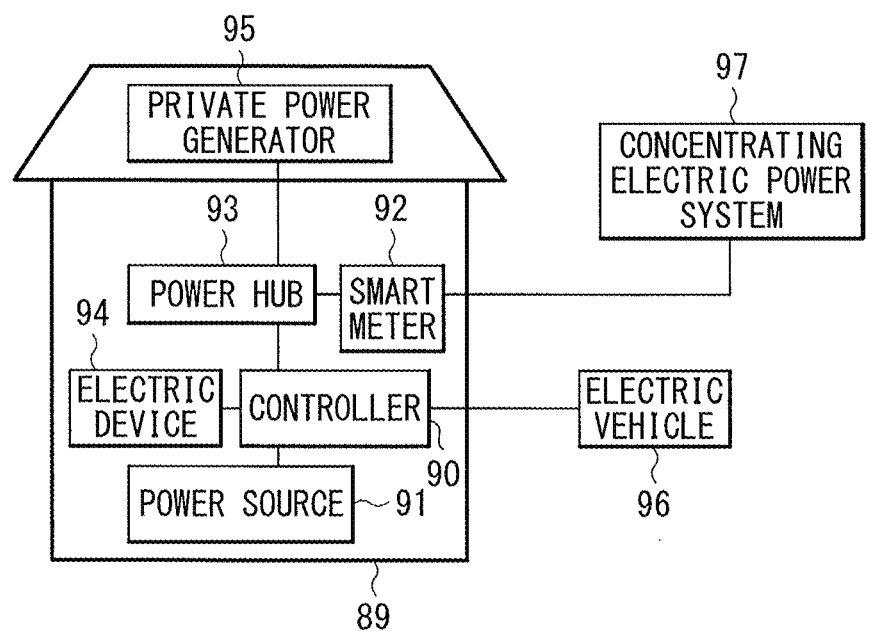
[ FIG. 13 ]
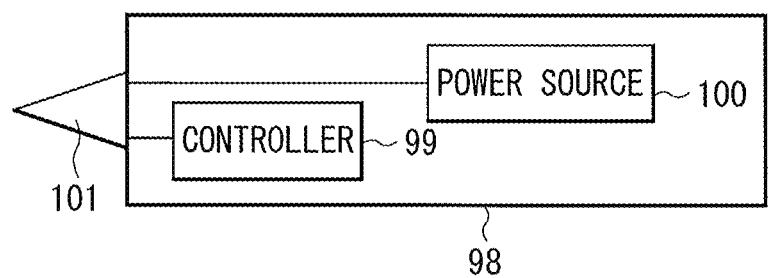

SECONDARY BATTERY-USE ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a national stage application under 35 U.S.C. 371 and claims the benefit of PCT Application No. PCT/JP2015/060834 having an international filing date of Apr. 7, 2015, which designated the United States, which PCT application claimed the benefit of Japanese Patent Application No. 2014-089182 filed Apr. 23, 2014, the disclosures of which are incorporated herein by reference in their entirety.

TECHNICAL FIELD

The present technology relates to an electrolytic solution used for a secondary battery, a secondary battery using the electrolytic solution, a battery pack, an electric vehicle, an electric power storage system, an electric power tool, and an electronic apparatus each of which uses the secondary battery.

BACKGROUND ART

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and lightweight secondary batteries that have ability to achieve high energy density have been developed as power sources for the electronic apparatuses.

Applications of the secondary battery are not limited to the electronic apparatuses described above, and it has been also considered to apply the secondary battery to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant or a secondary battery that utilizes precipitation and dissolution of an electrode reactant, which makes it possible to achieve higher energy density than other batteries such as a lead-acid battery and a nickel-cadmium battery.

The secondary battery includes a cathode, an anode, and a nonaqueous electrolytic solution. The nonaqueous electrolytic solution contains a nonaqueous solvent and an electrolyte salt. The composition of the nonaqueous electrolytic solution exerts a large influence on battery characteristics. Accordingly, various studies have been conducted on the composition of the nonaqueous electrolytic solution.

More specifically, in order to achieve superior charge storage characteristics in a high temperature environment, a lithium salt such as lithium bis(fluorosulfonyl)imide is used as the electrolyte salt, and an organic solvent such as fluorinated cyclic carbonate ester is used as the nonaqueous solvent (for example, refer to Patent Literatures 1 to 6). In addition, for example, acetonitrile may be used as the nonaqueous solvent (for example, refer to Non-Patent Literature 1).

CITATION LIST

Patent Literature

Patent Literature 1: Japanese Unexamined Patent Application Publication No. 2010-129449
Patent Literature 2: Japanese Unexamined Patent Application Publication (Published Japanese Translation of PCT Application) No. H08-511274
Patent Literature 3: Japanese Unexamined Patent Application Publication No. 2004-165151
Patent Literature 4: Japanese Unexamined Patent Application Publication No. 2009-070636
Patent Literature 5: Japanese Unexamined Patent Application Publication (Published Japanese Translation of PCT Application) No. 2001-519589
Patent Literature 6: Japanese Unexamined Patent Application Publication No. 2013-016456

Non-Patent Literature

Non-Patent Literature 1: Unusual Stability of Acetonitrile-Based Superconcentrated Electrolytes for Fast-Charging Lithium-Ion Batteries, Yuki Yamada et al., JOURNAL OF THE AMERICAN CHEMICAL SOCIETY, 2014, 136 (13), pp 5039-5046

SUMMARY

Electronic apparatuses and other apparatuses are more frequently used in association with higher performance and more multi-functionality thereof. Accordingly, secondary batteries tend to be frequently charged and discharged. For this reason, there is still room for improvement in battery characteristics of the secondary batteries.

It is therefore desirable to provide a secondary battery-use electrolytic solution, a secondary battery, a battery pack, an electric vehicle, an electric power storage system, an electric power tool, an electronic apparatus each of which makes it possible to achieve superior battery characteristics.

A secondary battery-use electrolytic solution according to an embodiment of the present technology includes: a compound represented by a formula (1); one or both of a compound represented by a formula (2) and a compound represented by a formula (3); and one or more of a compound represented by a formula (4), a compound represented by a formula (5), a compound represented by a formula (6), a compound represented by a formula (7), a compound represented by a formula (8), and a compound represented by a formula (9). A content of the compound represented by the formula (1) in the nonaqueous electrolytic solution is within a range of 2.5 mol/dm$^3$ to 6 mol/dm$^3$ both inclusive.

$$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)$_2$—) and a carbonyl group (—C(=O)—).

$$\quad (2)$$

where R1 is a monovalent hydrocarbon group.

R2—X—CN    (3)

where R2 is a monovalent hydrocarbon group, and X is a group in which one or more ether bonds (—O—) and one or more divalent hydrocarbon groups are bound in any order.

[Chem. 1]

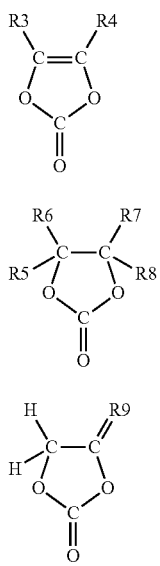

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group.

[Chem. 2]

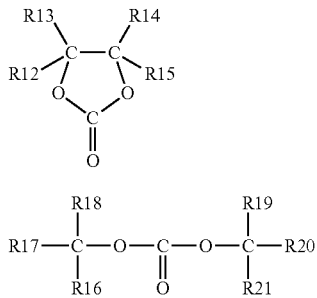

where each of R12 to R15 is one of a hydrogen group, a halogen group, a monovalent hydrocarbon group, and a monovalent halogenated hydrocarbon group, one or more of R12 to R15 are one of the halogen group and the monovalent halogenated hydrocarbon group, each of R16 to R21 is one of a hydrogen group, a halogen group, a monovalent hydrocarbon group, and a monovalent halogenated hydrocarbon group, and one or more of R16 to R21 are one of the halogen group and the monovalent halogenated hydrocarbon group.

R22—(CN)$_n$    (9)

where R22 is an n-valent hydrocarbon group, and n is an integer of 2 or more.

A secondary battery according to an embodiment of the present technology includes: a cathode, an anode, and a nonaqueous electrolytic solution, and the nonaqueous electrolytic solution has a similar configuration to that of the secondary battery-use electrolytic solution according to the foregoing embodiment of the present technology.

Further, a battery pack, an electric vehicle, an electric power storage system, an electric power tool, and an electronic apparatus according to embodiments of the present technology each include a secondary battery, and the secondary battery has a similar configuration to that of the secondary battery according to the foregoing embodiment of the present technology.

According to the secondary battery-use electrolytic solution or the secondary battery of the embodiment of the present technology, the nonaqueous electrolytic solution includes the foregoing configuration, which makes it possible to achieve superior battery characteristics. Moreover, in the battery pack, the electric vehicle, the electric power storage system, the electric power tool, or the electronic apparatus of the embodiment of the present technology, similar effects are achievable. Note that effects described here are non-limiting. Effects achieved by the present technology may be one or more of effects described in the present technology.

BRIEF DESCRIPTION OF DRAWINGS

FIG. 1 is a cross-sectional view of a configuration of a secondary battery (cylindrical type) according to an embodiment of the present technology.

FIG. 2 is an enlarged cross-sectional view of part of a spirally wound electrode body illustrated in FIG. 1.

FIG. 3 is a cross-sectional view for description of a first mode of a position of an insulating material.

FIG. 4 is a cross-sectional view for description of a second mode of the position of the insulating material.

FIG. 5 is a cross-sectional view for description of a third mode of the position of the insulating material.

FIG. 6 is a perspective view of a configuration of another secondary battery (laminated film type) according to an embodiment of the present technology.

FIG. 7 is a cross-sectional view taken along a line VII-VII of a spirally wound electrode body illustrated in FIG. 6.

FIG. 8 is a perspective view of a configuration of an application example (a battery pack: single battery) of the secondary battery.

FIG. 9 is a block diagram illustrating a configuration of the battery back illustrated in FIG. 8.

FIG. 10 is a block diagram illustrating a configuration of an application example (a battery back: assembled battery) of the secondary battery.

FIG. 11 is a block diagram illustrating a configuration of an application example (an electric vehicle) of the secondary battery.

FIG. 12 is a block diagram illustrating a configuration of an application example (an electric power storage system) of the secondary battery.

FIG. 13 is a block diagram illustrating a configuration of an application example (an electric power tool) of the secondary battery.

EMBODIMENTS FOR CARRYING OUT THE INVENTION

In the following, some embodiments of the present technology are described in detail with reference to the drawings. It is to be noted that description is given in the following order.

1. Secondary Battery-use Electrolytic Solution
2. Secondary Battery
  2-1. Lithium-ion Secondary Battery
    2-1-1. Cylindrical Type
    2-1-2. Laminated Film Type
  2-2. Lithium Metal Secondary Battery
3. Applications of Secondary Battery
  3-1. Battery Pack (Single Battery)
  3-2. Battery Pack (Assembled Battery)
  3-3. Electric Vehicle
  3-4. Electric Power Storage System
  3-5. Electric Power Tool (1. Secondary Battery-Use Electrolytic Solution)

First, description is given of a secondary battery-use electrolytic solution (hereinafter simply referred to as "electrolytic solution") of the present technology.

[Composition of Electrolytic Solution]

The electrolytic solution described here may be used for, for example, but not limited to, a secondary battery.

The electrolytic solution includes a first compound having a sulfonylimide structure, a second compound having an acetonitrile structure, and a third compound having an reactive group such as an unsaturated hydrocarbon group all together.

[First Compound]

The first compound contains one or more of compounds represented by a formula (1). The first compound is a salt having a cation ($M^+$) and an anion ($[(Z1Y1)(Z2Y2)N]^-$). Accordingly, it is possible for the first compound to function as part of an electrolyte salt in the secondary battery.

$$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S($=$O)$_2$—) and a carbonyl group (—C($=$O)—).

The kind of M is not particularly limited, as long as M is one of metal elements. Non-limiting examples of M may include an alkali metal element and an alkaline-earth metal element.

In particular, M may be preferably an alkali metal element, which makes it possible to achieve higher energy density. Examples of the alkali metal element may include lithium (Li), sodium (Na), potassium (K), rubidium (Rb), and cesium (Cs). In particular, lithium may be preferable.

The alkali metal element may be preferably the same kind as an electrode reactant. This makes it possible to achieve higher energy density. The electrode reactant is a material associated with electrode reaction, and may be, for example, lithium in a lithium secondary battery. Accordingly, the kind of M (the alkali metal element) used for the lithium secondary battery may be preferably lithium.

The kinds of Z1 and Z2 are not particularly limited, as long as each of Z1 and Z2 is one of a fluorine group, a monovalent hydrocarbon group, and a monovalent fluorinated hydrocarbon group. Z1 and Z2 may be groups of a same kind or groups of different kinds.

The monovalent hydrocarbon group is a generic name for a monovalent group configured of carbon (C) and hydrogen (H), and may have a straight-chain structure or a branched structure with one or more side chains. The monovalent saturated hydrocarbon group may be a saturated hydrocarbon group not having an unsaturated bond, or an unsaturated hydrocarbon group having one or more unsaturated bonds. It is to be noted that the unsaturated bond may be one or both of a carbon-carbon double bond ($>$C$=$C$<$) and a carbon-carbon triple bond (—C$\equiv$C—).

The monovalent hydrocarbon group may be, for example, one of an alkyl group, an alkenyl group, an alkynyl group, a cycloalkyl group, an aryl group, and a group in which two or more kinds thereof are bound to be monovalent. In other words, the monovalent saturated hydrocarbon group may be, for example, an alkyl group, a cycloalkyl group, and a group in which two or more thereof are bound to be monovalent. Non-limiting examples of the monovalent unsaturated hydrocarbon group may include an alkenyl group, an alkynyl group, an aryl group, a group containing one or more kinds thereof, and a group in which two or more kinds thereof are bound to be monovalent.

It is to be noted that non-limiting examples of the group in which the two or more kinds are bound in relation to the monovalent hydrocarbon group may include a group in which an alkyl group and an alkenyl group are bound, a group in which an alkyl group and an alkynyl group are bound, a group in which an alkenyl group and an alkynyl group are bound, a group in which an alkyl group and a cycloalkyl group are bound, and a group in which an alkyl group and an aryl group are bound.

Non-limiting examples of the group in which two or more kinds are bound in relation to the monovalent saturated hydrocarbon group may include a group in which an alkyl group and a cycloalkyl group are bound to be monovalent.

Non-limiting examples of the group containing the one or more kinds in relation to the monovalent unsaturated hydrocarbon group may include a group in which an alkyl group and an alkenyl group are bound to be monovalent. Moreover, non-limiting examples of the group in which the two or more kinds are bound may include a group in which an alkenyl group and an alkynyl group are bound to be monovalent.

Non-limiting specific examples of the alkyl group may include a methyl group (—CH$_3$), an ethyl group (—C$_2$H$_5$), a propyl group (—C$_3$H$_7$), an n-butyl group (—C$_4$H$_8$), and a t-butyl group (—C(CH$_3$)$_2$—CH$_3$). Non-limiting specific examples of the alkenyl group may include a vinyl group (—CH$=$CH$_2$) and an allyl group (—CH$_2$—CH$=$CH$_2$). Non-limiting specific examples of the alkynyl group may include an ethynyl group (—C$\equiv$CH). Non-limiting specific examples of the cycloalkyl group may include a cyclopropyl group, a cyclobutyl group, a cyclopentyl group, a cyclohexyl group, a cycloheptyl group, and a cyclooctyl group. Non-limiting specific examples of the aryl group may include a phenyl group and a naphthyl group. Non-limiting specific examples of the group in which the two or more kinds are bound include a group in which a methyl group and an ethynyl group are bound, a group in which a vinyl group and an ethynyl group are bound, a group in which a methyl group and a cyclopropyl group are bound, and a group in which a methyl group and a phenyl group are bound.

The monovalent fluorinated hydrocarbon group is a group in which one or more hydrogen groups (—H) in the foregoing monovalent hydrocarbon group are substituted by a fluorine group (—F).

Non-limiting examples of the monovalent fluorinated hydrocarbon group may include a fluorinated alkyl group, a fluorinated alkenyl group, a fluorinated alkynyl group, a fluorinated cycloalkyl group, a fluorinated aryl group, and a group in which two or more kinds thereof are bound to be monovalent.

Non-limiting specific examples of the fluorinated alkyl group may include a fluoromethyl group (—$CH_2F$), a difluoromethyl group (—$CHF_2$), a perfluoromethyl group (—$CF_3$), a perfluoroethyl group (—$C_2F_5$), a perfluoropropyl group (—$C_3F_7$), an n-perfluorobutyl group (—$C_4F_8$), and a t-perfluorobutyl group (—$C(CF_3)_2$—$CF_3$). Non-limiting specific examples of the fluorinated alkenyl group may include a perfluorovinyl group (—CF=$CF_2$) and a perfluoroallyl group (—$CF_2$—CF=$CF_2$). Non-limiting specific examples of the fluorinated alkynyl group may include a perfluoroethynyl group (—F≡CF). Non-limiting specific examples of the fluorinated cycloalkyl group may include a perfluorocyclopropyl group, a perfluorocyclobutyl group, a perfluorocyclopentyl group, a perfluorocyclohexyl group, a perfluorocycloheptyl group, and a perfluorocyclooctyl group. Non-limiting specific examples of the fluorinated aryl group may include a perfluorophenyl group and a perfluoronaphthyl group.

In particular, each of the fluorinated alkyl group, the fluorinated alkenyl group, the fluorinated alkynyl group, the fluorinated cycloalkyl group, and the fluorinated aryl group may be preferably a perfluoro group, and a perfluoroalkyl group may be more preferable, which is easily synthesizable, and makes it possible to easily achieve a synergistic effect to be described later.

The number of carbon atoms of each of the monovalent hydrocarbon group and the monovalent fluorinated hydrocarbon group are not particularly limited, but, in particular, it may be preferable that the number of carbon atoms not be extremely too large. This makes it possible to improve solubility, compatibility, and other properties of the first compound. More specifically, the number of carbon atoms in the fluorinated alkyl group may be preferably 1 to 4. The number of carbon atoms in each of the fluorinated alkenyl group and the fluorinated alkynyl group may be preferably 2 to 4. The number of carbon atoms in each of the fluorinated cycloalkyl group and the fluorinated aryl group may be preferably 6 to 12.

However, one or both of Z1 and Z2 are one of the fluorine group and the monovalent fluorinated hydrocarbon group, which is easily synthesizable, and makes it possible to easily achieve a synergistic effect to be described later. Accordingly, in a case in which one of Z1 and Z2 is a monovalent hydrocarbon group, the other is one of a fluorine group and a monovalent fluorinated hydrocarbon group. In other words, Z1 and Z2 are not both monovalent hydrocarbon groups.

The kind of each of Y1 and Y2 are not particularly limited, as long as each of Y1 and Y2 is one of a sulfonyl group and a carbonyl group. Y1 and Y2 may be groups of a same kind or groups of different kinds.

Non-limiting specific examples of the first compound may include lithium bis(fluorosulfonyl)imide ($LiN(FSO_2)_2$), lithium bis(trifluoromethylsulfonyl)imide ($LiN(CF_3SO_2)_2$), lithium (fluorosulfonyl)(trifluoromethylsulfonyl)imide ($LiN(FSO_2)(CF_3SO_2)$), lithium (fluorosulfonyl)(pentafluoroethylsulfonyl)imide ($LiN(FSO_2)(C_2F_5SO_2)$), lithium (fluorosulfonyl)(nonafluorobutylsulfonyl)imide ($LiN(FSO_2)(C_4F_9SO_2)$), lithium (fluorosulfonyl)(phenylsulfonyl)imide ($LiN(FSO_2)(C_6H_5SO_2)$), lithium (fluorosulfonyl)(pentafluorophenylsulfonyl)imide ($LiN(FSO_2)(C_6F_5SO_2)$), and lithium (fluorosulfonyl)(vinylsulfonyl)imide ($LiN(FSO_2)(C_2F_3SO_2)$).

In order to achieve the synergistic effect to be described later, a content of the first compound included in the electrolytic solution together with the second compound and the third compound is necessarily within a specific range. More specifically, the content of the first compound in the electrolytic solution is within a range of 2.5 mol/$dm^3$ to 6 mol/$dm^3$ both inclusive (2.5 mol/l to 6 mol/l both inclusive), and may be preferably within a range of 3 mol/$dm^3$ to 6 mol/$dm^3$ both inclusive (3 mol/l to 6 mol/l both inclusive).

[Second Compound]

The second compound contains one or both of a compound represented by a formula (2) and a compound represented by a formula (3). However, the second compound may contain two or more kinds of the compounds represented by the formula (2). The second compound may contain the compound represented by the formula (3) in a similar manner.

R1-CN (2)

where R1 is a monovalent hydrocarbon group.

R2-X—CN (3)

where R2 is a monovalent hydrocarbon group, and X is a group in which one or more ether bonds (—O—) and one or more divalent hydrocarbon groups are bound in any order.

The compound represented by the formula (1) is a mononitrile compound not having an ether bond (a non-oxygen-containing mononitrile compound). The kind of R1 is not particularly limited, as long as R1 is one of monovalent hydrocarbon groups. Details of the monovalent hydrocarbon groups are as described above.

Non-limiting specific examples of the non-oxygen-containing mononitrile compound may include acetonitrile ($CH_3CN$), propionitrile ($C_3H_7CN$), and butyronitrile ($C_4H_9CN$).

The compound represented by the formula (2) is a mononitrile compound having an ether bond (an oxygen-containing mononitrile compound). The kind of R2 is not particularly limited, as long as R2 is one of monovalent hydrocarbon groups. Details of the monovalent hydrocarbon groups are as described above.

The divalent hydrocarbon group is a generic name of a divalent group configured of carbon and hydrogen, and may have a straight-chain structure or a branched structure with one or more side chains. Non-limiting examples of the divalent hydrocarbon group may include an alkylene group, an alkenylene group, an alkynylene group, a cycloalkylene group, arylene group, and a group in which two or more kinds thereof are bound to be monovalent. It is to be noted that non-limiting examples of the group in which the two or more kinds are bound may include a group in which an alkylene group and an alkenylene group are bound, a group in which an alkyl group and an alkynylene group are bound, a group in which an alkenylene group and an alkynylene group are bound, a group in which an alkylene group and a cycloalkylene group are bound, and a group in which an alkylene group and an arylene group are bound.

Non-limiting specific examples of the alkylene group may include a methylene group (—$CH_2$—), an ethylene group (—$C_2H_4$—), a propylene group (—$C_3H_6$—), an n-butylene group (—$C_4H_8$—), and a t-butylene group (—$C(CH_3)_2$—$CH_2$—). Non-limiting specific examples of the alkenylene group may include a vinylene group (—CH=CH—) and an arylene group (—$CH_2$—CH=CH—). Non-limiting specific examples of the alkynylene group may include an ethynylene group (—C≡C—). Non-limiting specific examples of the cycloalkylene group may include a cyclopropylene group, a cyclobutylene group, a cyclopentylene group, a cyclohexylene group, a cycloheptylene group, and a cyclooctylene group. Non-limiting specific examples of the arylene group may include a phenylene group and a naphthylene group. Non-limiting specific examples of the group in which the two or more kinds are bound may include a group in which a methylene group and an ethynylene group are bound, a group in which a vinylene group and an ethynylene group are bound, a group in which a methylene group and a cyclopropylene group are bound, and a group in which a methylene group and a phenylene group are bound.

The number of carbon atoms in the divalent hydrocarbon group is not particularly limited, but it may be preferable that the number of carbon atoms not be extremely too large. This makes it possible to improve solubility, compatibility, and other properties of the second compound. More specifically, the number of carbon atoms in the alkylene group may be preferably 1 to 4. The number of carbon atoms in each of the alkenylene group and the alkynylene group may be preferably 2 to 4. The number of carbon atoms in each of the cycloalkylene group and the arylene group may be preferably 6 to 12.

The kind of X is not particularly limited, as long as X is a group in which one or more ether bonds and one or more divalent hydrocarbon groups are bound in any order. In other words, the number of ether bonds contained in X may be 1 or more. Similarly, the number of the divalent hydrocarbon groups contained in X may be 1 or more. In a case in which the number of the divalent hydrocarbon groups is 2 or more, the two or more divalent hydrocarbon groups may be groups of a same kind or groups of different kinds. It goes without saying that some of the two or more divalent hydrocarbon groups may be groups of a same kind. Since the ether bonds and the divalent hydrocarbon groups may be bound in any order, the ether bonds may be bound, the divalent hydrocarbon groups may be bound, or the ether bond and the divalent hydrocarbon group may be bound.

In particular, X may be preferably a group represented by —O—Y— (where Y is a divalent hydrocarbon group), which is easily synthesizable, and makes it possible to easily achieve the synergistic effect to be described later. Details of the divalent hydrocarbon group are as described above. However, in X (—O—Y—) described here, an ether bond (—O—) is bound to R2, and Y is bound to a cyano group (—CN).

Non-limiting specific examples of X may include —O—CH$_2$—, —CH$_2$—O—, —O—CH$_2$—O—, and —O—C$_2$H$_5$—.

Non-limiting specific examples of the oxygen-containing mononitrile compound may include methoxyacetonitrile (CH$_3$—O—CH$_2$—CN), ethoxyacetonitrile (C$_2$H$_5$—O—CH$_2$—CN), and propoxyacetonitrile (C$_3$H$_7$—O—CH$_2$—CN).

A content of the second compound in the electrolytic solution is not particularly limited, but may be preferably, for example, within a range of 20 wt % to 100 wt % both inclusive, which makes it possible to easily achieve the synergistic effect to be described later.

It is to be noted that in a case in which the second compound contains both the non-oxygen-containing mononitrile compound and the oxygen-containing mononitrile compound, the foregoing content of the second compound is a total of a content of the non-oxygen-containing mononitrile compound and a content of the oxygen-containing mononitrile compound. Hereinafter, the content means a total content.

[Third Compound]

The third compound contains one or more of an unsaturated cyclic carbonate ester, a halogenated cyclic carbonate ester, and a polynitrile compound. However, the third compound may contain two or more kinds of unsaturated cyclic carbonate esters. Similarly, the third compound may contain two or more kinds of halogenated cyclic carbonate esters or two or more kinds of polynitrile compounds.

The unsaturated cyclic carbonate ester contains one or more of a compound represented by a formula (4), a compound represented by a formula (5), and a compound represented by a formula (6). The unsaturated cyclic carbonate ester is a cyclic carbonate ester having one or more unsaturated bonds (carbo-carbon double bonds).

[Chem. 3]

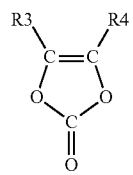

(4)

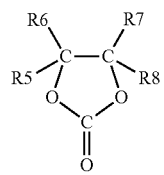

(5)

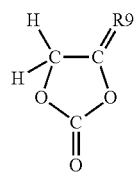

(6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group.

The compound represented by the formula (4) is a vinylene carbonate-based compound. The kind of each of R3 and R4 is not particularly limited, as long as each of R3 and R4 is one of a hydrogen group and a monovalent hydrocarbon group. Details of the monovalent hydrocarbon group are as described above. R3 and R4 may be groups of a same kind or groups of different kinds.

Non-limiting specific examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. In particular, vinylene carbonate may be preferable, which is easily synthesizable.

The compound represented by the formula (5) is a vinyl ethylene carbonate-based compound. The kind of each of R5 to R8 is not particularly limited, as long as each of R5 to R8 is one of a hydrogen group, a monovalent saturated hydrocarbon group, and a monovalent unsaturated hydrocarbon group. Details of the monovalent saturated hydrocarbon group and the monovalent unsaturated hydrocarbon group are as described above. However, one or more of R5 to R8 are the monovalent unsaturated hydrocarbon group, since the vinyl ethylene carbonate-based compound necessarily has one or more unsaturated bonds (carbon-carbon double bonds). R5 to R8 may be groups of a same kind or groups of different kinds. Moreover, some of R5 to R8 may be groups of a same kind.

Non-limiting specific examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate may be preferable, which is easily synthesizable.

The compound represented by the formula (6) is a methylene ethylene carbonate-based compound. The kind of R9 is not particularly limited, as long as R9 is a group represented by >CR10R11. Details of the monovalent hydrocarbon group are as described above. R10 and R11 may be groups of a same kind or groups of different kinds.

Non-limiting specific examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, non-limiting examples of the unsaturated cyclic carbonate ester may include a compound having two methylene groups and a catechol carbonate having a benzene ring. The compound having two methylene groups is a compound having >C=CH$_2$ in place of >C=R9, and >C=CH$_2$ in place of >CH2 in The formula (6).

A content of the unsaturated cyclic carbonate ester in the electrolytic solution is not particularly limited, but may be preferably within a range of 0.01 wt % to 20 wt % both inclusive of a total content of the electrolytic solution excluding the unsaturated cyclic carbonate ester.

The halogenated cyclic carbonate ester contains one or more of a compound represented by a formula (7) and a compound represented by a formula (8). The halogenated carbonate ester is a carbonate ester having one or more halogen groups.

[Chem. 4]

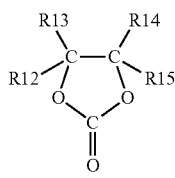

(7)

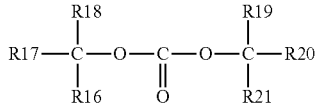

(8)

where each of R12 to R15 is one of a hydrogen group, a halogen group, a monovalent hydrocarbon group, and a monovalent halogenated hydrocarbon group, one or more of R12 to R15 are one of the halogen group and the monovalent halogenated hydrocarbon group, each of R16 to R21 is one of a hydrogen group, a halogen group, a monovalent hydrocarbon group, and a monovalent halogenated hydrocarbon group, and one or more of R16 to R21 are one of the halogen group and the monovalent halogenated hydrocarbon group.

The compound represented by the formula (7) is a halogenated cyclic carbonate ester. The kind of each of R12 to R15 is not particularly limited, as long as each of R12 to R15 is one of a hydrogen group, a halogen group, a monovalent hydrocarbon group, and a monovalent halogenated hydrocarbon group. Details of the monovalent hydrocarbon group are as described above. However, one or more of R12 to R15 are one of the halogen group and the monovalent halogenated hydrocarbon group, since the halogenated cyclic carbonate ester necessarily has one or more halogen groups. R12 to R15 may be groups of a same kind or groups of different kinds. Some of R12 to R15 may be groups of a same kind.

The monovalent halogenated hydrocarbon group is a group in which one or more hydrogen groups in the foregoing monovalent hydrocarbon group are substituted by a halogen group. The kind of the halogen group is not particularly limited, but may be, for example, one of a fluorine group, a chlorine group (—Cl), a bromine group (—Br), and an iodine group (—I). In particular, the fluorine group may be preferable, which is easily synthesizable, and makes it possible to easily achieve the synergistic effect to be described later. It is to be noted that the number of halogen groups may be more preferably 2 than 1, and may be 3 or more, which makes it possible to achieve a higher effect.

Non-limiting examples of the monovalent halogenated hydrocarbon group may include a halogenated alkyl group, a halogenated alkenyl group, a halogenated alkynyl group, a halogenated cycloalkyl group, a halogenated aryl group, and a group in which two or more kinds thereof are bound to be monovalent.

Specific examples of the fluorinated alkyl group, the fluorinated alkenyl group, the fluorinated alkynyl group, the fluorinated cycloalkyl group, and the fluorinated aryl group of the halogenated alkyl group are as described above. Specific examples of a chlorinated alkyl group, a brominated alkyl group, and an iodinated alkyl group are respectively compounds in which the fluorine groups in the foregoing specific examples of the fluorinated alkyl group are replaced by a chlorine group, a bromine group, and an iodine group. A chlorinated alkenyl group, a chlorinated alkynyl group, a chlorinated cycloalkyl group, a chlorinated aryl group, a brominated alkenyl group, a brominated alkynyl group, a brominated cycloalkyl group, a brominated aryl group, an iodinated alkenyl group, an iodinated alkynyl group, an iodinated cycloalkyl group, and an iodinated aryl group are obtained in a similar manner by replacing the fluorine group by the chlorine group, the bromine group, and the iodine group.

Non-limiting specific examples of the halogenated cyclic carbonate ester may include 4-fluoro-1,3-dioxolane-2-one, 4-chloro-1,3-dioxolane-2-one, 4,5-difluoro-1,3-dioxolane-2-one, tetrafluoro-1,3-dioxolane-2-one, 4-chloro-5-fluoro-1,3-dioxolane-2-one, 4,5-dichloro-1,3-oxolane-2-one, tetrachloro-1,3-dioxolane-2-one, 4,5-bistrifluoromethyl-1,3-dioxolane-2-one, 4-trifluoromethyl-1,3-dioxolane-2-one, 4,5-difluoro-4,5-dimethyl-1,3-dioxolane-2-one, 4,4-difluoro-5-methyl-1,3-dioxolane-2-one, 4-ethyl-5,5-difluoro- 1,3-dioxolane-2-one, 4-fluoro-5-trifluoromethyl-1,3-dioxolane-2-one, 4-methyl-5-trifluoromethyl-1,3-dioxolane-2-one, 4-fluoro-4,5-dimethyl-1,3-dioxolane-2-one, 5-(1,1-difluoroethyl)-4,4-difluoro-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. It is to be noted that specific examples of the halogenated cyclic carbonate ester described here may include isomers (a cis-isomer and a trans-isomer).

The compound represented by the formula (8) is a halogenated chain carbonate ester. The kinds of R16 to R21 is not particularly limited, as long as each of R16 to R21 is one of a hydrogen group, a halogen group, a monovalent hydrocarbon group, and a monovalent halogenated hydrocarbon group. Details of the monovalent hydrocarbon group and the monovalent halogenated hydrocarbon group are as described above. However, one or more of R16 to R21 are one of the halogen group and the monovalent halogenated hydrocarbon group for a similar reason to the reason in the foregoing halogenated cyclic carbonate ester. R16 to R21 may be groups of a same kind or groups of different kinds. It goes without saying that some of R16 to R21 may be groups of a same kind.

Non-limiting specific examples of the halogenated chain carbonate ester may include fluoromethyl methyl carbonate, bis(fluoromethyl) carbonate, and difluoromethyl methyl carbonate.

A content of the halogenated cyclic carbonate ester in the electrolytic solution is not particularly limited, but may be preferably within a range of 0.01 wt % to 20 wt % both inclusive of a total content of the electrolytic solution excluding the halogenated cyclic carbonate ester.

The polynitrile compound contains one or more of compounds represented by a formula (9). The polynitrile compound is a compound having two or more nitrile groups, and the foregoing second compound is not encompassed in the polynitrile compound described here, since the second compound does not have two or more nitrile groups.

R22-(CN)$_n$     (9)

where R22 is an n-valent hydrocarbon group, and n is an integer of 2 or more.

The kind of R22 is not particularly limited, as long as R22 is an n-valent hydrocarbon group. For example, in a case in which the number of carbon atoms in R22 is 1, a divalent hydrocarbon group may be —CH$_2$—, and a trivalent hydrocarbon group may be >CH—. Similarly, in a case in which the number of carbon atoms in R22 is 2, the divalent hydrocarbon group may be —CH$_2$—CH$_2$—, and the trivalent hydrocarbon group may be >CH—CH$_2$—.

In particular, R22 may be preferably the divalent hydrocarbon group, since the number of cyano groups (—CN) is 2, which makes it possible to easily achieve the synergistic effect to be described later. Details of the divalent hydrocarbon group are as described above.

Non-limiting specific examples of the polynitrile compound may include malononitrile, succinonitrile, glutaronitrile, adiponitrile, pimelonitrile, suberonitrile, azelanitrile, sebaconitrile, undecanedinitrile, dodecanedinitrile, phthalonitrile, and tetracyanoquinodimethane.

A content of the polynitrile compound in the electrolytic solution is not particularly limited, but may be preferably within a range of 0.01 wt % to 10 wt % both inclusive of a total content of the electrolytic solution excluding the polynitrile compound.

[Reason for Composition of Electrolytic Solution]

The electrolytic solution has the foregoing composition, which makes it possible to achieve the following advantages. In a case in which the electrolytic solution includes the first compound, the second compound, and the third compound all together, and the content of the first compound in the electrolytic solution is within the foregoing range, chemical stability of the electrolytic solution is specifically improved by a synergistic effect of the first compound, the second compound, and the third compound. In particular, whether a specific synergistic effect described here is achieved is dependent on the content of the first compound. The specific synergistic effect is achieved only in a case in which the content of the first compound is within the foregoing range, and is not achieved in a case in which the content of the first compound is out of the foregoing range. This makes it possible to suppress decomposition reaction during charge and discharge; therefore, discharge capacity is less prone to decrease even if charge and discharge are repeated. This makes it possible to improve battery characteristics of the secondary battery.

[Other Materials]

It is to be noted that the electrolytic solution may include one or more kinds of other materials, in addition to the foregoing first compound, the foregoing second compound, and the foregoing third compound.

The other materials may be, for example, one or more of a sulfonate ester, an acid anhydride, a cyclic carboxylate ester (lactone), a dialkyl sulfoxide, a chain dicarbonate ester, an aromatic carbonate ester, a cyclic carbonate ester, a chain monocarbonate ester, a chain carboxylate ester, a phosphate ester, lithium monofluorophosphate (Li$_2$PO$_3$F), and lithium difluorophosphate (LiPO$_2$F$_2$).

[Chem. 5]

(10)

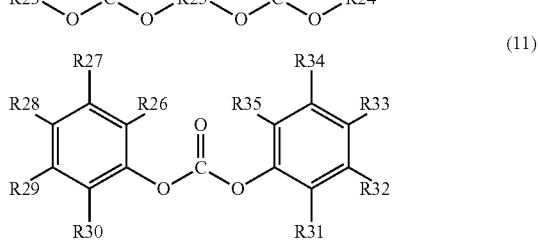

(11)

(12)

(13)

(14)

-continued (15)

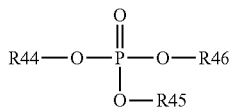

where each of R23 and R24 is one of a monovalent hydrocarbon group and a monovalent halogenated hydrocarbon group, R25 is one of a divalent hydrocarbon group and a divalent halogenated hydrocarbon group, each of R26 to R35 is one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more kinds thereof are bound to be monovalent, each of R36 to R39 is one of a hydrogen group and a monovalent hydrocarbon group, each of R40 and R41 is one of a hydrogen group and a monovalent hydrocarbon group, each of R42 and R43 is one of a hydrogen group and a monovalent hydrocarbon group, and each of R44 to R46 is one of a monovalent hydrocarbon group and a monovalent halogenated hydrocarbon group.

Non-limiting examples of the sulfonate ester may include a monosulfonate ester and a disulfonate ester.

The monosulfonate ester may be a cyclic monosulfonate ester or a chain monosulfonate ester. Non-limiting specific examples of the cyclic monosulfonate ester may include sultones such as propane sultone and propene sultone. Non-limiting specific examples of the chain monosulfonate ester may include a compound having a structure in which a cyclic monosulfonate ester is cleaved at a middle site. Non-limiting examples of a compound in which propane sultone is cleaved at a middle site may include $CH_3$—$CH_2$—$CH_2$—$SO_3$—$CH_3$. Orientation of —$SO_3$—(—$S(=O)_2$—O—) is not particularly limited. More specifically, the foregoing $CH_3$—$CH_2$—$CH_2$—$SO_3$—$CH_3$ may be $CH_3$—$CH_2$—$CH_2$—$S(=O)_2$—O—$CH_3$ or $CH_3$—$CH_2$—$CH_2$—O—$S(=O)_2$—$CH_3$.

The disulfonate ester may be a cyclic disulfonate ester or a chain disulfonate ester. Non-limiting specific examples of the cyclic disulfonate ester may include compounds represented by respective formulas (16-1) to (16-3). The chain disulfonate ester is a compound in which a cyclic disulfonate ester is cleaved at a middle site. Non-limiting examples of a compound in which the compound represented by the formula (16-2) is cleaved at a middle side may include $CH_3$—$SO_3$—$CH_2$—$CH_2$—$SO_3$—$CH_3$. Orientation of two —$SO_3$—(—$S(=O)_2$—O—) is not particularly limited. More specifically, the foregoing $CH_3$—$SO_3$—$CH_2$—$CH_2$—$SO_3$—$CH_3$ may be $CH_3$—$S(=O)_2$—O—$CH_2$—$CH_2$—$S(=O)_2$—O—$CH_3$, $CH_3$—O—$S(=O)_2$—$CH_2$—$CH_2$—$S(=O)_2$—O—$CH_3$, or $CH_3$—$S(=O)_2$—O—$CH_2$—$CH_2$—O—$S(=S(=O)_2$—$CH_3$.

[Chem. 6]

(16-1)

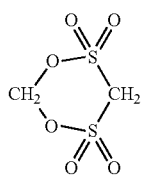

(16-2)

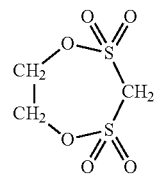

(16-3)

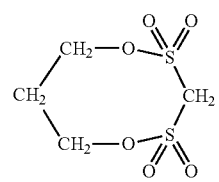

A content of the sulfonate ester in the electrolytic solution is not particularly limited, but may be preferably, for example, within a range of 0.01 wt % to 10 wt % both inclusive of a total content of the electrolytic solution excluding the sulfonate ester.

Non-limiting examples of the acid anhydride may include a carboxylic anhydride, a disulfonic anhydride, and a carboxylic-sulfonic anhydride. Non-limiting specific examples of the carboxylic anhydride may include benzoic anhydride, succinic anhydride, glutaric anhydride, and maleic anhydride. Non-limiting specific examples of the disulfonic anhydride may include ethanedisulfonic anhydride and propanedisulfonic anhydride. Non-limiting specific examples of the carboxylic-sulfonic anhydride may include sulfobenzoic anhydride, sulfopropionic anhydride, and sulfobutyric anhydride.

A content of the acid anhydride in the electrolytic solution is not particularly limited, but may be preferably, for example, within a range of 0.01 wt % to 10 wt % both inclusive of a total content of the electrolytic solution excluding acid anhydride.

Non-limiting examples of the cyclic carboxylate ester may include γ-butyrolactone and γ-valerolactone.

A content of the cyclic carboxylate ester in the electrolytic solution is not particularly limited, but may be preferably, for example, within a range of 0.01 wt % to 10 wt % both inclusive of a total content of the electrolytic solution excluding the cyclic carboxylate ester.

Non-limiting examples of the dialkyl sulfoxide may include dimethyl sulfoxide (($CH_3$)$_2$SO) and diethyl sulfoxide (($C_2H_5$)$_2$SO).

A content of the dialkyl sulfoxide in the electrolytic solution is not particularly limited, but may be preferably, for example, within a range of 0.01 wt % to 10 wt % both inclusive of a total content of the electrolytic solution excluding the dialkyl sulfoxide.

The chain dicarbonate ester may be, for example, one or more of compounds represented by a formula (10). The kind of each of R23 and R24 is not particularly limited, as long as each of R23 and R24 is one of a monovalent hydrocarbon group and a monovalent halogenated hydrocarbon group. R23 and R24 may be groups of a same kind or groups of different kinds. R25 is not specifically limited, as long as R25 is one of a divalent hydrocarbon group and a divalent halogenated hydrocarbon group. Details of the monovalent hydrocarbon group and the monovalent halogenated hydrocarbon group are as described above.

The divalent halogenated hydrocarbon group is a group in which one or more hydrogen groups in the divalent hydrocarbon group are substituted by a halogen group. Details of the divalent hydrocarbon group and the halogen group are as described above. Non-limiting specific examples of the divalent halogenated hydrocarbon group may include a perfluoromethylene group (—$CF_2$—), a perfluoroethylene group (—$C_2F_4$—), a perfluoropropylene group (—$C_3F_6$—), an n-perfluorobutylene group (—$C_4F_8$—), and a t-perfluorobutylene group (—$C(CF_3)_2$—$CF_2$—).

Non-limiting specific examples of the chain dicarbonate ester may include ethane-1,2-diyl dimethyl dicarbonate, ethane-1,2-diyl ethyl methyl dicarbonate, ethane-1,2-diyl diethyl dicarbonate, dimethyl(oxybis(ethane-2,1-diyl)) dicarbonate, ethylmethyl(oxybis(ethane-2,1-diyl)) dicarbonate, and diethyl(oxybis(ethane-2,1-diyl)) dicarbonate.

A content of the chain dicarbonate ester in the electrolytic solution is not particularly limited, but may be preferably within a range of 0.01 wt % to 10 wt % both inclusive of a total content of the electrolytic solution excluding the chain dicarbonate ester.

The aromatic carbonate ester may be, for example, one or more of compounds represented by a formula (11). The kind of each of R26 to R35 is not particularly limited, as long as each of R26 to R35 is a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more kinds thereof are bound to be monovalent. R26 to R35 may be groups of a same kind or groups of different kinds. Some of R26 to R35 may be groups of a same kind. Details of the monovalent hydrocarbon group and the monovalent halogenated hydrocarbon group are as described above.

The monovalent oxygen-containing hydrocarbon group is a generic name for a monovalent group containing carbon, hydrogen, and oxygen (O), and may have a straight-chain structure or a branched structure with one or more side chains. Non-limiting examples of the monovalent oxygen-containing hydrocarbon group may include an alkoxy group. Non-limiting specific examples of the alkoxy group may include a methoxy group (—$OCH_3$), an ethoxy group (—$OC_2H_5$), and a propoxy group (—$OC_3H_7$).

The monovalent nitrogen-containing hydrocarbon group is a generic name for a monovalent group containing carbon, hydrogen, and nitrogen (N), and may have a straight-chain structure or a branched structure with one or more side chains. Non-limiting examples of the monovalent nitrogen-containing hydrocarbon group may include an amino group (—$NH_2$).

The monovalent halogenated oxygen-containing hydrocarbon group is a group in which one or more hydrogen groups in a monovalent oxygen-containing hydrocarbon group is substituted by a halogen group. Details of the monovalent oxygen-containing hydrocarbon group and the halogen group are as described above. Non-limiting specific examples of the monovalent halogenated oxygen-containing hydrocarbon group may include a perfluoromethoxy group (—$OCF_3$—) and a perfluoroethoxy group (—$OC_2F_4$—).

The monovalent halogenated nitrogen-containing hydrocarbon group is a group in which one or more hydrogen groups in a monovalent nitrogen-containing hydrocarbon group are substituted by a halogen group. Details of the monovalent nitrogen-containing hydrocarbon group and the halogen group are as described above. Non-limiting specific examples of the monovalent halogenated nitrogen-containing hydrocarbon group may include a perfluoroamino group (—$NF_2$) and a perfluoromethylamino group (—$CF_2$—$NF_2$).

Non-limiting examples of the group in which the two or more kinds are bound may include a group (an alkylalkoxy group) in which an alkyl group and an alkoxy group are bound to be monovalent, and a group (an alkylamino group) in which an alkyl group and an amino group are bound to be monovalent. Non-limiting specific examples of the alkylalkoxy group may include a methylmethoxy group (—$CH_2$—$OCH_3$). Non-limiting specific examples of the alkylamino group may include a methylamino group (—$CH_2$—$NH_2$).

Non-limiting specific examples of the aromatic carbonate ester may include diphenyl carbonate, bis(4-methylphenyl) carbonate, and bis(pentafluorophenyl) carbonate.

A content of the aromatic carbonate ester in the electrolytic solution is not particularly limited, but may be preferably, for example, within a range of 0.01 wt % to 10 wt % both inclusive of a total content of the electrolytic solution excluding the aromatic carbonate ester.

The cyclic carbonate ester may be, for example, one or more of compounds represented by a formula (12). The kind of each of R36 to R39 is not particularly limited, as long as each of R36 to R39 is one of a hydrogen group and a monovalent hydrocarbon group. R36 to R39 may be groups of a same kind or groups of different kinds. Some of R36 to R39 may be groups of a same kind. Details of the monovalent hydrocarbon group are as described above.

Non-limiting specific examples of the cyclic carbonate ester may include ethylene carbonate, propylene carbonate, and butylene carbonate.

A content of the cyclic carbonate ester in the electrolytic solution is not particularly limited, but may be preferably, for example, within a range of 0.01 wt % to 80 wt % both inclusive.

The chain monocarbonate ester may be, for example, one or more of compounds represented by a formula (13). The kind of each of R40 and R41 is not particularly limited, as long as each of R40 and R41 is one of a hydrogen group and a monovalent hydrocarbon group. R40 and R41 may be groups of a same kind or groups of different kinds. It goes without saying that some of R40 and R41 may be groups of a same kind. Details of the monovalent hydrocarbon group are as described above.

Non-limiting specific examples of the chain monocarbonate ester may include dimethyl carbonate, diethyl carbonate, methylethyl carbonate, and methylpropyl carbonate.

A content of the chain monocarbonate ester in the electrolytic solution is not particularly limited, but may be preferably, for example, within a range of 0.01 wt % to 70 wt % both inclusive.

The chain carboxylate ester may be, for example, one or more of compounds represented by a formula (14). The kind of each of R42 and R43 is not particularly limited, as long as each of R42 and R43 is one of a hydrogen group and a monovalent hydrocarbon group. R42 and R43 may be the same or different from each other. Details of the monovalent hydrocarbon group are as described above.

Non-limiting specific examples of the chain carboxylate ester may include methyl acetate, ethyl acetate, methyl propionate, ethyl propionate, methyl butyrate, methyl isobutyrate, methyl trimethylacetate, and ethyl trimethylacetate.

A content of the chain carboxylate ester in the electrolytic solution is not particularly limited, but may be preferably, for example, within a range of 0.01 wt % to 50 wt % of a total content of the electrolytic solution excluding the chain carboxylate ester.

The phosphate ester may be, for example, one or more of compounds represented by a formula (15). The kind of each of R44 to R46 is not particularly limited, as long as each of R44 to R46 is one of a monovalent hydrocarbon group and a monovalent halogenated hydrocarbon group. R44 to R46 may be groups of a same kind or groups of different kinds. Some of R44 to R46 may be groups of a same kind. Details of the monovalent hydrocarbon group and the monovalent halogenated hydrocarbon group are as described above.

Non-limiting specific examples of the phosphate ester may include trimethyl phosphate, triethyl phosphate, trifluoroethyl phosphate, and tripropyl phosphate.

A content of the phosphate ester in the electrolytic solution is not particularly limited, but may be preferably, for example, within a range of 0.01 wt % to 50 wt % both inclusive of a total content of the electrolytic solution excluding the phosphate ester.

In addition, the other materials may be, for example, one or more of solvents such as a nonaqueous solvent (an organic solvent). The foregoing other materials such as sulfonate ester are excluded from the nonaqueous solvent described here. Non-limiting examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyl oxazolidinone, N,N'-dimethyl imidazolidinone, nitromethane, nitroethane, and sulfolane.

Moreover, the other materials may be, for example, one or more of electrolyte salts such as a lithium salt. The electrolyte salt may contain a salt other than the lithium salt. Non-limiting examples of the salt other than the lithium salt may include a light metal salt other than the lithium salt.

Hereinafter, description is given of the lithium salt as a specific example of the electrolyte salt; however, the lithium salt may be replaced by a salt other than the lithium salt. In other words, for example, lithium hexafluorophosphate to be described below may be replaced by any other light metal salt such as sodium hexafluorophosphate and potassium hexafluorophosphate.

Non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This makes it possible to decrease internal resistance.

In particular, one or more of lithium hexafluorophosphate, lithium tetrafluoroborate, lithium perchlorate, and lithium hexafluoroarsenate may be preferable, which makes it possible to further decrease the internal resistance. In particular, one or both of lithium hexafluorophosphate and lithium tetrafluoroborate may be more preferable, and lithium hexafluorophosphate may be still more preferable.

In addition, the electrolyte salt may be one or more of compounds represented by respective formulas (17) to (19). R51 and R53 may be groups of a same kind or groups of different kinds. The same applies to R61 to R63, and R71 and R72. It goes without saying that two of R61 to R63 may be groups of a same kind.

[Chem. 7]

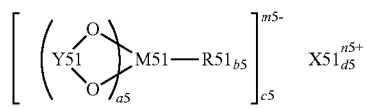

(17)

where X51 is one of Group 1 elements and Group 2 elements in the long form of the periodic table of the elements and Al, M51 is one of transition metals and Group 13 elements, Group 14 elements, and Group 15 elements in the long form of the periodic table of the elements, R51 is a halogen group, Y51 is one of —C(=O)—R52-C(=O)—, —C(=O)—$CR53_2$- and —C(=O)—C(=O)—, R52 is one of an alkylene group, a halogenated alkylene group, an arylene group, and a halogenated arylene group, R53 is one of an alkyl group, a halogenated alkyl group, an aryl group, and a halogenated aryl group, a5 is an integer of 1 to 4, b5 is an integer of 0, 2, or 4, and each of c5, d5, m5, and n5 is an integer of 1 to 3.

[Chem. 8]

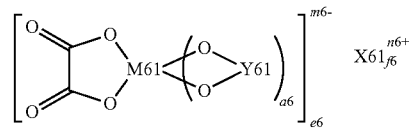

(18)

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Y61 is one of —C(=O)—$(CR61_2)_{b6}$-C(=O)—, —$R63_2$C—$(CR62_2)_{c6}$—C(=O)—, —$R63_2$C—$(CR62_2)_{c6}$—$CR63_2$—, —$R63_2$C—$(CR62_2)_{c6}$—S(=O)$_2$—, —S(=O)$_2$—$(CR62_2)_{d6}$—S(=O)$_2$—, and —C(=O)—$(CR62_2)_{d6}$—S(=O)$_2$—, each of R61 and R63 is one of a hydrogen group, an alkyl group, a halogen group, and a halogenated alkyl group, one or more of R61 is one of the halogen group and the halogenated alkyl group, one or more of R63 are one of the halogen group and the halogenated alkyl group, R62 is one of a hydrogen group, an alkyl group, a halogen group, and a halogenated alkyl group, each of a6, e6, and n6 is an integer of 1 or 2, each of b6 and d6 is an integer of 1 to 4, c6 is an integer of 0 to 4, and each of f6 and m6 is an integer of 1 to 3.

[Chem. 9]

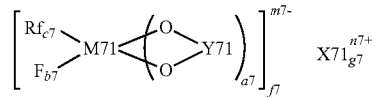

(19)

where X71 is one of Group 1 elements and Group 2 elements in the long form of the periodic table of the elements, M71 is one of transition metals, and Group 13 elements, Group 14 elements, and Group 15 elements in the long form of the periodic table of the elements, Rf is one of a fluorinated alkyl group and a fluorinated aryl group, the number of carbon atoms in each of the fluorinated alkyl group and the fluorinated aryl group is 1 to 10, Y71 is one of —C(=O)—$(CR71_2)_{d7}$—C(=O)—, —$R72_2$C—$(CR71_2)_{d7}$—C(=O)—, —$R72_2$C—$(CR71_2)_{d7}$—$CR72_2$—, —$R72_2$C—$(CR71_2)_{d7}$—S(=O)$_2$—, —S(=O)$_2$—$(CR71_2)_{e7}$—S(=O)$_2$—, and —C(=O)—$(CR71_2)_{e7}$—S(=O)$_2$—, R71 is one of a hydrogen group, an alkyl group, a halogen group, and a halogenated alkyl group, R72 is one of a hydrogen group, an alkyl group, a halogen group, and a halogenated alkyl group, one or more of R72 are one of the halogen group and the halogenated alkyl group, each of a7, f7, and n7 is an integer of 1 or 2, each of b7, c7, and e7 is an integer of 1 to 4, d7 is an integer of 0 to 4, and each of g7 and m7 is an integer of 1 to 3.

It is to be noted that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Non-limiting specific examples of the compound represented by the formula (17) may include compounds represented by respective formulas (17-1) to (17-6). Non-limiting specific examples of the compound represented by the formula (18) may include compounds represented by respective formulas (18-1) to (18-8). Non-limiting specific examples of the compound represented by the formula (19) may include a compound represented by a formula (19-1).

[Chem. 10]

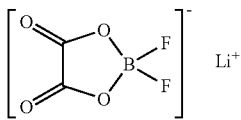
(17-1)

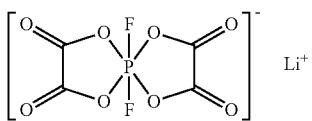
(17-2)

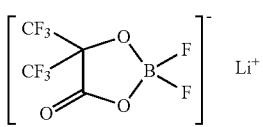
(17-3)

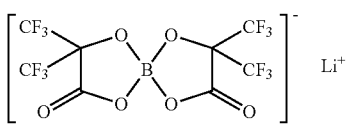
(17-4)

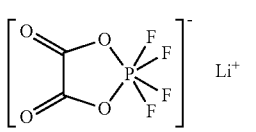
(17-5)

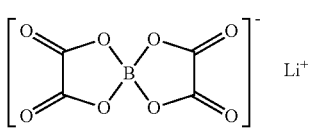
(17-6)

[Chem. 11]

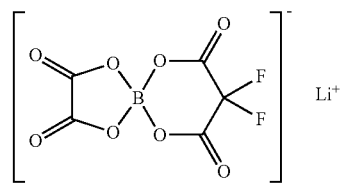
(18-1)

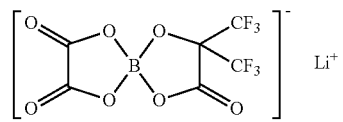
(18-2)

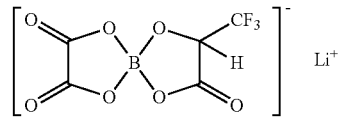
(18-3)

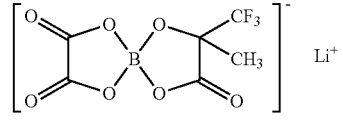
(18-4)

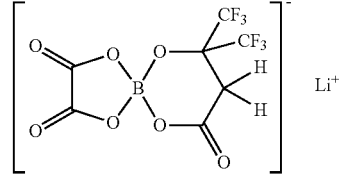
(18-5)

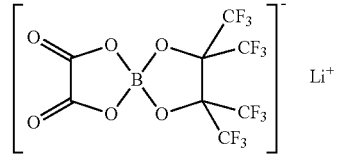
(18-6)

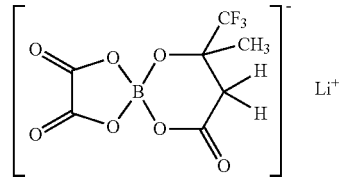
(18-7)

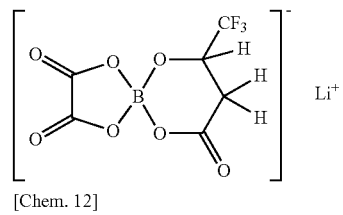
(18-8)

[Chem. 12]

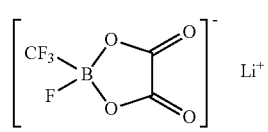
(19-1)

Moreover, the electrolyte salt may be, for example, but not limited to, compounds represented by respective formulas (20) and (21). The values of p, q, and r may be the same as or different from one another. It goes without saying that the values of two of p, q, and r may be the same as each other.

[Chem. 13]

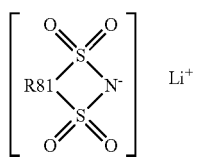
(20)

where R81 is a straight-chain or branched perfluoroalkylene group having 2 to 6 carbon atoms.

$$LiC(C_pF_{2p+1}SO_2)(C_qF_{2q+1}SO_2)(C_rF_{2r+1}SO_2) \quad (21)$$

where each of p, q, and r is an integer of 1 or more.

The compound represented by the formula (20) is a cyclic imide compound. Non-limiting specific examples of the cyclic imide compound may include compounds represented by respective formulas (20-1) to (20-4).

[Chem. 14]

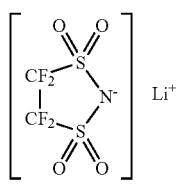
(20-1)

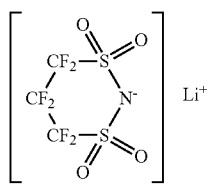
(20-2)

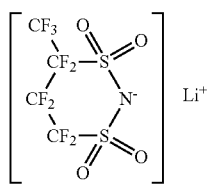
(20-3)

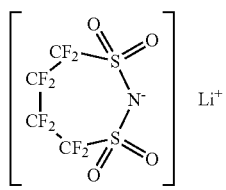
(20-4)

The compound represented by the formula (21) is a chain methide compound. Non-limiting specific examples of the chain methide compound may include lithium tris (trifluoromethanesulfonyl) methide ($LiC(CF_3SO_2)_3$).

A content of the electrolyte salt is not particularly limited; however, in particular, the content of the electrolyte salt may be preferably within a range of 0.3 mol/kg to 3.0 mol/kg both inclusive with respect to the solvent. This makes it possible to achieve high ionic conductivity.

It is to be noted that in a case in which the content of the electrolyte salt is calculated, an amount of the electrolyte salt may include respective amounts of the first compound, lithium monofluorophosphate, and lithium difluorophosphate that are mentioned above. Moreover, an amount of the solvent may include respective amounts of the second compound, the third compound, the sulfonate ester, the acid anhydride, the cyclic carboxylate ester, the dialkyl sulfoxide, the chain dicarbonate ester, the aromatic carbonate ester, the cyclic carbonate ester, the chain monocarbonate ester, the chain carboxylate ester, and the phosphate ester that are mentioned above.

Intrinsic viscosity of the electrolytic solution is not particularly limited, but may be preferably 10 mPa/s or less at 25° C., which makes it possible to secure a dissociation property of the electrolyte salt, ion mobility, and other properties.

[Action and Effects of Electrolytic Solution]

The electrolytic solution includes the first compound, the second compound, and the third compound all together, and the content of the first compound in the electrolyte solution is within a range of 2.5 mol/dm³ to 6 mol/dm³ both inclusive. In this case, chemical stability of the electrolytic solution is specifically improved by the synergistic effect of the first compound, the second compound, and the third compound as described above. This makes it possible to suppress decomposition reaction during charge and discharge. Therefore, discharge capacity is less prone to decrease even if charge and discharge are repeated. This makes it possible to improve battery characteristics of the secondary battery.

In particular, the electrolytic solution containing one or more of the sulfonate ester, the acid anhydride, the cyclic carboxylate ester, the dialkyl sulfoxide, the chain dicarbonate ester, the aromatic carbonate ester, the cyclic carbonate ester, the chain monocarbonate ester, the chain carboxylate ester, the phosphate ester, lithium monofluorophosphate, and lithium difluorophosphate makes it possible to achieve a higher effect.

Moreover, the electrolytic solution containing one or both of lithium hexafluorophosphate and lithium tetrafluoroborate makes it possible to achieve a higher effect.

(2. Secondary Battery)

Next, description is given of a secondary battery using the foregoing electrolytic solution.

(2-1. Lithium-Ion Secondary Battery)

The secondary battery described here may be, for example, a lithium secondary battery (a lithium-ion secondary battery) in which a capacity of an anode 22 is obtained by insertion and extraction of lithium as an electrode reactant.

(2-1-1. Cylindrical Type)

FIG. 1 and FIG. 2 each illustrate a cross-sectional configuration of a secondary battery according to an embodiment of the present technology. FIG. 2 illustrates enlarged part of a spirally wound electrode body 20 illustrated in FIG. 1.

[Whole Configuration of Secondary Battery]

The secondary battery may be, for example, a so-called cylindrical type secondary battery. The secondary battery may contain the spirally wound electrode body 20 and a pair of insulating plates 12 and 13 inside a battery can 11 having a substantially hollow cylindrical shape. In the spirally wound electrode body 20, for example, the cathode 21 and the anode 22 may be stacked with a separator 23 in between and may be spirally wound.

The battery can 11 has a hollow structure in which one end of the battery can 11 is closed and the other end of the battery can 11 is open. The battery can 11 may be made of, for example, one or more of iron (Fe), aluminum (Al), an alloy thereof, or any other material. A surface of the battery can 11 may be plated with, for example, nickel (Ni). The pair of insulating plates 12 and 13 is so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 are swaged with a gasket 17, by which the battery can 11 is hermetically sealed. The battery cover 14 may be made of, for example, a similar material to the material of the battery can 11. Each of the safety valve mechanism 15 and the PTC device 16 is provided on the inner side of the battery cover 14, and the safety valve mechanism 15 is electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with asphalt.

For example, a center pin 24 may be inserted in the center of the spirally wound electrode body 20. However, the center pin 24 may not be inserted in the center of the spirally wound electrode body 20. A cathode lead 25 made of, for example, a conductive material such as aluminum may be coupled to the cathode 21, and an anode lead 26 made of, for example, a conductive material such as nickel may be coupled to the anode 22. The cathode lead 25 may be attached to the safety valve mechanism 15 by, for example, welding, and may be electrically coupled to the battery cover 14. The anode lead 26 may be attached to the battery can 11 by, for example, welding, and may be electrically coupled to the battery can 11.

[Cathode]

The cathode 21 includes a cathode active material layer 21B on a single surface or both surfaces of a cathode current collector 21A. The cathode current collector 21A may be made of, for example, one or more of conductive materials such as aluminum, nickel, and stainless steel.

The cathode active material layer 21B may contain, as a cathode active material, one or more of cathode materials that have ability to insert and extract lithium. It is to be noted that the cathode active material layer 21B may further contain one or more of other materials such as a cathode binder and a cathode conductor.

The cathode material may be preferably a lithium-containing compound. More specifically, the cathode material may be preferably one or both of a lithium-containing composite oxide and a lithium-containing phosphate compound, which makes it possible to achieve high energy density.

The lithium-containing composite oxide is an oxide that contains lithium and one or more elements (hereinafter, referred to as "other elements" that exclude lithium) as constituent elements, and has one of a layered rock-salt crystal structure and a spinel crystal structure. The lithium-containing phosphate compound refers to a phosphate compound that contains lithium and one or more of the other elements as constituent elements, and has an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more metal elements of nickel (Ni), cobalt (Co), manganese (Mn), and iron (Fe), which make it possible to obtain a high voltage.

In particular, the lithium-containing composite oxide having the layered rock-salt crystal structure may be preferably one or more of compounds represented by respective formulas (22) to (24).

$$Li_aMn_{(1-b-c)}Ni_bM11_cO_{(2-d)}Fe \qquad (22)$$

where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy 0.8≤a≤1.2, 0<b<0.5, 0≤c≤0.5, (b+c)<1, −0.1≤d≤0.2, and 0≤e≤0.1, it is to be noted that the composition of lithium varies depending on charge and discharge states, and "a" is a value in a completely-discharged state.

$$Li_aNi_{(1-b)}M12_bO_{(2-c)}F_d \qquad (23)$$

where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy 0.8≤a≤1.2, 0.005≤b≤0.5, −0.1≤c≤0.2, and 0≤d≤0.1, it is to be noted that the composition of lithium varies depending on charge and discharge states, and "a" is a value in a completely-discharged state.

$$Li_aCo_{(1-b)}M13_bO_{(2-c)}F_d \qquad (24)$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy 0.8≤a≤1.2, 0≤b<0.5, −0.1≤c≤0.2, and 0≤d≤0.1, it is to be noted that the composition of lithium varies depending on charge and discharge states, and "a" is a value in a completely-discharged state.

Non-limiting specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

The lithium-containing composite oxide having the spinel crystal structure may be preferably one or more of compounds represented by a formula (25).

$$Li_aMn_{(2-b)}M14_bO_cF_d \qquad (25)$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy 0.9≤a≤1.1, 0≤b≤0.6, 3.7≤c≤4.1, and 0≤d≤0.1, it is to be noted that the composition of lithium varies depending on charge and discharge states, and "a" is a value in a completely-discharged state.

Non-limiting specific examples of the lithium-containing composite oxide having the spinel crystal structure may include LiMn$_2$O$_4$.

The lithium-containing phosphate compound having the olivine crystal structure may be preferably one or more of compounds represented by a formula (26).

$$Li_aM15PO_4 \tag{26}$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies 0.9≤a≤1.1, it is to be noted that the composition of lithium varies depending on charge and discharge states, and "a" is a value in a completely-discharged state.

Non-limiting specific examples of the lithium-containing phosphate compound having the olivine crystal structure may include LiFePO$_4$, LiMnPO$_4$, LiFe$_{0.5}$Mn$_{0.5}$PO$_4$, and LiFe$_{0.3}$Mn$_{0.7}$PO$_4$.

It is to be noted that the lithium-containing composite oxide may be one or more of compounds represented by a formula (27).

$$(Li_2MnO_3)_x(LiMnO_2)_{1-x} \tag{27}$$

where "x" satisfies 0≤x≤1, it is to be noted that the composition of lithium varies depending on charge and discharge states, and "x" has a value in a completely-discharged state.

In addition, the cathode material may be, for example, one or more of an oxide, a disulfide, a chalcogenide, and a conductive polymer. Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer may include sulfur, polyaniline, and polythiophene. However, the cathode material may be a material other than the foregoing materials.

The cathode binder may contain, for example, one or more of synthetic rubbers and polymer materials. Non-limiting examples of the synthetic rubbers may include a styrene-butadiene-based rubber, a fluorine-based rubber, and ethylene propylene diene. Non-limiting examples of the polymer materials may include polyvinylidene fluoride and polyimide.

The cathode conductor may contain, for example, one or more of carbon materials. Non-limiting examples of the carbon materials may include graphite, carbon black, acetylene black, and Ketjen black. It is to be noted that the cathode conductor may be a metal material, a conductive polymer, or any other material, as long as the cathode conductor is a material having conductivity.

[Anode]

The anode 22 includes an anode active material layer 22B on a single surface or both surfaces of an anode current collector 22A.

The anode current collector 22A may be made of, for example, one or more of conductive materials such as copper, nickel, and stainless steel. A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Non-limiting examples of a roughening method may include a method of forming fine particles with use of electrolytic treatment. Through the electrolytic treatment, the fine particles are formed on the surface of the anode current collector 22A in an electrolytic bath by an electrolytic method to make the surface of the anode current collector 22A rough. A copper foil fabricated by the electrolytic method is generally called "electrolytic copper foil."

The anode active material layer 22B contains, as an anode active material, one or more of anode materials that have ability to insert and extract lithium. The anode active material layer 22B may further contain one or more of other materials such as an anode binder and an anode conductor. It is to be noted that details of the anode binder and the anode conductor may be, for example, similar to those of the cathode binder and the cathode conductor, respectively.

In order to prevent lithium from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21. It is to be noted that lithium precipitated on the anode 22 may be lithium metal, for example, in a case in which the electrode reactant is lithium.

The anode material may be, for example, one or more of carbon materials. The carbon material causes an extremely small change in a crystal structure thereof during insertion and extraction of lithium, which stably achieves high energy density. Further, the carbon material also serves as an anode conductor, which improves conductivity of the anode active material layer 22B.

Non-limiting examples of the carbon material may include graphitizable carbon, nongraphitizable carbon, and graphite. It is to be noted that a spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a material that is obtained by firing (carbonizing) a polymer compound such as phenol resin and furan resin at an appropriate temperature. Other than the materials mentioned above, the carbon material may be low crystalline carbon that is subjected to heat treatment at a temperature of about 1000° C. or lower, or may be amorphous carbon. It is to be noted that a shape of the carbon material may be any of a fibrous shape, a spherical shape, a granular shape, and a scale-like shape.

Moreover, the anode material may be, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain a nonmetallic element. Non-limiting examples of a structure of the metal-based material may include a solid solution, a eutectic crystal (a eutectic mixture), an intermetallic compound, and a structure in which two or more thereof coexist.

The metal elements and the metalloid elements mentioned above may be, for example, one or more of metal elements and metalloid elements that are able to form an alloy with lithium. Non-limiting specific examples thereof may include magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. Note that the "simple substance" described here merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen as constituent elements other than silicon. It is to be noted that the compound of silicon may contain, for example, one or more of the elements described related to the alloy of silicon, as constituent elements other than silicon.

Non-limiting specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. Note that "v" in $SiO_v$ may be in a range of $0.2<v<1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Non-limiting specific examples of the alloy of tin and the compound of tin may include $SnO_w$ ($0<w\leq2$), $SnSiO_3$, LiSnO, and $Mg_2Sn$.

In particular, the material that contains tin (a first constituent element) as a constituent element may be preferably, for example, a material that contains, together with tin, a second constituent element and a third constituent element. The second constituent element may be, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum (Ta), tungsten (W), bismuth, and silicon. The third constituent element may be, for example, one or more of elements such as boron, carbon, aluminum, and phosphorus (P). Containing the second constituent element and the third constituent element makes it possible to achieve, for example, but not limited to, high battery capacity and superior cycle characteristics.

In particular, a material (a SnCoC-containing material) that contains tin, cobalt, and carbon as constituent elements may be preferable. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle $2\theta$) of a diffraction peak obtained by X-ray diffraction of this reaction phase may be preferably 1° or larger in a case in which a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta$ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to a metal element or a metalloid element that is another constituent element thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case in which part or all of carbon is bound to a metal element, a metalloid element, or another element, a peak of a synthetic wave of 1s orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case in which a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case in which the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be, for example, one or more of a metal oxide, and a polymer compound. Non-limiting examples of the metal oxide may include iron oxide, ruthenium oxide, and molybdenum oxide. Non-limiting examples of the polymer compound may include polyacetylene, polyaniline, and polypyrrole.

In particular, the anode material may preferably contain both the carbon material and the metal-based material for the following reason.

The metal-based material, in particular, the material containing one or both of silicon and tin as constituent elements has a concern that such a material is easily and radically expanded or contracted when the secondary battery is charged or discharged, whereas such a material has an advantage of high theoretical capacity. In contrast, the carbon material has an advantage that the carbon material is less likely to be expanded or contracted when the secondary battery is charged or discharged, whereas the carbon material has a concern of low theoretical capacity. Hence, using both the carbon material and the metal-based material makes it possible to suppress expansion and contraction during charge and discharge of the secondary battery while achieving high theoretical capacity (in other words, high battery capacity).

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in a solvent such as an organic solvent, and the resultant is applied onto the anode current collector 22A. Non-limiting examples of the vapor-phase method may include a physical deposition method and a chemical deposition method. More specifically, non-limiting examples thereof may include a vacuum evaporation method, a sputtering method, an ion plating method, a laser ablation method, a thermal chemical vapor deposition method, a chemical vapor deposition (CVD) method, and a plasma chemical vapor deposition method. Non-limiting examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in the solvent is applied onto the anode current collector 22A by the coating method, the resultant is subjected to heat treatment at a temperature higher than a melting point of, for example, the anode binder. For example, one or more of an atmosphere firing method, a reactive firing method, a hot press firing method, and other firing methods may be employed as the firing method.

In the secondary battery, in order to prevent lithium metal from being unintentionally precipitated on the anode 22 in the middle of charge, electrochemical equivalent of the anode material that has ability to insert and extract lithium is larger than electrochemical equivalent of the cathode, as described above. Moreover, in a case in which an open circuit voltage (that is, a battery voltage) in a completely-charged state is 4.25 V or higher, an extraction amount of lithium per unit mass is larger than that in a case in which the open circuit voltage is 4.2 V, even if the same cathode active material is used. Hence, amounts of the cathode active material and the anode active material are adjusted in accordance therewith. As a result, high energy density is achieved.

[Separator]

The separator 23 separates the cathode 21 from the anode 22, and passes lithium ions therethrough while preventing current short circuit that results from contact between the cathode 21 and the anode 22. The separator 23 may be, for example, a porous film that is made of, for example, a synthetic resin or ceramics. The separator 23 may be a laminated film in which two or more porous films are laminated. Non-limiting examples of the synthetic resin may include polytetrafluoroethylene, polypropylene, and polyethylene.

[Electrolytic Solution]

The spirally wound electrode body 20 is impregnated with the electrolytic solution that is a liquid electrolyte. The electrolytic solution has a similar configuration to that of the foregoing electrolytic solution of the present technology.

[Insulating Material]

The secondary battery may include an insulating material somewhere in a region between the cathode active material contained in the cathode 21 and the anode active material contained in the anode 22 (a region between active materials).

A position where the insulating material is disposed is not particularly limited, as long as the insulating material is disposed somewhere in the foregoing region between active materials. Accordingly, the insulating material may exist in the cathode 21 (in the cathode active material layer 21B), may exist in the anode 22 (in the anode active material layer 22B), or may exist between the cathode 21 and the anode 22. To give an example, three modes may be considered as the position where the insulating material is disposed as will be described below, for example.

FIGS. 3 to 5 are diagrams for description of the three modes of the position of the insulating material, and FIGS. 4 and 5 each illustrate a cross-sectional configuration corresponding to FIG. 2.

In a first mode, for example, the cathode active material layer 21B contains a particulate cathode active material 211, and a layer containing the insulating material (an active material insulating layer 212 as a first insulating layer) is provided on a surface of the cathode active material 211 as described in FIGS. 2 and 3.

Part or entirety of the surface of the cathode active material 211 may be coated with the active material insulating layer 212. In a case in which part of the surface of the cathode active material 211 is coated with the active material insulating layer 212, a plurality of active material insulating layers 212 that are separated from one another may exist.

It is to be noted that in a case in which the cathode active material layer 21B contains a plurality of cathode active materials 211, the active material insulating layer 212 may be provided on some or all of the plurality of cathode active materials 211. Moreover, the active material insulating layer 212 may be configured of a single layer, or may be configured of multiple layers.

The active material insulating layer 212 contains one or more kinds of insulating materials. The insulating material may be an inorganic insulating material such as insulating ceramics or an organic insulating material such as an insulating polymer compound. It goes without saying that the active material insulating layer 212 may contain both the inorganic insulating material and the organic insulating material.

Non-limiting specific examples of the insulating ceramics may include aluminum oxide ($Al_2O_3$), silicon oxide ($SiO_2$), magnesium oxide (MgO), titanium oxide ($TiO_2$), and zirconium oxide ($ZrO_2$). In addition, non-limiting specific examples of the insulating ceramics may include $LiNbO_3$, LIPON ($Li_{3+y}PO_{4-x}N_x$), a material called LISICON (Lithium-Super-Ion-CONductor), Thio-LISICON (for example, $Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ (LATP). It is to be noted that x and y in the composition of the foregoing LIPON may satisfy $0.5 \le x \le 1$ and $-0.3 < y < 0.3$, for example.

Non-limiting specific examples of the insulating polymer compound may be similar to the formation materials of the foregoing cathode binder and the foregoing anode binder. In particular, one or both of a homopolymer of vinylidene fluoride and a copolymer of vinylidene fluoride may be preferable, since they are superior in physical strength and are electrochemically stable. The homopolymer of vinylidene fluoride is polyvinylidene fluoride. Non-limiting examples of the copolymer of vinylidene fluoride may include a copolymer of vinylidene fluoride and hexafluoropropylene. Note that a monomer copolymerized with vinylidene fluoride may be a monomer other than hexafluoropropylene.

In a second mode, for example, a layer containing the insulating material (an anode insulating layer 213 as a second insulating layer) is provided on a surface of the anode 22 (the anode active material layer 22B) as described in FIGS. 2 and 4. It is to be noted that details of a coating state, a layer configuration, a formation material of the anode insulating layer 213 are similar to those of the foregoing active material insulating layer 212.

In this case, in particular, in a case in which the anode insulating layer 213 contains the insulating polymer compound, adhesibility of the separator 23 with respect to the anode 22 is improved, thereby suppressing deformation of the spirally wound electrode body 20. This makes it possible to suppress decomposition reaction of the electrolytic solution and leakage of the electrolytic solution contained in the separator 23. Accordingly, resistance is less prone to increase even if charge and discharge are repeated, and the secondary battery is less prone to be expanded.

In a third mode, for example, a layer containing the insulating material (a separator insulating layer 214 as a third insulating layer) is provided on a surface of the separator 23 as illustrated in FIGS. 2 and 5. The separator insulating layer 214 may be provided on one or both of a surface facing the cathode 21 and a surface facing the anode 22 of the separator 23. It is to be noted that details of a coating state, a layer configuration, a formation material of the separator insulating layer 214 are similar to those of the foregoing active material insulating layer 212.

In this case, in particular, in a case in which the separator insulating layer 214 contains the insulating polymer compound, adhesibility of the separator 23 with respect to each of the cathode 21 and the anode 22 is improved. This makes it possible to achieve a similar advantage to that in the case in which the foregoing anode insulating layer 213 contains the polymer compound.

Disposing the insulating material somewhere in the region between active materials allows for compatibility between battery characteristics and safety. More specifically, in a case in which the insulating material is disposed in the region between active materials, the secondary battery becomes resistant to abnormality such as thermal runaway that occurs inside; therefore, safety is improved. Further, in a case in which the electrolytic solution contains the first compound, reaction with the first compound makes a surface state of the insulating material appropriate. Accordingly, even if the insulating material exists in the region between active materials, lithium ions smoothly move; therefore, battery characteristics are secured. This makes it possible to improve safety while securing the battery characteristics.

It is to be noted that a mechanism that makes the surface state of the insulating material appropriate is considered as follows. In a case in which the insulating material contains insulating ceramics such as aluminum oxide, there is a tendency that lithium ions are hard to move due to a hydroxyl group (—OH) existing on surfaces of particles of the insulating material. However, in a case in which the electrolytic solution contains the first compound, the first compound reacts with the insulating material to form, on the surface of the insulating material, a coating film that is less prone to block movement of lithium ions. In this case, for example, in a case in which the first compound has a $SO_2$—F bond, the $SO_2$—F bond reacts with the hydroxyl group to form a favorable coating film having a F—$SO_2$—N—$SO_2$—O— bond on surfaces of ceramic particles. The coating film changes the surface state of the ceramics so that the ceramics are less prone to block movement of lithium ions.

[Operation of Secondary Battery]

The secondary battery may operate as follows, for example.

When the secondary battery is charged, lithium ions are extracted from the cathode 21, and the extracted lithium ions are inserted in the anode 22 through the electrolytic solution. In contrast, when the secondary battery is discharged, lithium ions are extracted from the anode 22, and the extracted lithium ions are inserted in the cathode 21 through the electrolytic solution.

It is to be noted that the secondary battery may be designed so that an open circuit voltage (that is, a battery voltage) in a completely-charged state may be, for example, from 4.2 V to 6 V both inclusive, preferably from 4.25 V to 6 V both inclusive, and more preferably from 4.3 V to 4.55 V both inclusive. In this case, an extraction amount of lithium per unit mass is larger than that in a case in which the open circuit voltage in a completely-charged state is designed to be 4.2 V, even if the same cathode active material is used. Hence, amounts of the cathode active material and the anode active material are adjusted in accordance therewith. As a result, high energy density is achieved.

[Method of Manufacturing Secondary Battery]

The secondary battery may be manufactured by the following procedure, for example.

When fabricating the cathode 21, first, the cathode active material, and, on as-necessary basis, for example, the cathode binder and the cathode conductor are mixed to obtain a cathode mixture. Subsequently, the cathode mixture is dispersed in, for example, an organic solvent to obtain paste cathode mixture slurry. Next, the cathode mixture slurry is applied onto both surfaces of the cathode current collector 21A, and thereafter, the applied cathode mixture slurry is dried to form the cathode active material layers 21B. Thereafter, the cathode active material layers 21B is compression-molded with use of, for example, a roll pressing machine, while being heated on as-necessary basis. In this case, the cathode active material layer 21B may be compression-molded a plurality of times.

It is to be noted that a procedure of forming the active material insulating layer 212 on the surface of the cathode active material 211 may be as follows, for example. A case in which the active material insulating layer 212 contains the insulating ceramics is described here as an example.

When forming the active material insulating layer 212, particles of the cathode active material 211 and particles of the insulating ceramics are mixed. Subsequently, a resultant mixture is pulverized and mixed with use of one or more of a ball mill, a jet mill, a grinding mixer, and a pulverizer. In this case, for example, a dispersion medium such as water or a solvent may be added to the mixture. Thus, the surface of the cathode active material 211 is coated with the insulating ceramics, and the active material insulating layer 212 is thereby formed.

In addition, coating with the insulating ceramics may be performed with use of mechanochemical treatment such as mechanofusion. Moreover, the insulating ceramics may be deposited on the surface of the cathode active material 211 with use of a vapor-phase method such as a sputtering method and a chemical-vapor deposition (CVD) method. Further, a sol-gel method may be employed. In this case, the cathode active material 211 is immersed in an alkoxide solution containing, for example, aluminum and silicon to coat the surface of the cathode active material 211 with a precursor layer, and thereafter, the precursor layer is fired.

When fabricating the anode 22, the anode active material layer 22B is formed on the anode current collector 22A by a similar procedure to the foregoing procedure of fabricating the cathode 21. More specifically, the anode active material, and, on as-necessary basis, for example, the anode-cathode binder and the anode conductor are mixed to obtain an anode mixture. Subsequently, the anode mixture is dispersed in, for example, an organic solvent to obtain paste anode mixture slurry. Next, the anode mixture slurry is applied onto both surfaces of the anode current collector 22A, and thereafter, the applied anode mixture slurry is dried to form the anode active material layer 22B. Lastly, the anode active material layer 22B is compression-molded with use of, for example, a roll pressing machine.

It is to be noted that a procedure of forming the anode insulating layer 213 on the surface of the anode active material layer 22B may be as follows, for example. A case in which the anode insulating layer 213 contains the insulating ceramics and the insulating polymer compound is described here as an example.

When forming the anode insulating layer 213, particles of the insulating ceramics, the insulating polymer compound, and a solvent such as N-methyl-2-pyrrolidone are mixed, and the particles of the insulating ceramics are dispersed in the solvent, and the insulating polymer compound is dissolved in the solvent. Subsequently, the anode 22 is immersed in a resultant mixed liquid, and thereafter, the anode 22 is taken out of the mixed liquid, and is dried. This causes the solvent in the mixed liquid to be volatilized, and causes formation of a film of the insulating polymer compound. Accordingly, the anode insulating layer 213 is formed on the surface of the anode active material layer 22B. In this case, the anode 22 may be pressurized before being dried to adjust a thickness of the anode insulating layer 213. It is to be noted that instead of immersing the anode 22 in the mixed liquid, the mixed liquid may be applied to the surface of the anode active material layer 22B.

When preparing the electrolytic solution, the first compound, the second compound, and the third compound, and, on as-necessary basis, a nonaqueous solvent and an electrolyte salt are mixed, and a resultant mixture is stirred.

When assembling the secondary battery with use of the cathode 21 and the anode 22, the cathode lead 25 is attached to the cathode current collector 21A by, for example, a welding method, and the anode lead 26 is attached to the anode current collector 22A by, for example, a welding method. Subsequently, the cathode 21 and the anode 22 are stacked with the separator 23 in between, and the resultant stacked body is spirally wound to form the spirally wound electrode body 20. Thereafter, the center pin 24 is inserted in the center of the spirally wound electrode body 20. Subsequently, the spirally wound electrode body 20 is sandwiched between the pair of insulating plates 12 and 13, and is contained inside the battery can 11. In this case, an end tip of the cathode lead 25 is attached to the safety valve mechanism 15 by, for example, a welding method, and an end tip of the anode lead 26 is attached to the battery can 11 by, for example, a welding method. Subsequently, the electrolytic solution is injected inside the battery can 11, and the separator 23 is impregnated with the injected electrolytic solution. Thereafter, the battery cover 14, the safety valve mechanism 15, and the PTC device 16 are swaged with the gasket 17 at the open end of the battery can 11.

It is to be noted that a procedure of forming the separator insulating layer 213 on the surface of the separator 23B may be similar to the foregoing procedure of forming the anode insulating layer 213, for example. In a case in which the separator insulating layer 214 contains only the insulating polymer compound, it is only necessary to use a similar procedure to that in the case in which the insulating insulating layer 214 contains the insulating ceramics and the insulating polymer compound, except that the particles of the insulating ceramics are not used.

[Action and Effects of Secondary Battery]

According to the cylindrical secondary battery, the electrolytic solution has a similar configuration to that of the foregoing electrolytic solution of the present technology. This makes it possible to suppress decomposition reaction during charge and discharge; therefore, discharge capacity is less prone to decrease even if charge and discharge are repeated. This makes it possible to achieve superior battery characteristics.

In particular, when the insulating material is disposed in the region between active materials, abnormality such as thermal runaway is less prone to occur without blocking movement of lithium ions. This makes the battery characteristics and safety compatible.

Action and effects other than those described above are similar to those of the electrolytic solution of the present technology.

(2-1-2. Laminated Film Type)

FIG. 6 illustrates a perspective exploded configuration of another secondary battery according to an embodiment of the present technology. FIG. 7 illustrates an enlarged cross-sectional view taken along a line VII-VII of a spirally wound electrode body 30 illustrated in FIG. 3. In description below, the components of the cylindrical type secondary battery that have been already described are used where appropriate.

[Whole Configuration of Secondary Battery]

The secondary battery described below may be, for example, a lithium-ion secondary battery having a so-called laminated film type battery structure.

In the secondary battery, for example, the spirally wound electrode body 30 may be contained inside a film-like outer package member 40 as illustrated in FIG. 6. In the spirally wound electrode body 30, a cathode 33 and an anode 34 may be stacked with a separator 35 and an electrolyte layer 36 in between, and the resultant stacked body may be spirally wound. A cathode lead 31 is attached to the cathode 33, and an anode lead 32 is attached to the anode 34. An outermost periphery of the spirally wound electrode body 30 is protected by a protective tape 37.

Each of the cathode lead 31 and the anode lead 32 may be led out from inside to outside of the outer package member 40 in a same direction, for example. The cathode lead 31 may be made of, for example, one or more of conductive materials such as aluminum. The anode lead 32 may be made of, for example, one or more of conductive materials such as copper, nickel, and stainless steel. These conductive materials may have a thin-plate shape or a mesh shape, for example.

The outer package member 40 may be, for example, one film that is foldable in a direction of an arrow R illustrated in FIG. 6, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 is folded so that portions of the fusion-bonding layer face each other with the spirally wound electrode body 30 in between, and thereafter outer edges of the portions of the fusion bonding layer are fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal foils. The surface protective layer may be, for example, a film made of one or more of nylon, polyethylene terephthalate, and other materials.

In particular, the outer package member 40 may preferably be an aluminum laminated film in which a polyethylene film, an aluminum foil, and a nylon film are laminated in this order. However, the outer package member 40 may be a laminated film having other any laminated structure, a polymer film such as polypropylene, or a metal film.

An adhesive film 41 for prevention of outside air intrusion may be inserted between the outer package member 40 and the cathode lead 31, and the adhesive film 41 is also inserted between the outer package member 40 and the anode lead 32. The adhesive film 41 is made of a material having adhesibility with respect to the cathode lead 31 and the anode lead 32. Non-limiting examples of the material having adhesibility may include a polyolefin resin. More specific examples thereof may include one or more of polyethylene, polypropylene, modified polyethylene, and modified polypropylene.

[Cathode, Anode, and Separator]

As illustrated in FIG. 7, the cathode 33 may include, for example, a cathode active material layer 33B on a single surface or both surfaces of a cathode current collector 33A. The anode 34 may include, for example, an anode active material layer 34B on a single surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. The configuration of the separator 35 is similar to the configuration of the separator 23.

[Electrolyte Layer]

The electrolyte layer 36 includes an electrolytic solution and a holding polymer compound. The electrolytic solution is held by the holding polymer compound. The electrolyte layer 36 is a so-called gel electrolyte. The gel electrolyte achieves high ionic conductivity (for example, 1 mS/cm or more at room temperature), and prevents liquid leakage of the electrolytic solution. The electrolyte layer 36 may further include any other material such as an additive.

The holding polymer material may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the holding polymer material may be a copolymer. The copolymer may be, for example, a copolymer of vinylidene fluoride and hexafluoropylene. In particular, polyvinylidene fluoride may be preferable as a homopolymer, and a copolymer of vinylidene fluoride and hexafluoropylene may be preferable as a copolymer. Such polymer compounds are electrochemically stable.

For example, the composition of the electrolytic solution may be similar to the composition of the electrolytic solution used in the cylindrical type secondary battery. However, in the electrolyte layer 36 that is a gel electrolyte, the solvent contained in the electrolytic solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

It is to be noted that the electrolytic solution may be used as it is instead of the gel electrolyte layer 36. In this case, the spirally wound electrode body 30 is impregnated with the electrolytic solution.

[Insulating Material]

For example, even the secondary battery may include an insulating material somewhere in a region between the cathode active material contained in the cathode 33 and the anode active material contained in the anode 22 (a region between active materials), as illustrated in FIG. 2. Details of the modes of the position of the insulating material (the active material insulating layer 212, the anode insulating layer 213, and the separator insulating layer 214) have been already described, and will not be further described. It is to be noted that illustration of the electrolyte layer 36 is omitted from FIG. 2.

In addition, in the secondary battery described here, the electrolyte layer 36 existing in the region between active materials may contain the insulating material. More specifically, the electrolyte layer 36 may contain one or more of inorganic insulating materials such as insulating ceramics as the insulating material together with the foregoing electrolytic solution and the foregoing holding polymer compound. Details of the inorganic insulating material are as described above. Even in this case, the battery characteristics and safety are compatible.

[Operation of Secondary Battery]

The secondary battery may operate, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures. It is to be noted that in the followings, a procedure of forming the insulating layers 212 to 214 are omitted.

In a first procedure, the cathode 33 and the anode 34 are fabricated by a similar fabrication procedure to that of the cathode 21 and the anode 22. More specifically, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, for example, the electrolytic solution, the polymer compound, and a solvent are mixed to prepare a sol precursor solution. Non-limiting examples of the solvent may include an organic solvent. Subsequently, the cathode 33 and the anode 34 are coated with the precursor solution, and the precursor solution is dried to form the gel electrolyte layer 36. It is to be noted that in a case in which the electrolyte layer 36 contains the insulating material, when the sol precursor solution is prepared, for example, the insulating material may be mixed together with the electrolytic solution, the polymer compound, and the solvent. Subsequently, the cathode lead 31 is attached to the cathode current collector 33A by, for example, a welding method, and the anode lead 32 is attached to the anode current collector 34A by, for example, a welding method. Subsequently, the cathode 33 and the anode 34 are stacked with the separator 35 in between and are spirally wound to fabricate the spirally wound electrode body 30. Thereafter, the protective tape 37 is attached onto the outermost periphery of the spirally wound body 30. Subsequently, the outer package member 40 is folded to interpose the spirally wound electrode body 30, and thereafter, the outer edges of the outer package member 40 are bonded by, for example, a thermal fusion bonding method to enclose the spirally wound electrode body 30 in the outer package member 59. In this case, the adhesive films 41 are inserted between the cathode lead 31 and the outer package member 40 and between the anode lead 32 and the outer package member 40.

In a second procedure, the cathode lead 31 is attached to the cathode 33, and the anode lead 32 is attached to the anode 34. Subsequently, the cathode 33 and the anode 34 are stacked with the separator 35 in between and are spirally wound to fabricate a spirally wound body as a precursor of the spirally wound electrode body 30. Thereafter, the protective tape 37 is adhered to the outermost periphery of the spirally wound body. Subsequently, the outer package member 40 is folded to interpose the spirally wound electrode body 30, and thereafter, the outer edges other than one side of the outer package member 40 are bonded by, for example, a thermal fusion bonding method, and the spirally wound body is contained inside a pouch formed of the outer package member 40. Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package member 40. Thereafter, the pouch formed of the outer package member 40 is hermetically sealed by, for example, a thermal fusion bonding method. Subsequently, the monomers are thermally polymerized to form the polymer compound. The gel electrolyte layer 36 is thereby formed.

In a third procedure, the spirally wound body is fabricated and contained inside the pouch formed of the outer package member 40 in a similar manner to that of the second procedure described above, except that the separator 35 with both surfaces coated with a polymer compound is used. Non-limiting examples of the polymer compound with which the separator 35 is coated may include a polymer (a homopolymer, a copolymer, or a multicomponent copolymer) containing vinylidene fluoride as a component. Non-limiting specific examples of the polymer compound may include polyvinylidene fluoride, a binary copolymer containing vinylidene fluoride and hexafluoropropylene as components, and a ternary copolymer containing vinylidene fluoride, hexafluoropropylene, and chlorotrifluoroethylene as components. It is to be noted that, one or more of other polymer compounds may be used together with the polymer containing vinylidene fluoride as a component. Subsequently, the electrolytic solution is prepared and injected inside the pouch formed of the outer package member 40. Thereafter, an opening of the pouch formed of the outer package member 40 is hermetically sealed by, for example, a thermal fusion bonding method. Subsequently, the resultant is heated while a weight is applied to the outer package member 40 to allow the separator 35 to be closely attached to the cathode 33 with the polymer compound in between and allow the separator 35 to be closely attached to the anode 34 with the polymer compound in between. Thus, the polymer compound is impregnated with the electrolytic solution, and the polymer compound is gelated. The electrolyte layer 36 is thereby formed.

In the third procedure, swollenness of the secondary battery is suppressed more than in the first procedure. Further, in the third procedure, for example, the monomers that are the raw materials of the polymer compound, and the solvent are hardly left in the electrolyte layer 36, compared to in the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the laminated film type lithium secondary battery, the electrolytic solution contained in the electrolyte layer 36 has a similar configuration to that of the electrolytic solution of the present technology. Therefore, superior battery characteristics are achievable for a similar reason to the reason in the cylindrical type lithium-ion secondary battery.

In particular, when the electrolyte layer 36 contains the insulating material, abnormality such as thermal runaway is less prone to occur without blocking movement of lithium ions. This makes the battery characteristics and safety compatible.

Action and effects other than those described above are similar to those of the electrolytic solution of the present technology.

(2-2. Lithium Metal Secondary Battery)

A secondary battery described here is a lithium secondary battery (lithium metal secondary battery) in which the capacity of the anode 22 is obtained by precipitation and dissolution of lithium metal. The secondary battery has a similar configuration to that of the foregoing lithium ion secondary battery (cylindrical type), and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery may operate, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and is inserted in the cathode 21 through the electrolytic solution.

According to the cylindrical type lithium metal secondary battery, the electrolytic solution has a similar configuration to that of the electrolytic solution of the present technology. Therefore, superior battery characteristics are achievable for a similar reason to the reason in the cylindrical type lithium-ion secondary battery.

It is to be noted that the lithium metal secondary battery described here is not limited to the cylindrical type secondary battery, and may be a laminated film type secondary battery. Even in this case, similar effects are achievable.

(3. Applications of Secondary Battery)

Next, description is given of application examples of any of the secondary batteries described above.

Applications of the secondary battery are not specifically limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery is effectively applicable to, for example but not limited to, the battery pack, the electric vehicle, the electric power storage system, the electric power tool, and the electronic apparatus. In these applications, superior battery characteristics are demanded, and using the secondary battery of the technology makes it possible to effectively improve performance. It is to be noted that the battery pack is a power source that uses the secondary battery, and may be, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Specific description is given of some application examples of the secondary battery. It is to be noted that configurations of the respective application examples described below are mere examples, and may be changed as appropriate.

(3-1. Battery Pack (Single Battery))

FIG. 8 illustrates a perspective configuration of a battery pack using a single battery. FIG. 9 illustrates a block configuration of the battery pack illustrated in FIG. 8. It is to be noted that FIG. 8 illustrates the battery back in an exploded state.

The battery back described here is a simple battery pack (a so-called soft pack), and is mounted in, for example, an electronic apparatus typified by a smartphone. For example, the battery pack may include a power source 111 that is the laminated film type secondary battery, and a circuit board 116 coupled to the power source 111 as illustrated in FIG. 8. A cathode lead 112 and an anode lead 113 are attached to the power source 111.

A pair of adhesive tapes 118 and 119 are adhered to both side surfaces of the power source 111. A protection circuit module (PCM) is formed in the circuit board 116. The circuit board 116 is coupled to a cathode 112 through a tab 114, and is coupled to an anode lead 113 through a tab 115. Moreover, the circuit board 116 is coupled to a lead 117 provided with a connector for external connection. It is to be noted that while the circuit board 116 is coupled to the power source 111, the circuit board 116 is protected from upper side and lower side by a label 120 and an insulating sheet 121. The label 120 is adhered to fix, for example, the circuit board 116 and the insulating sheet 121.

Moreover, for example, the battery pack may include the power source 111 and the circuit board 116 as illustrated in FIG. 9. The circuit board 116 may include, for example, a controller 121, a switch section 122, a PTC 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, 4.20 V+0.05 V, and the overdischarge detection voltage may be, for example, 2.4 V±0.1 V.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch may each be, for example, a semiconductor switch such as a field-effect transistor (MOSFET) using a metal oxide semiconductor. It is to be noted that charge and discharge currents may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, but not limited to, in a case in which the controller 121 performs charge and discharge control at the time of abnormal heat generation and in a case in which the controller 121 performs a correction process at the time of calculating remaining capacity.

It is to be noted that the circuit board 116 may not include the PTC 123. In this case, a PTC element may be separately attached to the circuit board 116.

(3-2. Battery Pack (Assembled Battery))

FIG. 10 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 in a housing 60 made of, for example, a plastic material.

The controller 61 controls an operation of the entire battery pack (including a used state of the power source 62), and may include, for example, a CPU. The power source 62 includes one or more secondary batteries. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch may each be, for example, a semiconductor switch such as a field-effect transistor that uses a metal oxide semiconductor (a MOSFET).

The current measurement section 64 measures a current with the use of the current detection resistance 70, and outputs a result of the measurement to the controller 61. The temperature detector 65 measures a temperature with the use of the temperature detecting element 69, and outputs a result of the measurement to the controller 61. The result of the temperature measurement may be used, for example, but not limited to, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

(3-3. Electric Vehicle)

FIG. 11 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

(3-4. Electric Power Storage System)

FIG. 12 illustrates a block configuration of an electric power storage system. The electric power storage system may include, for example, a controller 90, a power source 91, a smart meter 92, and a power hub 93, inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 91. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

(3-5. Electric Power Tool)

FIG. 13 illustrates a block configuration of an electric power tool. The electric power tool may be, for example, an electric drill, and may include a controller 99 and a power source 100, inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an unillustrated operation switch.

EXAMPLES

Examples of the present technology will be described in detail.

Experimental Examples 1-1 to 1-30

The lithium-ion secondary batteries having the cylindrical type battery structure illustrated in FIGS. 1 and 2 were fabricated by the following procedure.

The cathode 21 was fabricated as follows. First, lithium carbonate ($Li_2O_3$) and cobalt carbonate ($CoCO_3$) were mixed, and thereafter, a resultant mixture was fired in air (at 900° C. for five hours) to obtain a lithium-containing composite oxide ($LiCoO_2$). In this case, a mixture ratio of $Li_2CO_3:CoO_3$ was 0.5:1 in molar ratio. Subsequently, 91 parts by mass of a cathode active material ($LiCoO_2$), 3 parts by mass of a cathode binder (polyvinylidene fluoride), and 6 parts by mass of a cathode conductor (graphite) were mixed to obtain a cathode mixture. Subsequently, the cathode mixture was dispersed in an organic solvent (N-methyl-2-pyrrolidone) to obtain paste cathode mixture slurry. Subsequently, both surfaces of the strip-shaped cathode current collector 21A (an aluminum foil having a thickness of 12 µm) were coated with the cathode mixture slurry, and thereafter, the cathode mixture slurry was dried to form the cathode active material layer 21B. Lastly, the cathode active material layer 21B was compression-molded with use of a roll pressing machine.

The anode 22 was fabricated as follows. First, 97 parts by mass of an anode active material (graphite) and 3 parts by mass of an anode binder were mixed to obtain an anode mixture. An average particle diameter (D50) of the artificial graphite was 20 µm. Moreover, a mixture of 1.5 parts by mass of acrylic modified styrene-butadiene copolymer and 1.5 parts by mass of carboxymethyl cellulose was used as the anode binder. Subsequently, the anode mixture was dispersed in water to obtain paste anode mixture slurry. Subsequently, both surfaces of the strip-shaped anode current collector 22A (a copper foil having a thickness of 15 µm) were coated with the anode mixture slurry, and thereafter, the anode mixture slurry was dried to form the anode active material layer 22B. Lastly, the anode active material layer 22B was compression-molded with use of a roll pressing machine.

An electrolytic solution was prepared as follows. The first compound, the second compound, the third compound, and other materials were mixed, and a resultant mixture was stirred. The kinds and contents of the first compound, the second compound, the third compound, and the other materials are as illustrated in Tables 1 and 2. It is to be noted that "MIC" in Tables 1 and 2 indicates $mol/cm^3$.

As the first compound, lithium bis(fluorosulfonyl)imide (LiFSI) and lithium bis(trifluoromethylsulfonyl)imide (LiTFSI) were used.

As the second compound, acetonitrile (AN), propionitrile (PN), and butyronitrile (BN) that were non-oxygen-containing mononitrile compounds, and methoxyacetonitrile (MAN) that was an oxygen-containing mononitrle compound were used.

As the third compound, vinylene carbonate (VC), vinyl ethylene carbonate (VEC), and methylene ethylene carbonate (MEC) that were unsaturated cyclic carbonate esters, 4-fluoro-1,3-dioxolane-2-one (FEC) and bis(fluoromethyl) carbonate (DFDMC) that were halogenated carbonate esters, and succinonitrile (SN) that was a polynitrile compound were used.

As the other materials, ethylene carbonate (EC) that was a cyclic carbonate ester, dimethyl carbonate (DMC) that was a chain carbonate ester, and lithium hexafluorophosphate ($LiPF_6$) and lithium tetrafluoroborate ($LiBF_4$) that were electrolyte salts were used.

It is to be noted that, for comparison, an electrolytic solution was prepared without using one or more of the second compound, the third compound, and the other materials.

The secondary battery was assembled as follows. First, the cathode lead 25 made of aluminum was attached to the cathode current collector 21A by welding, and the anode lead 26 made of nickel was attached to the anode current collector 22A by welding. Subsequently, the cathode 21 and the anode 22 were stacked with the separator 23 (a microporous polyethylene film having a thickness of 20 μm) in between, and the resultant stacked body was spirally wound. Thereafter, a winding end portion of the resultant spirally wound body was fixed with use of an adhesive tape to fabricate the spirally wound electrode body 20. Subsequently, the center pin 24 was inserted in the center of the spirally wound electrode body 20. Subsequently, the spirally wound electrode body 20 was sandwiched between the pair of insulating plates 12 and 13, and was contained inside the battery can 11 made of nickel-plated iron. In this case, the end tip of the cathode lead 25 was attached to the safety valve mechanism 15 by welding, and the end tip of the anode lead 26 was attached to the battery can 11 by welding. Subsequently, the electrolytic solution was injected inside the battery can 11 by a decompression method, and the spirally wound electrode body 20 was impregnated with the electrolytic solution. Lastly, the battery cover 14, the safety valve mechanism 15, and the PTC element 16 were swaged with the gasket 17 at the open end of the battery can 11. Thus, the cylindrical type secondary battery was completed.

It is to be noted that, when the secondary battery was fabricated, the secondary battery was so designed as to set an open circuit voltage (that is, a battery voltage) in a completely-charged state to a predetermined voltage (an upper-limit voltage) by adjusting the amount of the cathode active material and the amount of the anode active material. The value of the upper-limit voltage (V) is as illustrated in Tables 1 and 2. In this case, the thickness of the cathode active material layer 21B was so adjusted as to cause the charge-discharge capacity of the anode 22 to be larger than charge-discharge capacity of the cathode 21, thereby prevent lithium metal from being precipitated on the anode 22.

When cycle characteristics were examined as battery characteristics of each of the secondary batteries, results illustrated in Tables 1 and 2 were obtained.

The cycle characteristics were examined as follows. One cycle of charge and discharge was performed on the secondary battery in an ambient temperature environment (23° C.) to stabilize a battery state of the secondary battery, and thereafter, one cycle of charge and discharge was further performed on the secondary battery in a high-temperature environment (60° C.) to measure discharge capacity at the second cycle. Subsequently, the secondary battery was repeatedly charged and discharged until the total number of cycles reached 50 cycles in the same temperature environment (60° C.) to measure discharge capacity at the 50th cycle. A capacity retention ratio (%)=(discharge capacity at the 50th cycle/discharge capacity at the second cycle)×100 was calculated from these results. It is to be noted that when the secondary battery was charged, charge was performed at a current density of 1 mA/cm² until the voltage reached the upper-limit voltage, and thereafter, charge was further performed at the upper-limit voltage until the current density reached 0.02 mA/cm². When the secondary battery was discharged, discharge was performed at a current density of 1 mA/cm² until the voltage reached 3 V.

TABLE 1

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 1-1 | 4.3 | LiFSI | 3.5 | AN | 20 | VC | 1 | EC/DMC | 30/50 | LiPF$_6$ | 0.5 | 50 |
| 1-2 | 4.3 | LiFSI | 3.5 | AN | 60 | VC | 1 | EC/DMC | 20/20 | LiPF$_6$ | 0.5 | 55 |
| 1-3 | 4.3 | LiFSI | 3.5 | AN | 90 | VC | 1 | EC/DMC | 5/5 | LiPF$_6$ | 0.5 | 59 |
| 1-4 | 4.3 | LiFSI | 2.5 | AN | 100 | VC | 1 | — | — | LiPF$_6$ | 1.5 | 62 |
| 1-5 | 4.3 | LiFSI | 3.5 | AN | 100 | VC | 1 | — | — | LiPF$_6$ | 0.5 | 68 |
| 1-6 | 4.3 | LiFSI | 6 | AN | 100 | VC | 1 | — | — | LiPF$_6$ | — | 58 |
| 1-7 | 4.3 | LiFSI | 3.9 | AN | 100 | VC | 1 | — | — | LiPF$_6$ | 0.1 | 74 |
| 1-8 | 4.3 | LiFSI | 4 | AN | 100 | VC | 1 | — | — | LiPF$_6$ | — | 72 |
| 1-9 | 4.3 | LiFSI | 4.5 | AN | 100 | VC | 1 | — | — | LiPF$_6$ | — | 69 |
| 1-10 | 4.3 | LiFSI | 3.5 | AN | 100 | VEC | 1 | — | — | LiPF$_6$ | 0.5 | 65 |
| 1-11 | 4.3 | LiFSI | 3.5 | AN | 100 | MEC | 1 | — | — | LiPF$_6$ | 0.5 | 69 |
| 1-12 | 4.3 | LiFSI | 3.9 | AN | 90 | FEC | 1 | EC/DMC | 5/5 | LiPF$_6$ | 0.1 | 61 |
| 1-13 | 4.3 | LiFSI | 4.5 | AN | 90 | FEC | 1 | EC/DMC | 5/5 | LiPF$_6$ | — | 57 |
| 1-14 | 4.3 | LiFSI | 3.9 | AN | 90 | DFDMC | 1 | EC/DMC | 5/5 | LiPF$_6$ | 0.1 | 59 |
| 1-15 | 4.3 | LiFSI | 3.9 | AN | 90 | SN | 5 | EC/DMC | 5/5 | LiPF$_6$ | 0.1 | 66 |

TABLE 2

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 1-16 | 4.3 | LiFSI | 4.5 | AN | 100 | SN | 5 | — | — | LiPF$_6$ | — | 62 |
| 1-17 | 4.3 | LiFSI | 3.5 | AN | 90 | VC/FEC | 1/2 | EC/DMC | 5/5 | LiPF$_6$ | 0.5 | 65 |

TABLE 2-continued

Battery Structure: Cylindrical Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (mass %) | Kind | Content (M/C) | Capacity Retention Ratio (%) |
|---|---|---|---|---|---|---|---|---|---|---|---|---|
| 1-18 | 4.3 | LiFSI | 3.5 | PN | 100 | VC | 1 | — | — | LiPF$_6$ | 0.5 | 66 |
| 1-19 | 4.3 | LiFSI | 3.5 | BN | 100 | VC | 1 | — | — | LiPF$_6$ | 0.5 | 63 |
| 1-20 | 4.3 | LiFSI | 3.5 | MAN | 100 | VC | 1 | — | — | LiPF$_6$ | 0.5 | 63 |
| 1-21 | 4.3 | LiFSI/LiTFSI | 3.4/0.1 | AN | 100 | VC | 1 | — | — | LiPF$_6$ | 0.5 | 67 |
| 1-22 | 4.3 | LiFSI | 3.5 | AN | 100 | VC | 1 | — | — | LiPF$_6$/LiBF$_4$ | 0.25/0.25 | 68 |
| 1-23 | 4.3 | LiFSI | 3.5 | AN | 100 | VC | 1 | — | — | LiBF$_4$ | 0.5 | 59 |
| 1-24 | 4.3 | LiFSI | 3.5 | — | — | — | — | EC/DMC | 50/50 | LiPF$_6$ | 0.5 | 33 |
| 1-25 | 4.3 | LiFSI | 3.5 | AN | 100 | — | — | — | — | LiPF$_6$ | 0.5 | 37 |
| 1-26 | 4.3 | LiFSI | 3.9 | AN | 100 | — | — | — | — | LiPF$_6$ | 0.1 | 40 |
| 1-27 | 4.3 | LiFSI | 3.9 | AN | 90 | — | — | EC/DMC | 5/5 | LiPF$_6$ | 0.1 | 40 |
| 1-28 | 4.3 | LiFSI | 3.5 | — | — | VC | 1 | EC/DMC | 50/50 | LiPF$_6$ | 0.5 | 34 |
| 1-29 | 4.3 | LiFSI | 2 | AN | 100 | VC | 1 | — | — | LiPF$_6$ | 2 | 33 |
| 1-30 | 4.3 | LiFSI | 7 | AN | 100 | VC | 1 | — | — | LiPF$_6$ | — | 34 |

The capacity retention ratio was changed depending on the configuration of the secondary battery. In this case, when the electrolytic solution included the first compound, the second compound, and the third compound all together, and the content of the first compound in the electrolytic solution was within an appropriate range, the capacity retention ratio was particularly increased.

More specifically, the capacity retention ratio in a case in which the electrolytic solution included the first compound and did not include the second compound and the third compound (Experimental Example 1-24) is used as reference.

In a case in which the electrolytic solution including the first compound included the second compound and did not include the third compound (Experimental Example 1-25 to 1-27), the capacity retention ratio was slightly increased, as compared with the foregoing reference.

Moreover, in a case in which the electrolytic solution including the first compound did not include the second compound and included the third compound (Experimental Example 1-28), the capacity retention ratio was extremely slightly increased, as compared with the foregoing reference.

These results predict that when the electrolytic solution including the first compound includes both the second compound and the third compound, the capacity retention ratio is slightly increased, as compared with the foregoing reference.

However, in actuality, when the electrolytic solution including the first compound included both the second compound and the third compound (Experimental Example 1-1 to 1-23), the capacity retention ratio was remarkably increased, as compared with the foregoing reference.

Note that, even though the electrolytic solution including the first compound included both the second compound and the third compound, the capacity retention ratio was not remarkably increased when the content of the first compound was out of the predetermined range.

More specifically, in a case in which the content of the first compound was smaller than 2.5 mol/cm$^3$ or larger than 6 mol/cm$^3$ (Experimental Examples 1-29 and 1-30), the capacity retention ratio was hardly increased, as compared with the foregoing reference. In contrast, in a case in which the content of the first compound was within a range of 2.5 mol/cm$^3$ to 6 mol/cm$^3$ both inclusive (Experimental Examples 1-1 to 1-23), the capacity retention ratio was remarkably increased, as compared with the foregoing reference.

This result indicates that when the electrolytic solution includes the first compound, the second compound, and the third compound all together, and the content of the first compound in the electrolytic solution is within an appropriate range, decomposition reaction of the electrolytic solution is particularly suppressed by the synergistic effect of the first compound, the second compound, and the third compound.

Experimental Example 2-1 to 2-30

As illustrated in Tables 3 and 4, the secondary batteries were fabricated by a similar procedure, except that the upper-limit voltage (V) was changed, and the battery characteristics of the secondary batteries were examined.

TABLE 3

Battery Structure: Cylindrical Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (mass %) | Kind | Content (M/C) | Capacity Retention Ratio (%) |
|---|---|---|---|---|---|---|---|---|---|---|---|---|
| 2-1 | 4.4 | LiFSI | 3.5 | AN | 20 | VC | 1 | EC/DMC | 30/50 | LiPF$_6$ | 0.5 | 45 |
| 2-2 | 4.4 | LiFSI | 3.5 | AN | 60 | VC | 1 | EC/DMC | 20/20 | LiPF$_6$ | 0.5 | 49 |
| 2-3 | 4.4 | LiFSI | 3.5 | AN | 90 | VC | 1 | EC/DMC | 5/5 | LiPF$_6$ | 0.5 | 54 |
| 2-4 | 4.4 | LiFSI | 2.5 | AN | 100 | VC | 1 | — | — | LiPF$_6$ | 1.5 | 58 |

TABLE 3-continued

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 2-5 | 4.4 | LiFSI | 3.5 | AN | 100 | VC | 1 | — | — | LiPF$_6$ | 0.5 | 63 |
| 2-6 | 4.4 | LiFSI | 6 | AN | 100 | VC | 1 | — | — | LiPF$_6$ | — | 52 |
| 2-7 | 4.4 | LiFSI | 3.9 | AN | 100 | VC | 1 | — | — | LiPF$_6$ | 0.1 | 69 |
| 2-8 | 4.4 | LiFSI | 4 | AN | 100 | VC | 1 | — | — | LiPF$_6$ | — | 66 |
| 2-9 | 4.4 | LiFSI | 4.5 | AN | 100 | VC | 1 | — | — | LiPF$_6$ | — | 63 |
| 2-10 | 4.4 | LiFSI | 3.5 | AN | 100 | VEC | 1 | — | — | LiPF$_6$ | 0.5 | 61 |
| 2-11 | 4.4 | LiFSI | 3.5 | AN | 100 | MEC | 1 | — | — | LiPF$_6$ | 0.5 | 65 |
| 2-12 | 4.4 | LiFSI | 3.9 | AN | 90 | FEC | 1 | EC/DMC | 5/5 | LiPF$_6$ | 0.1 | 56 |
| 2-13 | 4.4 | LiFSI | 4.5 | AN | 90 | FEC | 1 | EC/DMC | 5/5 | LiPF$_6$ | — | 51 |
| 2-14 | 4.4 | LiFSI | 3.9 | AN | 90 | DFDMC | 1 | EC/DMC | 5/5 | LiPF$_6$ | 0.1 | 52 |
| 2-15 | 4.4 | LiFSI | 3.9 | AN | 90 | SN | 5 | EC/DMC | 5/5 | LiPF$_6$ | 0.1 | 60 |

TABLE 4

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 2-16 | 4.4 | LiFSI | 4.5 | AN | 100 | SN | 5 | — | — | LiPF$_6$ | — | 57 |
| 2-17 | 4.4 | LiFSI | 3.5 | AN | 90 | VC/FEC | 1/2 | EC/DMC | 5/5 | LiPF$_6$ | 0.5 | 59 |
| 2-18 | 4.4 | LiFSI | 3.5 | PN | 100 | VC | 1 | — | — | LiPF$_6$ | 0.5 | 61 |
| 2-19 | 4.4 | LiFSI | 3.5 | BN | 100 | VC | 1 | — | — | LiPF$_6$ | 0.5 | 58 |
| 2-20 | 4.4 | LiFSI | 3.5 | MAN | 100 | VC | 1 | — | — | LiPF$_6$ | 0.5 | 57 |
| 2-21 | 4.4 | LiFSI/LiTFSI | 3.4/0.1 | AN | 100 | VC | 1 | — | — | LiPF$_6$ | 0.5 | 61 |
| 2-22 | 4.4 | LiFSI | 3.5 | AN | 100 | VC | 1 | — | — | LiPF$_6$/LiBF$_4$ | 0.25/0.25 | 62 |
| 2-23 | 4.4 | LiFSI | 3.5 | AN | 100 | VC | 1 | — | — | LiBF$_4$ | 0.5 | 53 |
| 2-24 | 4.4 | LiFSI | 3.5 | — | — | — | — | EC/DMC | 50/50 | LiPF$_6$ | 0.5 | 28 |
| 2-25 | 4.4 | LiFSI | 3.5 | AN | 100 | — | — | — | — | LiPF$_6$ | 0.5 | 33 |
| 2-26 | 4.4 | LiFSI | 3.9 | AN | 100 | — | — | — | — | LiPF$_6$ | 0.1 | 35 |
| 2-27 | 4.4 | LiFSI | 3.9 | AN | 90 | — | — | EC/DMC | 5/5 | LiPF$_6$ | 0.1 | 35 |
| 2-28 | 4.4 | LiFSI | 3.5 | — | — | VC | 1 | EC/DMC | 50/50 | LiPF$_6$ | 0.5 | 30 |
| 2-29 | 4.4 | LiFSI | 2 | AN | 100 | VC | 1 | — | — | LiPF$_6$ | 2 | 29 |
| 2-30 | 4.4 | LiFSI | 7 | AN | 100 | VC | 1 | — | — | LiPF$_6$ | — | 29 |

Even though the upper-limit voltage was changed, similar results to those in Tables 1 and 2 were obtained. More specifically, when the electrolytic solution included the first compound, the second compound, and the third compound all together, and the content of the first compound in the electrolytic solution was within an appropriate range, a high capacity retention ratio was obtained.

Experimental Example 3-1 to 3-8

As illustrated in Table 5, the secondary batteries were fabricated by a similar procedure, except that the composition of the electrolytic solution was changed, and the battery characteristics of the secondary batteries were examined.

As the other materials, propane sultone (PS) and propene sultone (PRS) that were sulfonate esters, benzoic anhydride (BAAH) and propanedisulfonic anhydride (PSAH) that were acid anhydrides, γ-butyrolactone (GBL) that was an cyclic carboxylate ester, dimethyl sulfoxide (DMS) that was a dialkyl sulfoxide, trifluoroethyl phosphate (PATFE) that was a phosphate ester, and lithium difluorophosphate (LiPO$_2$F$_2$) were used.

TABLE 5

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 3-1 | 4.3 | LiFSI | 3.5 | AN | 100 | VC | 1 | PS | 1 | LiPF$_6$ | 0.5 | 66 |
| 3-2 | 4.3 | LiFSI | 3.5 | AN | 100 | VC | 1 | PRS | 1 | LiPF$_6$ | 0.5 | 66 |

TABLE 5-continued

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 3-3 | 4.3 | LiFSI | 3.5 | AN | 100 | VC | 1 | BAAH | 1 | LiPF$_6$ | 0.5 | 63 |
| 3-4 | 4.3 | LiFSI | 3.5 | AN | 100 | VC | 1 | PSAH | 1 | LiPF$_6$ | 0.5 | 69 |
| 3-5 | 4.3 | LiFSI | 3.5 | AN | 10 | VC | 1 | GBL | 90 | LiPF$_6$ | 0.5 | 65 |
| 3-6 | 4.3 | LiFSI | 3.5 | AN | 10 | VC | 1 | DMS | 90 | LiPF$_6$ | 0.5 | 61 |
| 3-7 | 4.3 | LiFSI | 3.5 | AN | 10 | VC | 1 | PATFE | 90 | LiPF$_6$ | 0.5 | 67 |
| 3-8 | 4.3 | LiFSI | 3.5 | AN | 100 | VC | 1 | — | — | LiPF$_6$/LiPO$_2$F$_2$ | 0.25/0.25 | 63 |

When the electrolytic solution included any of the other materials such as the sulfonate ester, the capacity retention ratio became higher.

Experimental Examples 4-1 to 4-12

As illustrated in Table 6, the secondary batteries were fabricated by a similar procedure, except that the anode insulating layer 213 illustrated in FIG. 4 was formed, and the battery characteristics of the secondary batteries were examined.

The anode insulating layer 213 was formed as follows. First, 80 parts by mass of powder insulating ceramics and 20 parts by mass of an insulating polymer compound (polyvinylidene fluoride) were mixed, and thereafter, a resultant mixture was dispersed in an organic solvent to prepare a process solution. Aluminum oxide (Al$_2$O$_3$) and silicon oxide (SiO$_2$) were used as the power insulating ceramics, and an average particle diameter (F50) of the insulating ceramics was 0.5 μm. Subsequently, the anode 22 was immersed in the process solution, and thereafter, a thickness of the process solution provided on a surface of the anode 22 was adjusted with use of a gravure roller. Lastly, the process solution was dried (at 120° C.) with use of a drier to volatilize the organic solvent in the process solution. Thus, the anode insulating layer 213 was formed on the surface of the anode active material layer 22B. The thickness of the anode insulating layer 213 was 5 μm.

It is to be noted that in Table 6, the insulating ceramics are simply referred to as "ceramics", and the insulating polymer compound is simply referred to as "polymer compound". The same applies to the following tables.

TABLE 6

Battery Structure: Cylindrical Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Anode Insulating Layer Kind | Content (M/C) | Capacity Retention Ratio (%) |
|---|---|---|---|---|---|---|---|---|---|---|---|---|
| 4-1 | 4.3 | LiFSI | 3.5 | AN | 100 | VC | 1 | LiPF$_6$ | 0.5 | Al$_2$O$_3$ | PVDF | 70 |
| 4-2 | 4.3 | LiFSI | 3.5 | AN | 100 | FEC | 1 | LiPF$_6$ | 0.5 | Al$_2$O$_3$ | PVDF | 70 |
| 4-3 | 4.3 | LiFSI | 3.5 | AN | 100 | SN | 1 | LiPF$_6$ | 0.5 | Al$_2$O$_3$ | PVDF | 68 |
| 4-4 | 4.3 | LiFSI | 3.5 | AN | 100 | VC | 1 | LiPF$_6$ | 0.5 | SiO$_2$ | PVDF | 70 |
| 4-5 | 4.3 | LiFSI | 3.5 | AN | 100 | FEC | 1 | LiPF$_6$ | 0.5 | SiO$_2$ | PVDF | 70 |
| 4-6 | 4.3 | LiFSI | 3.5 | AN | 100 | SN | 1 | LiPF$_6$ | 0.5 | SiO$_2$ | PVDF | 68 |
| 4-7 | 4.4 | LiFSI | 3.5 | AN | 100 | VC | 1 | LiPF$_6$ | 0.5 | Al$_2$O$_3$ | PVDF | 65 |
| 4-8 | 4.4 | LiFSI | 3.5 | AN | 100 | FEC | 1 | LiPF$_6$ | 0.5 | Al$_2$O$_3$ | PVDF | 66 |
| 4-9 | 4.4 | LiFSI | 3.5 | AN | 100 | SN | 1 | LiPF$_6$ | 0.5 | Al$_2$O$_3$ | PVDF | 62 |
| 4-10 | 4.4 | LiFSI | 3.5 | AN | 100 | VC | 1 | LiPF$_6$ | 0.5 | SiO$_2$ | PVDF | 65 |
| 4-11 | 4.4 | LiFSI | 3.5 | AN | 100 | FEC | 1 | LiPF$_6$ | 0.5 | SiO$_2$ | PVDF | 65 |
| 4-12 | 4.4 | LiFSI | 3.5 | AN | 100 | SN | 1 | LiPF$_6$ | 0.5 | SiO$_2$ | PVDF | 62 |

When the anode insulating layer 213 was formed on the anode 22 (the anode active material layer 22B), the capacity retention ratio became higher, as compared with a case in which the anode insulating layer 213 was not formed.

Experimental Example 5-1 to 5-9

As illustrated in Table 7, the secondary batteries were fabricated by a similar procedure, except that the separator insulating layer 214 illustrated in FIG. 5 was formed, and the battery characteristics of the secondary batteries were examined.

The separator insulating layer 214 was formed as follows. First, a process solution was prepared by a similar procedure to that in a case in which the anode insulating layer 213 was formed. Subsequently, the separator 23 was immersed in the process solution. Subsequently, the separator 23 was taken out of the process solution, and thereafter, the separator 23 was cleaned with water. Lastly, the process solution provided on surfaces of the separator 23 was dried (at 80° C.) by hot air to volatilize the solvent in the process solution. Thus, the separator insulating layer 214 was formed on both surfaces of the separator 23. A thickness (total thickness) of the separator insulating layer 214 formed on both surfaces of the separator 23 was 4.5 μm.

TABLE 7

Battery Structure: Cylindrical Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (M/C) | Separator Insulating Layer Ceramics | Separator Insulating Layer Polymer Compound | Capacity Retention Ratio (%) |
|---|---|---|---|---|---|---|---|---|---|---|---|---|
| 5-1 | 4.4 | LiFSI | 3.5 | AN | 100 | VC | 1 | LiPF$_6$ | 0.5 | Al$_2$O$_3$ | PVDF | 66 |
| 5-2 | 4.4 | LiFSI | 3.5 | AN | 100 | VEC | 1 | LiPF$_6$ | 0.5 | Al$_2$O$_3$ | PVDF | 64 |
| 5-3 | 4.4 | LiFSI | 3.5 | AN | 100 | MEC | 1 | LiPF$_6$ | 0.5 | Al$_2$O$_3$ | PVDF | 65 |
| 5-4 | 4.4 | LiFSI | 3.5 | AN | 100 | FEC | 1 | LiPF$_6$ | 0.5 | Al$_2$O$_3$ | PVDF | 66 |
| 5-5 | 4.4 | LiFSI | 3.5 | AN | 100 | DFDMC | 1 | LiPF$_6$ | 0.5 | Al$_2$O$_3$ | PVDF | 62 |
| 5-6 | 4.4 | LiFSI | 3.5 | AN | 100 | SN | 1 | LiPF$_6$ | 0.5 | Al$_2$O$_3$ | PVDF | 62 |
| 5-7 | 4.4 | LiFSI | 3.5 | AN | 100 | VC | 1 | LiPF$_6$ | 0.5 | SiO$_2$ | PVDF | 66 |
| 5-8 | 4.4 | LiFSI | 3.5 | AN | 100 | FEC | 1 | LiPF$_6$ | 0.5 | SiO$_2$ | PVDF | 66 |
| 5-9 | 4.4 | LiFSI | 3.5 | AN | 100 | VC | 1 | LiPF$_6$ | 0.5 | — | PVDF | 66 |

When the separator insulating layer 214 was formed on the surfaces of the separator 23, the capacity retention ratio became higher, as compared with a case in which the separator insulating layer 214 was not formed.

Experimental Examples 6-1 to 6-33

The lithium-ion secondary batteries having a laminated film type battery structure illustrated in FIGS. 6 and 7 were fabricated by the following procedure.

The cathode 33 was fabricated as follows. First, 91 parts by mass of a cathode active material (LiCoO$_2$), 3 parts by mass of a cathode binder (polyvinylidene fluoride), and 6 parts by mass of a cathode conductor (graphite) were mixed to obtain a cathode mixture. Subsequently, the cathode mixture was dispersed in an organic solvent (N-methyl-2-pyrrolidone) to obtain paste cathode mixture slurry. Subsequently, both surfaces of the strip-shaped cathode current collector 33A (an aluminum foil having a thickness of 12 μm) were coated with the cathode mixture slurry with use of a coating apparatus, and thereafter, the cathode mixture slurry was dried to form the cathode active material layer 33B. Lastly, the cathode active material layer 33B was compression-molded with use of a roll pressing machine.

The anode 34 was fabricated as follows. First, 97 parts by mass of an anode active material (graphite) and 3 parts by mass of an anode binder (polyvinylidene fluoride) were mixed to obtain an anode mixture. An average particle diameter (D50) of the graphite was 20 μm. Subsequently, the anode mixture was dispersed in an organic solvent (N-methyl-2-pyrrolidone) to obtain paste anode mixture slurry. Subsequently, both surfaces of the strip-shaped anode current collector 34A (a copper foil having a thickness of 15 μm) were coated with the anode mixture slurry, and thereafter, the anode mixture slurry was dried to form the anode active material layer 34B. Lastly, the anode active material layer 34B was compression-molded with use of a roll pressing machine.

Upon fabrication of the electrolyte layer 36, an electrolytic solution was prepared by a similar procedure to that in a case in which the cylindrical type secondary battery was fabricated. The composition of the electrolytic solution is as illustrated in Tables 8 to 10. Subsequently, the electrolytic solution, a holding polymer compound, and an organic solvent (dimethyl carbonate) were mixed to prepare a sol precursor solution. As the holding polymer compound, a copolymer of hexafluoropropylene and vinylidene fluoride (a copolymerizatin amount of hexafluoropropylene=6.9 wt %) was used. Subsequently, both the cathode 33 and the anode 34 were coated with the precursor solution, and thereafter, the precursor solution was dried to form the gel electrolyte layer 36.

The secondary battery was assembled as follows. First, the cathode lead 31 made of aluminum was attached to the cathode 33 (the cathode current collector 33A) by welding, and the anode lead 32 made of copper was attached to the anode 34 (the anode current collector 34A) by welding. Subsequently, the cathode 33 and the anode 34 were stacked with the separator 35 (a microporous polypropylene film having a thickness of 25 μm) in between, and the resultant stacked body was spirally wound in a longitudinal direction to fabricate the spirally wound electrode body 30. Thereafter, the protective tape 37 was attached onto the outermost periphery of the spirally wound electrode body 30. Subsequently, the outer package member 40 was folded to interpose the spirally wound electrode body 30, and thereafter, the outer edges of the outer package member 40 were thermally fusion-bonded. Thus, the spirally wound electrode body 30 was contained inside a pouch formed of the outer package member 40. The outer package member 40 was a moisture-resistant aluminum laminated film (having a total thickness of 100 μm) in which a nylon film (having a thickness of 30 μm), an aluminum foil (having a thickness of 40 μm), and a cast polypropylene film (having a thickness of 30 μm) were laminated from outside. In this case, the adhesive film 41 (an acid-modified propylene film having a thickness of 50 μm) was inserted between cathode lead 31 and the outer package member 40, and the adhesive film 41 was inserted between the anode lead 32 and the outer package member 40 in a similar manner. Thus, the laminated film type secondary battery was completed.

It is to be noted that, when the laminated film type secondary battery was fabricated, as with the case in which the cylindrical type secondary battery was fabricated, the secondary battery was so designed as to set an open circuit voltage in a completely-charged state to a predetermined voltage (an upper-limit voltage), and to prevent lithium metal from being precipitated on the anode 34.

When cycle characteristics were examined as battery characteristics of each of the secondary batteries by a similar procedure to that in the cylindrical type secondary battery, results illustrated in Tables 8 to 10 were obtained.

TABLE 8

Battery Structure: Laminated Film Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 6-1 | 4.4 | LiFSI | 3.5 | AN | 20 | VC | 1 | EC/PC | 40/40 | LiPF$_6$ | 0.5 | 47 |
| 6-2 | 4.4 | LiFSI | 3.5 | AN | 60 | VC | 1 | EC/PC | 20/20 | LiPF$_6$ | 0.5 | 51 |
| 6-3 | 4.4 | LiFSI | 3.9 | AN | 90 | VC | 1 | EC/PC | 5/5 | LiPF$_6$ | 0.1 | 56 |
| 6-4 | 4.4 | LiFSI | 4.5 | AN | 100 | VC | 1 | — | — | — | — | 51 |
| 6-5 | 4.4 | LiFSI | 2.5 | AN | 100 | VC | 1 | — | — | LiPF$_6$ | 1.5 | 51 |
| 6-6 | 4.4 | LiFSI | 3.9 | AN | 100 | VC | 1 | — | — | LiPF$_6$ | 0.1 | 55 |
| 6-7 | 4.4 | LiFSI | 6 | AN | 100 | VC | 1 | — | — | — | — | 48 |
| 6-8 | 4.4 | LiFSI | 3.9 | AN | 90 | VEC | 1 | EC/PC | 5/5 | LiPF$_6$ | 0.1 | 49 |
| 6-9 | 4.4 | LiFSI | 3.9 | AN | 90 | MEC | 1 | EC/PC | 5/5 | LiPF$_6$ | 0.1 | 56 |
| 6-10 | 4.4 | LiFSI | 3.9 | AN | 90 | FEC | 1 | EC/PC | 5/5 | LiPF$_6$ | 0.1 | 56 |
| 6-11 | 4.4 | LiFSI | 4.5 | AN | 90 | FEC | 1 | EC/PC | 5/5 | — | — | 52 |
| 6-12 | 4.4 | LiFSI | 4.5 | AN | 100 | FEC | 1 | — | — | — | — | 51 |
| 6-13 | 4.4 | LiFSI | 3.9 | AN | 100 | FEC | 1 | — | — | LiPF$_6$ | 0.1 | 55 |
| 6-14 | 4.4 | LiFSI | 3.9 | AN | 100 | DFDMC | 1 | — | — | LiPF$_6$ | 0.1 | 52 |
| 6-15 | 4.4 | LiFSI | 3.9 | AN | 90 | SN | 1 | EC/PC | 5/5 | LiPF$_6$ | 0.1 | 52 |

TABLE 9

Battery Structure: Laminated Film Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 6-16 | 4.4 | LiFSI | 4.5 | AN | 100 | SN | 1 | — | — | LiPF$_6$ | — | 50 |
| 6-17 | 4.4 | LiFSI | 3.5 | AN | 90 | VC/FEC | 1/2 | EC/PC | 5/5 | LiPF$_6$ | 0.5 | 55 |
| 6-18 | 4.4 | LiFSI/LiTFSI | 3.8/0.1 | AN | 90 | FEC | 1 | EC/PC | 5/5 | LiPF$_6$ | 0.1 | 56 |
| 6-19 | 4.4 | LiFSI/LiTFSI | 3.8/0.1 | AN | 100 | FEC | 1 | — | — | LiPF$_6$ | 0.1 | 56 |
| 6-20 | 4.4 | LiFSI | 3.9 | AN | 90 | VC | 1 | EC/PC | 5/5 | LiPF$_6$/LiBF$_4$ | 0.05/0.05 | 56 |
| 6-21 | 4.4 | LiFSI | 3.9 | AN | 100 | FEC | 1 | — | — | LiBF$_4$ | 0.1 | 55 |
| 6-22 | 4.4 | LiFSI | 3.9 | PN | 90 | FEC | 1 | EC/PC | 5/5 | LiPF$_6$ | 0.1 | 53 |
| 6-23 | 4.4 | LiFSI | 4.5 | PN | 90 | FEC | 1 | EC/PC | 5/5 | — | — | 53 |
| 6-24 | 4.4 | LiFSI | 3.9 | PN | 100 | FEC | 1 | — | — | LiPF$_6$ | 0.1 | 53 |
| 6-25 | 4.4 | LiFSI | 3.9 | BN | 90 | FEC | 1 | EC/PC | 5/5 | LiPF$_6$ | 0.1 | 51 |

TABLE 9-continued

Battery Structure: Laminated Film Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (mass %) | Other Materials Kind | Other Materials Content (M/C) | Capacity Retention Ratio (%) |
|---|---|---|---|---|---|---|---|---|---|---|---|---|
| 6-26 | 4.4 | LiFSI | 3.9 | BN | 100 | FEC | 1 | — | — | LiPF$_6$ | 0.1 | 51 |
| 6-27 | 4.4 | LiFSI | 3.9 | MAN | 100 | FEC | 1 | — | — | LiPF$_6$ | 0.1 | 52 |

TABLE 10

Battery Structure: Laminated Film Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (mass %) | Other Materials Kind | Other Materials Content (M/C) | Capacity Retention Ratio (%) |
|---|---|---|---|---|---|---|---|---|---|---|---|---|
| 6-28 | 4.4 | LiFSI | 3.9 | — | — | — | — | EC/PC | 50/50 | LiPF$_6$ | 0.1 | 28 |
| 6-29 | 4.4 | LiFSI | 3.9 | AN | 100 | — | — | — | — | LiPF$_6$ | 0.1 | 31 |
| 6-30 | 4.4 | LiFSI | 3.9 | AN | 90 | — | — | EC/PC | 5/5 | LiPF$_6$ | 0.1 | 31 |
| 6-31 | 4.4 | LiFSI | 3.9 | — | — | VC | 1 | EC/PC | 50/50 | LiPF$_6$ | 0.1 | 32 |
| 6-32 | 4.4 | LiFSI | 2 | AN | 90 | VC | 1 | EC/PC | 5/5 | LiPF$_6$ | 2 | 28 |
| 6-33 | 4.4 | LiFSI | 7 | AN | 90 | VC | 1 | EC/PC | 5/5 | — | — | 27 |

Even though the battery structure was changed, similar results to those in Tables 1 and 2 were obtained. More specifically, when the electrolytic solution contained in the electrolyte layer 36 included the first compound, the second compound, and the third compound all together, and the content of the first compound in the electrolytic solution was within an appropriate range, a higher capacity retention ratio was obtained.

Experimental Example 7-1 to 7-8

As illustrated in Table 11, the secondary batteries were fabricated by a similar procedure, except that the composition of the electrolytic solution contained in the electrolyte layer 36 was changed, and the battery characteristics of the secondary batteries were examined.

TABLE 11

Battery Structure: Laminated Film Type, Cathode Active Material: LiCoO$_2$, Anode Active Material: Graphite

| Experimental Example | Upper-limit Voltage (V) | First Compound Kind | First Compound Content (M/C) | Second Compound Kind | Second Compound Content (mass %) | Third Compound Kind | Third Compound Content (mass %) | Other Materials Kind | Other Materials Content (mass %) | Other Materials Kind | Other Materials Content (M/C) | Capacity Retention Ratio (%) |
|---|---|---|---|---|---|---|---|---|---|---|---|---|
| 7-1 | 4.4 | LiFSI | 3.9 | AN | 100 | FEC | 1 | PS | 1 | LiPF$_6$ | 0.1 | 56 |
| 7-2 | 4.4 | LiFSI | 3.9 | AN | 100 | FEC | 1 | PRS | 1 | LiPF$_6$ | 0.1 | 55 |
| 7-3 | 4.4 | LiFSI | 3.9 | AN | 100 | FEC | 1 | BAAH | 1 | LiPF$_6$ | 0.1 | 54 |
| 7-4 | 4.4 | LiFSI | 3.9 | AN | 100 | FEC | 1 | PSAH | 1 | LiPF$_6$ | 0.1 | 56 |
| 7-5 | 4.4 | LiFSI | 3.9 | AN | 10 | FEC | 1 | GBL | 90 | LiPF$_6$ | 0.1 | 56 |
| 7-6 | 4.4 | LiFSI | 3.9 | AN | 10 | FEC | 1 | DMS | 90 | LiPF$_6$ | 0.1 | 54 |
| 7-7 | 4.4 | LiFSI | 3.9 | AN | 10 | FEC | 1 | PATFE | 90 | LiPF$_6$ | 0.1 | 56 |
| 7-8 | 4.4 | LiFSI | 3.9 | AN | 100 | FEC | 1 | — | — | LiPF$_6$/LiPO$_2$F$_2$ | 0.05/0.05 | 53 |

Even though the composition of the electrolytic solution contained in the electrolyte layer 36 was changed, similar results to those in Table 5 were obtained. More specifically, when the electrolytic solution includes any of other materials such as sulfonate ester, the capacity retention ratio became higher.

Experimental Example 8-1 to 8-8

As illustrated in Table 12, the secondary batteries were fabricated by a similar procedure, except that the composition of the electrolyte layer 36 was changed, and the battery characteristics of the secondary batteries were examined.

The electrolyte layer 36 was formed by a similar procedure, except that the precursor solution contained power insulating ceramics. In this case, the content of the insulating ceramics was 1 part by mass.

TABLE 12

Battery Structure: Laminated Film Type, Cathode Active Material: LiCoO$_2$, Anode Active Material: Graphite

| Experimental Example | Upper-limit Voltage (V) | First Compound Kind | Content (M/C) | Second Compound Kind | Content (mass %) | Third Compound Kind | Content (mass %) | Other Material Kind | Content (mass %) | Electrolyte Layer Ceramics | Polymer Compound | Capacity Retention Ratio (%) |
|---|---|---|---|---|---|---|---|---|---|---|---|---|
| 8-1 | 4.4 | LiFSI | 3.9 | AN | 100 | VC | 1 | LiPF$_6$ | 0.1 | Al$_2$O$_3$ | PVDF | 59 |
| 8-2 | 4.4 | LiFSI | 3.9 | AN | 100 | VEC | 1 | LiPF$_6$ | 0.1 | Al$_2$O$_3$ | PVDF | 57 |
| 8-3 | 4.4 | LiFSI | 3.9 | AN | 100 | MEC | 1 | LiPF$_6$ | 0.1 | Al$_2$O$_3$ | PVDF | 58 |
| 8-4 | 4.4 | LiFSI | 3.9 | AN | 100 | FEC | 1 | LiPF$_6$ | 0.1 | Al$_2$O$_3$ | PVDF | 60 |
| 8-5 | 4.4 | LiFSI | 3.9 | AN | 100 | DFDMC | 1 | LiPF$_6$ | 0.1 | Al$_2$O$_3$ | PVDF | 57 |
| 8-6 | 4.4 | LiFSI | 3.9 | AN | 100 | SN | 1 | LiPF$_6$ | 0.1 | Al$_2$O$_3$ | PVDF | 56 |
| 8-7 | 4.4 | LiFSI | 3.9 | AN | 100 | VC | 1 | LiPF$_6$ | 0.1 | SiO$_2$ | PVDF | 59 |
| 8-8 | 4.4 | LiFSI | 3.9 | AN | 100 | FEC | 1 | LiPF$_6$ | 0.1 | SiO$_2$ | PVDF | 60 |

When the electrolyte layer 36 contained the insulating ceramics, the capacity retention ratio became higher, as compared with a case in which the electrolyte layer 36 did not contain the insulating ceramics.

Experimental Example 9-1 to 9-11

As illustrated in Table 13, the secondary batteries were fabricated by a similar procedure, except that the kind of the anode active material was changed, and the battery characteristics of the secondary batteries were examined.

The anode active material layer 34B was formed as follows. An anode active material (silicon) and a precursor of an anode binder (polyamic acid) were mixed to form an anode mixture. In this case, a mixture ratio of silicon: polyamic acid was 80:20 in dry weight ratio. An average particle diameter (D50) of silicon was 1 μm. N-methyl-2-pyrrolidone and N,N-dimethylacetamide were used as solvents of polyamic acid. Moreover, after compression-molding, the anode mixture slurry was heated (at 400° C. for 12 hours) in a vacuum atmosphere. Thus, polyimide that was the anode binder was formed. The procedure of forming the anode active material layer 34B except for this was similar to that in the case in which graphite was used as the anode active material.

TABLE 13

Battery Structure: Laminated Film Type, Cathode Active Material: LiCoO$_2$, Anode Active Material: Silicon

| Experimental Example | Upper-limit Voltage (V) | First Compound Kind | Content (M/C) | Second Compound Kind | Content (mass %) | Third Compound Kind | Content (mass %) | Other Materials Kind | Content (mass %) | Kind | Content (M/C) | Capacity Retention Ratio (%) |
|---|---|---|---|---|---|---|---|---|---|---|---|---|
| 9-1 | 4.4 | LiFSI | 3.9 | AN | 100 | VC | 1 | — | — | LiPF$_6$ | 0.1 | 43 |
| 9-2 | 4.4 | LiFSI | 3.9 | AN | 100 | VEC | 1 | — | — | LiPF$_6$ | 0.1 | 41 |
| 9-3 | 4.4 | LiFSI | 3.9 | AN | 100 | MEC | 1 | — | — | LiPF$_6$ | 0.1 | 42 |
| 9-4 | 4.4 | LiFSI | 3.9 | AN | 100 | FEC | 1 | — | — | LiPF$_6$ | 0.1 | 47 |
| 9-5 | 4.4 | LiFSI | 3.9 | AN | 100 | DFDMC | 1 | — | — | LiPF$_6$ | 0.1 | 46 |
| 9-6 | 4.4 | LiFSI | 3.9 | AN | 100 | SN | 1 | — | — | LiPF$_6$ | 0.1 | 43 |
| 9-7 | 4.4 | LiFSI | 3.9 | — | — | — | — | EC/PC | 50/50 | LiPF$_6$ | 0.1 | 25 |
| 9-8 | 4.4 | LiFSI | 3.9 | AN | 100 | — | — | — | — | LiPF$_6$ | 0.1 | 25 |
| 9-9 | 4.4 | LiFSI | 3.9 | — | — | VC | 1 | EC/PC | 50/50 | LiPF$_6$ | 0.1 | 29 |
| 9-10 | 4.4 | LiFSI | 2 | AN | 100 | VC | 1 | — | — | LiPF$_6$ | 2 | 30 |
| 9-11 | 4.4 | LiFSI | 7 | AN | 100 | VC | 1 | — | — | — | — | 29 |

Even though the kind of the anode active material was changed, similar results to those in Tables 8 to 10 were obtained. More specifically, when the electrolyte layer 36 (the electrolytic solution) included the first compound, the second compound, and the third compound all together, and the content of the first component in the electrolytic solution was within an appropriate range, a high capacity retention ratio was obtained.

As can be seen from the results in Tables 1 to 13, when the electrolytic solution included the first compound, the second compound, and the third compound all together, and the content of the first compound in the electrolytic solution was within a range of 2.5 mol/cm$^3$ to 6 mol/cm$^3$ both inclusive, superior battery characteristics were achieved.

Although the present technology has been described above referring to some embodiments and examples, the present technology is not limited thereto, and may be variously modified.

For example, the description has been given with reference to examples in which the battery structure is of the cylindrical type and the laminated film type, and the battery element has the spirally wound structure. However, the battery structure and the battery element structure are not limited thereto. The secondary battery of the present technology is similarly applicable also to a case in which other battery structure such as that of a square type, a coin type or a button type is employed. Moreover, the secondary battery of the present technology is similarly applicable also to a case in which the battery element has other structure such as a stacked structure.

Moreover, the electrode reactant may be any of other Group 1 elements such as sodium (Na) and potassium (K), Group 2 elements such as magnesium and calcium, and other light-metals such as aluminum. Since the effects of the present technology are expected to be achieved independently of the kind of the electrode reactant, similar effects are achievable, even if the kind of the electrode reactant is changed.

It is to be noted that the present technology may have the following configurations.

(1)
A secondary battery including:
a cathode;
an anode; and
an electrolytic solution,
the nonaqueous electrolytic solution including
a compound represented by a formula (1),
one or both of a compound represented by a formula (2) and a compound represented by a formula (3), and
one or more of a compound represented by a formula (4) a compound represented by a formula (5), a compound represented by a formula (6), a compound represented by a formula (7), a compound represented by a formula (8), and a compound represented by a formula (9), and
a content of the compound represented by the formula (1) in the nonaqueous electrolytic solution being within a range of 2.5 mol/dm$^3$ to 6 mol/dm$^3$ both inclusive, $$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)$_2$—) and a carbonyl group (—C(=O)—),

where R1 is a monovalent hydrocarbon group, $$R2\text{-}X\text{—}CN \quad (3)$$

where R2 is a monovalent hydrocarbon group, and X is a group in which one or more ether bonds (—O—) and one or more divalent hydrocarbon groups are bound in any order,

[Chem. 15]

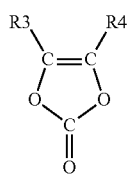
(4)

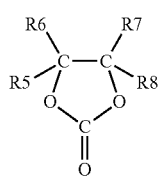
(5)

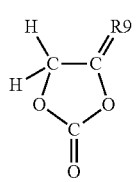
(6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

[Chem. 16]

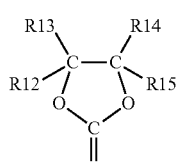
(7)

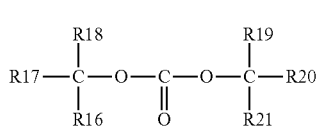
(8)

where each of R12 to R15 is one of a hydrogen group, a halogen group, a monovalent hydrocarbon group, and a monovalent halogenated hydrocarbon group, one or more of R12 to R15 are one of the halogen group and the monovalent halogenated hydrocarbon group, each of R16 to R21 is one of a hydrogen group, a halogen group, a monovalent hydrocarbon group, and a monovalent halogenated hydrocarbon group, and one or more of R16 to R21 are one of the halogen group and the monovalent halogenated hydrocarbon group, and

(9)

where R22 is an n-valent hydrocarbon group, and n is an integer of 2 or more.

(2)

The secondary battery according to (1), wherein the M is an alkali metal element, the monovalent hydrocarbon group is one of an alkyl group, an alkenyl group, an alkynyl group, a cycloalkyl group, an aryl group, and a group in which two or more kinds thereof are bound to be monovalent, the monovalent fluorinated hydrocarbon group is a group in which one or more hydrogen groups in the monovalent hydrocarbon group are substituted by a fluorine group (—F), the divalent hydrocarbon group is one of an alkylene group, an alkenylene group, an alkynylene group, a cycloalkylene group, an arylene group, and a group in which two or more kinds thereof are bound, the monovalent saturated hydrocarbon group is one of an alkyl group, a cycloalkyl group, and a group in which the alkyl group and the cycloalkyl group are bound to be monovalent, the monovalent unsaturated hydrocarbon group is one of an alkenyl group, an alkynyl group, an aryl group, an group including one or more kinds thereof, and a group in which two or more kinds thereof are bound to be monovalent, the halogen group is one of a fluorine group, a chlorine group (—Cl), a bromine group (—Br), and an iodine group (—I), and the monovalent halogenated hydrocarbon group is a group in which one or more hydrogen groups in the monovalent hydrocarbon group are substituted by the halogen group.

(3)

The secondary battery according to (1) or (2), wherein the M is lithium (Li), the monovalent fluorinated hydrocarbon group is a perfluoroalkyl group, and the X is a group represented by —O—Y—, where Y is a divalent hydrocarbon group.

(4)

The secondary battery according to any one of (1) to (3), wherein the nonaqueous electrolytic solution includes one or more of a sulfonate ester, an acid anhydride, a cyclic carboxylate ester, a dialkyl sulfoxide, a compound represented by a formula (10), a compound represented by a formula (11), a compound represented by a formula (12), a compound represented by a formula (13), a compound represented by a formula (14), and a compound represented by a formula (15), lithium monofluorophosphate ($Li_2PO_3F$), and lithium difluorophosphate ($LiPO_2F_2$),

[Chem. 17]

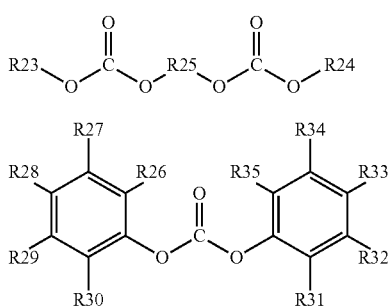

(10)

(11)

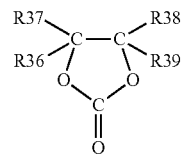

(12)

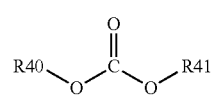

(13)

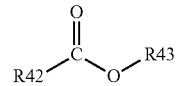

(14)

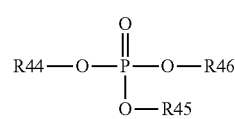

(15)

where each of R23 and R24 is one of a monovalent hydrocarbon group and a monovalent halogenated hydrocarbon group, R25 is one of a divalent hydrocarbon group and a divalent halogenated hydrocarbon group, each of R26 to R35 is one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more kinds thereof are bound to be monovalent, each of R36 to R39 is one of a hydrogen group and a monovalent hydrocarbon group, each of R40 and R41 is one of a hydrogen group and a monovalent hydrocarbon group, each of R42 and R43 is one of a hydrogen group and a monovalent hydrocarbon group, and each of R44 to R46 is one of a monovalent hydrocarbon group and a monovalent halogenated hydrocarbon group.

(5)

The secondary battery according to (4), wherein the divalent halogenated hydrocarbon group is a group in which one or more hydrogen groups in the divalent hydrocarbon group are substituted by a halogen group, the halogen group is one of a fluorine group, a chlorine group, a bromine group, and an iodine group, the monovalent oxygen-containing hydrocarbon group is an alkoxy group, the monovalent nitrogen-containing hydrocarbon group is an alkylamino group, the monovalent halogenated oxygen-containing hydrocarbon group is a group in which one or more hydrogen groups in the monovalent oxygen-containing hydrocarbon group are substituted by a halogen group, and the monovalent halogenated nitrogen-containing hydrocarbon group is a group in which one or more hydrogen groups in the monovalent nitrogen-containing hydrocarbon group are substituted by a halogen group.

(6)

The secondary battery according to any one of (1) to (5), wherein the nonaqueous electrolytic solution includes one or both of lithium hexafluorophosphate ($LiPF_6$) and lithium tetrafluoroborate ($LiBF_4$).

(7)
The secondary battery according to any one of (1) to (6), wherein
the cathode contains a cathode active material that has ability to insert and extract an electrode reactant,
the anode contains an anode active material that has ability to insert and extract the electrode reactant,
an insulating material is provided between the cathode active material and the anode active material, and
the insulating material contains one or both of insulating ceramics and an insulating polymer compound.

(8)
The secondary battery according to (7), wherein
the insulating ceramics contains one or more of aluminum oxide ($Al_2O_3$), silicon oxide ($SiO_2$), magnesium oxide (MgO), titanium oxide ($TiO_2$), and zirconium oxide ($ZrO_2$), and the insulating polymer compound contains one or both of a homopolymer of vinylidene fluoride and a copolymer of vinylidene fluoride.

(9)
The secondary battery according to (7) or (8), wherein
(1) a first insulating layer containing the insulating material is provided on a surface of the cathode active material,
(2) a second insulating layer containing the insulating material is provided on a surface of the anode,
(3) a separator is provided between the cathode and the anode, and a third insulating layer containing the insulating material is provided on a surface of the separator, or
(4) an electrolyte layer containing the nonaqueous electrolytic solution and a holding polymer compound that holds the nonaqueous electrolytic solution is provided, and the electrolyte layer contains the insulating material.

(10)
The secondary battery according to any one of (1) to (9), wherein the secondary battery is a lithium secondary battery.

(11)
A secondary battery-use electrolytic solution including:
a compound represented by a formula (1);
one or both of a compound represented by a formula (2) and a compound represented by a formula (3); and
one or more of a compound represented by a formula (4) a compound represented by a formula (5), a compound represented by a formula (6), a compound represented by a formula (7), a compound represented by a formula (8), and a compound represented by a formula (9), and
a content of the compound represented by the formula (1) in the nonaqueous electrolytic solution being within a range of 2.5 mol/dm³ to 6 mol/dm³ both inclusive, $$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)$_2$—) and a carbonyl group (—C(=O)—), $$R1\text{-}CN \quad (2)$$

where R1 is a monovalent hydrocarbon group, $$R2\text{-}X\text{—}CN \quad (3)$$

where R2 is a monovalent hydrocarbon group, and X is a group in which one or more ether bonds (—O—) and one or more divalent hydrocarbon groups are bound in any order,

[Chem. 18]

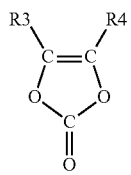
(4)

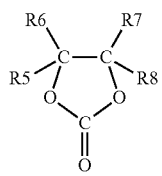
(5)

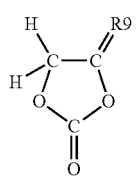
(6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

[Chem. 19]

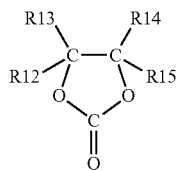
(7)

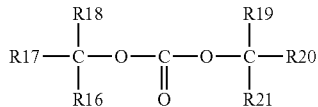
(8)

where each of R12 to R15 is one of a hydrogen group, a halogen group, a monovalent hydrocarbon group, and a monovalent halogenated hydrocarbon group, one or more of R12 to R15 are one of the halogen group and the monovalent halogenated hydrocarbon group, each of R16 to R21 is one of a hydrogen group, a halogen group, a monovalent hydrocarbon group, and a monovalent halogenated hydrocarbon group, and one or more of R16 to R21 are one of the halogen group and the monovalent halogenated hydrocarbon group, and $$R22\text{-}(CN)_n \quad (9)$$

where R22 is an n-valent hydrocarbon group, and n is an integer of 2 or more.

(12)
A battery pack including:
the secondary battery according to any one of (1) to (10);
a controller that controls an operation of the secondary battery; and
a switch section that switches the operation of the secondary battery in accordance with an instruction from the controller.
(13)
An electric vehicle including:
the secondary battery according to any one of (1) to (10);
a converter that converts electric power supplied from the secondary battery into drive power;
a drive section that operates in accordance with the drive power; and
a controller that controls an operation of the secondary battery.
(14)
An electric power storage system including:
the secondary battery according to any one of (1) to (10);
one or more electric devices that are supplied with electric power from the secondary battery; and
a controller that controls the supplying of the electric power from the secondary battery to the one or more electric devices.
(15)
An electric power tool including:
the secondary battery according to any one of (1) to (10); and
a movable section that is supplied with electric power from the secondary battery.
(16)
An electronic apparatus including the secondary battery according to any one of (1) to (10) as an electric power supply source.

It should be understood by those skilled in the art that various modifications, combinations, sub-combinations, and alterations may occur depending on design requirements and other factors insofar as they are within the scope of the appended claims or the equivalents thereof.

What is claimed is:
1. A secondary battery comprising:
a cathode;
an anode; and
a nonaqueous electrolytic solution,
the nonaqueous electrolytic solution including
a first compound represented by a formula (1),
a second compound represented by one or both of a compound represented by a formula (2) and a compound represented by a formula (3), and
a third compound represented by one or more of a compound represented by a formula (4), a compound represented by a formula (5), a compound represented by a formula (6), a compound represented by a formula (7), and a compound represented by a formula (9), and
a content of the first compound represented by the formula (1) in the nonaqueous electrolytic solution being within a range of 2.5 mol/dm³ to 6 mol/dm³ both inclusive,

  (1)

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(═O)₂—) and a carbonyl group (—C(═O)—),

  (2)

where R1 is a monovalent hydrocarbon group,

  (3)

where R2 is a monovalent hydrocarbon group, and X is a group in which one or more ether bonds (—O—) and one or more divalent hydrocarbon groups are bound in any order,

  (4)

  (5)

  (6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

  (7)

where each of R12 to R15 is one of a hydrogen group, a halogen group, a monovalent hydrocarbon group, and a monovalent halogenated hydrocarbon group, one or more of R12 to R15 are one of the halogen group and the monovalent halogenated hydrocarbon group, and

  (9)

where R22 is an n-valent hydrocarbon group, and n is an integer of 2 or more.

2. The secondary battery according to claim 1, wherein a content of the second compound is at least 20 wt. % of the nonaqueous electrolytic solution.

3. The secondary battery according to claim 1, wherein the M is an alkali metal element,
wherein when the nonaqueous electrolytic solution includes any of the monovalent hydrocarbon groups, each of the monovalent hydrocarbon groups is one of an alkyl group, an alkenyl group, an alkynyl group, a cycloalkyl group, an aryl group, and a group in which two or more kinds thereof are bound to be monovalent,
wherein when the nonaqueous electrolytic solution includes any of the monovalent fluorinated hydrocarbon groups, each of the monovalent fluorinated hydrocarbon groups is a group in which one or more hydrogen groups in the monovalent hydrocarbon group are substituted by a fluorine group (—F),
wherein when the nonaqueous electrolytic solution includes any of the one or more divalent hydrocarbon groups, each of the divalent hydrocarbon groups is one of an alkylene group, an alkenylene group, an alkynylene group, a cycloalkylene group, an arylene group, and a group in which two or more kinds thereof are bound,
wherein when the nonaqueous electrolytic solution includes any of the monovalent saturated hydrocarbon groups, each of the monovalent saturated hydrocarbon groups is one of an alkyl group, a cycloalkyl group, and a group in which the alkyl group and the cycloalkyl group are bound to be monovalent,
wherein when the nonaqueous electrolytic solution includes any of the monovalent unsaturated hydrocarbon groups, each of the monovalent unsaturated hydrocarbon groups is one of an alkenyl group, an alkynyl group, an aryl group, an group including one or more kinds thereof, and a group in which two or more kinds thereof are bound to be monovalent,
wherein when the nonaqueous electrolytic solution includes any of the halogen groups, each of the halogen groups is one of a fluorine group, a chlorine group (—Cl), a bromine group (—Br), and an iodine group (—I), and
wherein when the nonaqueous electrolytic solution includes any of the monovalent halogenated hydrocarbon groups, each of the monovalent halogenated hydrocarbon groups is a group in which one or more hydrogen groups in the monovalent hydrocarbon group are substituted by the halogen group.

4. The secondary battery according to claim 3, wherein the M is lithium (Li),
wherein when the nonaqueous electrolytic solution includes the monovalent fluorinated hydrocarbon group, the monovalent fluorinated hydrocarbon group is a perfluoroalkyl group, and
the X is a group represented by —O—Y—, where Y is a divalent hydrocarbon group.

5. The secondary battery according to claim 1, wherein the nonaqueous electrolytic solution includes one or more of a sulfonate ester, an acid anhydride, a cyclic carboxylate ester, a dialkyl sulfoxide, a compound represented by a formula (10), a compound represented by a formula (11), a compound represented by a formula (12), a compound represented by a formula (13), a compound represented by a formula (14), and a compound represented by a formula (15), lithium monofluorophosphate ($Li_2PO_3F$), and lithium difluorophosphate ($LiPO_2F_2$),

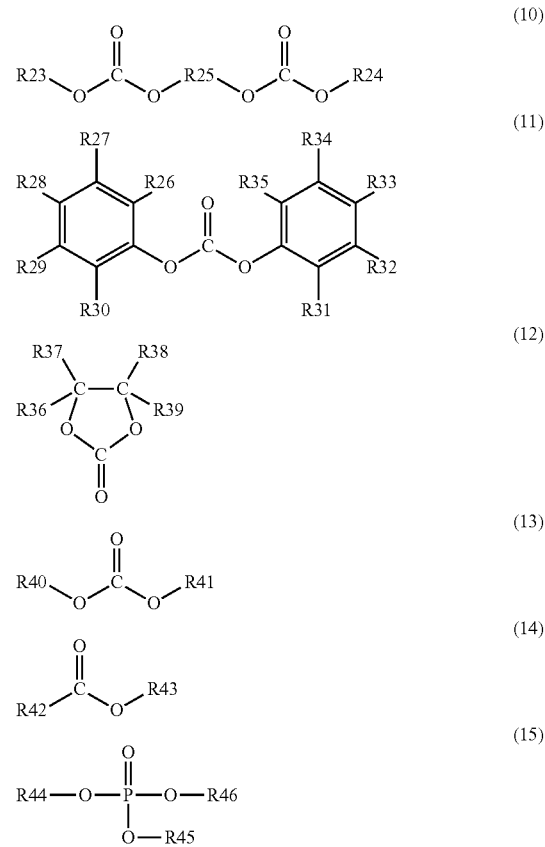

where each of R23 and R24 is one of a monovalent hydrocarbon group and a monovalent halogenated hydrocarbon group, R25 is one of a divalent hydrocarbon group and a divalent halogenated hydrocarbon group, each of R26 to R35 is one of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group in which two or more kinds thereof are bound to be monovalent, each of R36 to R39 is one of a hydrogen group and a monovalent hydrocarbon group, each of R40 and R41 is one of a hydrogen group and a monovalent hydrocarbon group, each of R42 and R43 is one of a hydrogen group and a monovalent hydrocarbon group, and each of R44 to R46 is one of a monovalent hydrocarbon group and a monovalent halogenated hydrocarbon group.

6. The secondary battery according to claim 5, wherein
wherein when the nonaqueous electrolytic solution includes any of the one or more divalent hydrocarbon groups, each of the divalent halogenated hydrocarbon groups is a group in which one or more hydrogen groups in the divalent hydrocarbon group are substituted by a halogen group,
wherein when the nonaqueous electrolytic solution includes any of the halogen groups, each of the halogen groups is one of a fluorine group, a chlorine group, a bromine group, and an iodine group,
wherein when the nonaqueous electrolytic solution includes the monovalent oxygen-containing hydrocarbon group, the monovalent oxygen-containing hydrocarbon group is an alkoxy group, wherein when the nonaqueous electrolytic solution includes the monovalent nitrogen-containing hydrocarbon group, the monovalent nitrogen-containing hydrocarbon group is an alkylamino group, wherein when the nonaqueous electrolytic solution includes the monovalent halogenated oxygen-containing group, the monovalent halogenated oxygen-containing hydrocarbon group is a group in which one or more hydrogen groups in the monovalent oxygen-containing hydrocarbon group are substituted by a halogen group, and wherein when the nonaqueous electrolytic solution includes the monovalent halogenated nitrogen-containing group, the monovalent halogenated nitrogen-containing hydrocarbon group is a group in which one or more hydrogen groups in the monovalent nitrogen-containing hydrocarbon group are substituted by a halogen group.

7. The secondary battery according to claim 1, wherein the nonaqueous electrolytic solution includes one or both of lithium hexafluorophosphate (LiPF$_6$) and lithium tetrafluoroborate (LiBF$_4$).

8. The secondary battery according to claim 1, wherein the cathode contains a cathode active material that has ability to insert and extract an electrode reactant, the anode contains an anode active material that has ability to insert and extract the electrode reactant, an insulating material is provided between the cathode active material and the anode active material, and the insulating material contains one or both of insulating ceramics and an insulating polymer compound.

9. The secondary battery according to claim 8, wherein when the insulating material includes the insulating ceramics, the insulating ceramics contains one or more of aluminum oxide (Al$_2$O$_3$), silicon oxide (SiO$_2$), magnesium oxide (MgO), titanium oxide (TiO$_2$), and zirconium oxide (ZrO$_2$), and when the insulating material includes the insulating polymer compound, the insulating polymer compound contains one or both of a homopolymer of vinylidene fluoride and a copolymer of vinylidene fluoride.

10. The secondary battery according to claim 8, wherein (1) a first insulating layer containing the insulating material is provided on a surface of the cathode active material, (2) a second insulating layer containing the insulating material is provided on a surface of the anode, (3) a separator is provided between the cathode and the anode, and a third insulating layer containing the insulating material is provided on a surface of the separator, or (4) an electrolyte layer containing the nonaqueous electrolytic solution and a holding polymer compound that holds the nonaqueous electrolytic solution is provided, and the electrolyte layer contains the insulating material; and wherein the secondary battery is a lithium secondary battery.

11. The secondary battery according to claim 1, wherein the first compound is LiFSI and wherein the content of the first compound in the nonaqueous electrolytic solution is within a range of 3.5 mol/dm$^3$ to 6 mol/dm$^3$ both inclusive.

12. A secondary battery-use electrolytic solution comprising:

a first compound represented by a formula (1);

a second compound represented by one or both of a compound represented by a formula (2) and a compound represented by a formula (3); and a third compound represented by one or more of a compound represented by a formula (4), a compound represented by a formula (5), a compound represented by a formula (6), a compound represented by a formula (7), and a compound represented by a formula (9), and a content of the first compound represented by the formula (1) in the nonaqueous electrolytic solution being within a range of 2.5 mol/dm$^3$ to 6 mol/dm$^3$ both inclusive,

$$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)$_2$—) and a carbonyl group (—C(=O)—),

$$R1\text{-}CN \quad (2)$$

where R1 is a monovalent hydrocarbon group,

$$R2\text{-}X\text{-}CN \quad (3)$$

where R2 is a monovalent hydrocarbon group, and X is a group in which one or more ether bonds (—O—) and one or more divalent hydrocarbon groups are bound in any order,

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

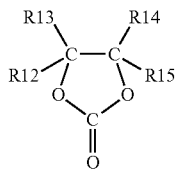

(7)

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and $$R22\text{-}(CN)_n \tag{9}$$

where R22 is an n-valent hydrocarbon group, and n is an integer of 2 or more.

13. A battery pack comprising:
a secondary battery;
a controller that controls an operation of the secondary battery; and
a switch section that switches the operation of the secondary battery in accordance with an instruction from the controller,
the secondary battery including a cathode, an anode, and a nonaqueous electrolytic solution, and
the nonaqueous electrolytic solution including
a first compound represented by a formula (1),
a second compound represented by one or both of a compound represented by a formula (2) and a compound represented by a formula (3), and
a third compound represented by one or more of a compound represented by a formula (4), a compound represented by a formula (5), a compound represented by a formula (6), a compound represented by a formula (7), and a compound represented by a formula (9), and
a content of the first compound represented by the formula (1) in the nonaqueous electrolytic solution being within a range of 2.5 mol/dm³ to 6 mol/dm³ both inclusive, $$M^+[(Z1Y1)(Z2Y2)N]^- \tag{1}$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)₂—) and a carbonyl group (—C(=O)—), $$R1\text{-}CN \tag{2}$$

where R1 is a monovalent hydrocarbon group, $$R2\text{-}X\text{—}CN \tag{3}$$

where R2 is a monovalent hydrocarbon group, and X is a group in which one or more ether bonds (—O—) and one or more divalent hydrocarbon groups are bound in any order,

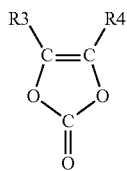

(4)

-continued

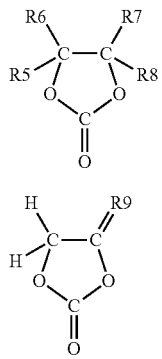

(5)

(6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

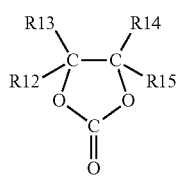

(7)

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and $$R22\text{-}(CN)_n \tag{9}$$

where R22 is an n-valent hydrocarbon group, and n is an integer of 2 or more.

14. An electric vehicle comprising:
a secondary battery;
a converter that converts electric power supplied from the secondary battery into drive power;
a drive section that operates in accordance with the drive power; and
a controller that controls an operation of the secondary battery,
the secondary battery including a cathode, an anode, and a nonaqueous electrolytic solution, and
the nonaqueous electrolytic solution including
a first compound represented by a formula (1),
a second compound represented by one or both of a compound represented by a formula (2) and a compound represented by a formula (3), and
a third compound represented by one or more of a compound represented by a formula (4), a compound represented by a formula (5), a compound represented by a formula (6), a compound represented by a formula (7), and a compound represented by a formula (9), and a content of the first compound represented by the formula (1) in the nonaqueous electrolytic solution being within a range of 2.5 mol/dm³ to 6 mol/dm³ both inclusive, $$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)₂—) and a carbonyl group (—C(=O)—), $$R1\text{-}CN \quad (2)$$

where R1 is a monovalent hydrocarbon group, $$R2\text{-}X\text{—}CN \quad (3)$$

where R2 is a monovalent hydrocarbon group, and X is a group in which one or more ether bonds (—O—) and one or more divalent hydrocarbon groups are bound in any order,

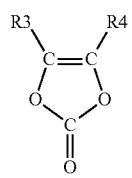

(4)

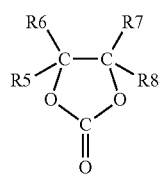

(5)

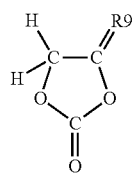

(6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

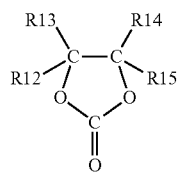

(7)

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and $$R22\text{-}(CN)_n \quad (9)$$

where R22 is an n-valent hydrocarbon group, and n is an integer of 2 or more.

15. An electric power storage system comprising:
a secondary battery;
one or more electric devices that are supplied with electric power from the secondary battery; and
a controller that controls the supplying of the electric power from the secondary battery to the one or more electric devices,
the secondary battery including a cathode, an anode, and a nonaqueous electrolytic solution, and
the nonaqueous electrolytic solution including
a first compound represented by a formula (1),
a second compound represented by one or both of a compound represented by a formula (2) and a compound represented by a formula (3), and
a third compound represented by one or more of a compound represented by a formula (4), a compound represented by a formula (5), a compound represented by a formula (6), a compound represented by a formula (7), and a compound represented by a formula (9), and
a content of the first compound represented by the formula (1) in the nonaqueous electrolytic solution being within a range of 2.5 mol/dm³ to 6 mol/dm³ both inclusive, $$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)₂—) and a carbonyl group (—C(=O)—), $$R1\text{-}CN \quad (2)$$

where R1 is a monovalent hydrocarbon group, $$R2\text{-}X\text{—}CN \quad (3)$$

where R2 is a monovalent hydrocarbon group, and X is a group in which one or more ether bonds (—O—) and one or more divalent hydrocarbon groups are bound in any order,

(4)

(5)

-continued (6)

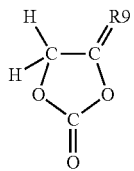

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group, (7)

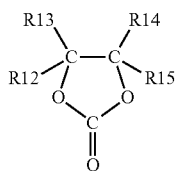

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and $$R22\text{-}(CN)_n \quad (9)$$

where R22 is an n-valent hydrocarbon group, and n is an integer of 2 or more.

16. An electric power tool comprising:
a secondary battery; and
a movable section that is supplied with electric power from the secondary battery,
the secondary battery including a cathode, an anode, and a nonaqueous electrolytic solution, and
the nonaqueous electrolytic solution including
a first compound represented by a formula (1),
a second compound represented by one or both of a compound represented by a formula (2) and a compound represented by a formula (3), and
a third compound represented by one or more of a compound represented by a formula (4), a compound represented by a formula (5), a compound represented by a formula (6), a compound represented by a formula (7), and a compound represented by a formula (9), and
a content of the first compound represented by the formula (1) in the nonaqueous electrolytic solution being within a range of 2.5 mol/dm³ to 6 mol/dm³ both inclusive, $$M^+[(Z1Y1)(Z2Y2)N]^- \quad (1)$$

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)₂—) and a carbonyl group (—C(=O)—), $$R1\text{-}CN \quad (2)$$

where R1 is a monovalent hydrocarbon group, $$R2\text{-}X\text{-}CN \quad (3)$$

where R2 is a monovalent hydrocarbon group, and X is a group in which one or more ether bonds (—O—) and one or more divalent hydrocarbon groups are bound in any order, (4)

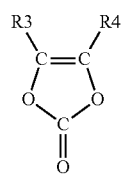

(5)

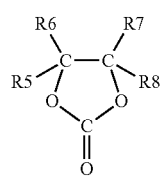

(6)

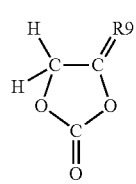

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group, (7)

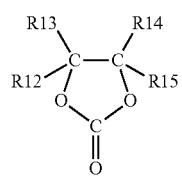

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and $$R22\text{-}(CN)_n \quad (9)$$

where R22 is an n-valent hydrocarbon group, and n is an integer of 2 or more.

17. An electronic apparatus comprising a secondary battery as an electric power supply source, the secondary battery including a cathode, an anode, and a nonaqueous electrolytic solution, and
the nonaqueous electrolytic solution including
a first compound represented by a formula (1), a second compound represented by one or both of a compound represented by a formula (2) and a compound represented by a formula (3), and a third compound represented by one or more of a compound represented by a formula (4), a compound represented by a formula (5), a compound represented by a formula (6), a compound represented by a formula (7), and a compound represented by a formula (9), and a content of the first compound represented by the formula (1) in the nonaqueous electrolytic solution being within a range of 2.5 mol/dm$^3$ to 6 mol/dm$^3$ both inclusive,

   (1)

where M is a metal element, each of Z1 and Z2 is one of a fluorine group (—F), a monovalent hydrocarbon group, and a monovalent fluorinated hydrocarbon group, one or both of Z1 and Z2 are one of the fluorine group and the monovalent fluorinated hydrocarbon group, each of Y1 and Y2 is one of a sulfonyl group (—S(=O)$_2$—) and a carbonyl group (—C(=O)—),

   (2)

where R1 is a monovalent hydrocarbon group,

   (3)

where R2 is a monovalent hydrocarbon group, and X is a group in which one or more ether bonds (—O—) and one or more divalent hydrocarbon groups are bound in any order,

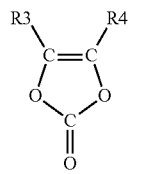   (4)

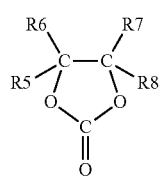   (5)

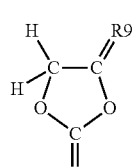   (6)

where each of R3 and R4 is one of a hydrogen group (—H) and a monovalent hydrocarbon group, each of R5 to R8 is one of a hydrogen group, a monovalent saturated hydrocarbon group, and a monovalent unsaturated hydrocarbon group, one or more of R5 to R8 are the monovalent unsaturated hydrocarbon group, R9 is a group represented by >CR10R11, and each of R10 and R11 is one of a hydrogen group and a monovalent hydrocarbon group,

   (7)

where each of R12 to R15 is one of a hydrogen group, a halogen group, a monovalent hydrocarbon group, and a monovalent halogenated hydrocarbon group, one or more of R12 to R15 are one of a halogen group and a monovalent halogenated hydrocarbon group, and

   (9)

where R22 is an n-valent hydrocarbon group, and n is an integer of 2 or more.

18. The secondary battery according to claim 1, wherein the third compound is represented by one or more of the compound represented by a formula (4), the compound represented by a formula (5), and the compound represented by a formula (6) and wherein a content of the third compound is within a range of 0.01 wt. % to 20 wt. % both inclusive of a total content of the electrolyte solution excluding the third compound.

19. The secondary battery according to claim 1, wherein the third compound is represented by the compound represented by a formula (7) and wherein a content of the third compound is within a range of 0.01 wt. % to 20 wt. % both inclusive of a total content of the electrolyte solution excluding the third compound.

20. The secondary battery according to claim 1, wherein the third compound is represented by the compound represented by a formula (9) and wherein a content of the third compound is within a range of 0.01 wt. % to 10 wt. % both inclusive of a total content of the electrolyte solution excluding the third compound.

* * * * *